United States Patent [19]

Wassick et al.

[11] Patent Number: 6,056,781
[45] Date of Patent: *May 2, 2000

[54] MODEL PREDICTIVE CONTROLLER

[75] Inventors: John M. Wassick; Patrick S. McCroskey; John J. McDonough; David K. Steckler, all of Midland, Mich.

[73] Assignee: The Dow Chemical Company, Midland, Mich.

[*] Notice: This patent is subject to a terminal disclaimer.

[21] Appl. No.: 09/020,141

[22] Filed: Feb. 6, 1998

Related U.S. Application Data

[63] Continuation of application No. 07/959,629, Oct. 13, 1992, Pat. No. 5,740,033.

[51] Int. Cl.[7] .............................. G06G 7/48; G06G 7/58
[52] U.S. Cl. ................................. 703/12; 703/2; 703/6; 700/28; 700/29; 700/30; 700/31; 700/38
[58] Field of Search ...................... 395/500.23, 500.27, 395/500.33; 364/149, 151, 153, 165; 703/2, 6, 12; 700/28, 29, 30, 31, 38

[56] References Cited

U.S. PATENT DOCUMENTS

| | | | |
|---|---|---|---|
| 4,349,869 | 9/1982 | Prett et al. | 364/159 |
| 4,358,822 | 11/1982 | Sanchez | 364/151 |
| 4,368,510 | 1/1983 | Anderson | 364/151 |
| 4,374,703 | 2/1983 | Lebeau et al. | 162/253 |
| 4,663,703 | 5/1987 | Axelby et al. | 364/149 |
| 4,791,548 | 12/1988 | Yoshikawa et al. | 364/149 |
| 4,882,526 | 11/1989 | Iino et al. | 318/561 |
| 5,000,924 | 3/1991 | Cygnarowicz et al. | 422/109 |
| 5,024,801 | 6/1991 | Impink, Jr. et al. | 376/217 |
| 5,038,269 | 8/1991 | Grimble et al. | 364/148 |
| 5,043,151 | 8/1991 | Staffel et al. | 423/305 |
| 5,060,132 | 10/1991 | Beller et al. | 364/158 |
| 5,191,521 | 3/1993 | Brosilow | 364/160 |
| 5,268,835 | 12/1993 | Miyagaki et al. | 364/151 |
| 5,347,446 | 9/1994 | Iino et al. | 700/29 |
| 5,402,333 | 3/1995 | Cardner | 364/151 |

OTHER PUBLICATIONS

Gibbs et al., "Application of Nonlinear Model–based Predictive Control to Fossil Power Plants", Proceedings of the 30th IEEE Conference on Decision and Control, vol. 2, pp. 1850–1856, Dec. 1991.

Nakamori et al., "Model Predictive Control of Nonlinear Processes by Multi–model Approach", Proceedings of the 1991 International Conference on Industrial Electronics, vol. 3, pp. 1902–1907, Nov. 1991.

(List continued on next page.)

*Primary Examiner*—Kevin J. Teska
*Assistant Examiner*—Douglas W. Sergent
*Attorney, Agent, or Firm*—Dale H. Schultz; William J. Coughlin

[57] ABSTRACT

A model predictive controller for a process control system which includes a real-time executive sequencer and an interactive modeler. The interactive modeler includes both a process model and an independent disturbance model. The process model represents the dynamic behavior of the physical process, while the disturbance model represents current and future deviations from the process model. The interactive modeler estimates current process states from the process model and input data received from the executive sequencer. The executive sequencer then projects a set of future process parameter values, which are sought to be controlled, over a predetermined control horizon. The interactive modeler then solves a set of equations as to how the physical process will react to control changes in order to determine an optimized set of control changes. As a result, the process control system will be able to accurately track a predetermined set-point profile in the most effective and cost efficient manner.

12 Claims, 35 Drawing Sheets

OTHER PUBLICATIONS

Patwardhan et al., "Nonlinear Model Predictive Control of Chemical Reactors", IEEE Region 10 International Conference on EC3–Energy, Computer, Communication and Control Systems, pp. 53–60, Aug. 1991.

Murray–Smith et al., "Neural Networks for Modeling and Control of a Non–linear Dynamic System", Proceedings of the 1992 IEEE International Symposium on INtelligent Control, pp. 404–409. Aug. 1992.

Psichogios et al., "Nonlinear Internal Model Control and Model Predictive Control Using Neural Network", 5th IEEE International Symposium on Intelligent Control, 1990, pp. 1082–1087, Sep. 1990.

Bequette, B.W. (Rensselaer Polytechnic Institute), Nonlinear Control of Chemical Processes—A Review, Submitted to Industrial and Engineering Chemistry Research, Aug. 5, 1990.

Bequette, B.W. (Rensselaer Polytechnic Institute), Process Control Using Nonlinear Programming Techniques, Reprint from: A. Bensoussan and J.L. Lions (Eds.), Analysis and Optimization of Systems, Proceedings of the $9^{th}$ International Conference, Antibes, Jun. 12–15, 1990, Lecture Notes in Control and Information Sciences, 144, 57–66, Springer–Verlag (1990).

Brengel, D.D.; Seider, W.D. (University of Pennsylvania), Coordinated Design and Control Optimization of Nonlinear Processes, Submitted to Comput. Chem. Eng.; Dec. 1990.

Chiou, H.W.; Zafiriou E. (University of Maryland), User's Guide for QDMC Version 1.0, A Set of Fortran Programs for Constrained Quadratic Dynamic Matrix Control Simulation and Stability/Performance Study, Technical Research Report, SRC–TR–90–29.

Choi, J. Y.; Rhinehart, R. R.; Riggs, J.B. (Texas Tech University), Nonlinear Model–Based Control of a Batch Polymerization Reactor, Technical Report 1, Mar. 1992, Submitted to The Dow Chemical Company in partial fulfillment of a Cooperative Research Agreement.

Gattu, G.; Zafiriou, E. (University of Maryland), Nonlinear QDMC With State Estimation—Formulation and Application to an "Industrial Challenge" Semi Batch Process, 1991 Amer. Control Conf., Boston, MA.

Gelormino, M.S.; Ricker, N.L. (University of Washington), Model–Predictive Control of Large–Scale Systems, Presented at the Annual Meeting of the Canadian Society of Chemical Engineers, Vancouver, B.C.; Oct. 7, 1991.

Li, W.C.; Biegler, L.T. (Carnegie–Mellon University), Process Control Strategies for Constrained Nonlinear Systems, Ind. Eng. Chem. Res., 1988, 27, 1421–1433.

McCroskey, P.S.; Wassick, J.M. (The Dow Chemical Company), Integration of Model Development and Advanced Process Control, Cope–91, Oct. 1991.

Ohshima, M. (Kyoto University); Ohno, H. (Kobe University); Hashimoto, I. (Kyoto University); Sasajima, M.; Maejima, M.; Tsuto, K.; Ogawa, T. (Kao Corporation), Model Predictive Control with Adapative Disturbance Prediction and its Application to Fatty Acid Distillation Columns Control, Paper 144e, Symposium Recent Advances in Process Control—I, AIChE Annual Meeting, L.A., Nov. 18 (1991).

Patwardhan, A.A.; Rawlings, J.B.; Edgar, T.F. (The Universtiy of Texas at Austin), Nonlinear Model Predictive Control, Submitted to Chemical Engineering Communications, Sep. 1988, Revised Jun. 1989.

Ramamurthi, Y.; Bequette, B.W. (Rensselaer Polytechnic Institute), Data Reconcilation of Systems with Unmeasured Variable Using Nonlinear Programming Techniques, Prepared for presentation at the 1990 AIChE Spring National Meeting, Orlando, FL (Mar. 18–22, 1990).

Rinehart, R.R.; Riggs, J.B. (Texas Tech University), Process Control Through Nonlinear Modeling, Control, Jul. 1990, pp. 86–90.

Richalet, J., Observations on Model–Based Predictive Control, Control Engineering, Aug. 1992, pp. 39–41.

SimuSolv, Modeling and Simulation Software Newsletter, vol. 1, Issue 1, Fall 1989.

SimuSolv, Modeling and Simulation Software, Technical Software for Scientists and Engineers.

Sistu, P.B.; Bequette, B.W. (Rensselaer Polytechnic Institute), Nonlinear Predictive Control of Uncertain Chemical Processes, Prepared for presentation at the 1990 AIChE Annual Meeting, Chicago, IL (Nov. 11–16, 1990), Nonlinear Control Session, paper 238a.

Sistu, P.B.; Bequette, B.W. (Rensselaer Polytechnic Institute), Process Identification using Nonlinear Programming Techniques, Proceedings of the 1990 American Control Conference, pp. 1534–1539, San Diego, CA (May 23–25, 1990).

Steiner, E.C. (Mo'alem, Incorporated), Introduction to SimuSolv, Three–Day Workshop at The Dow Chemical Company, Midland Location, Dec. 3–6, 1989.

Steiner, E.C.; Rey, T.D.; McCroskey, P.S., Reference Guide—vol. 1, SimuSolv Modeling and Simulation Software, Sep. 30, 1990.

Zafiriou, E. (University of Maryland), Robust Model Predictive Control of Processes with Hard Constraints, Computers Chem. Engng., vol. 14; No. 4, 5, pp. 359–371, 1990.

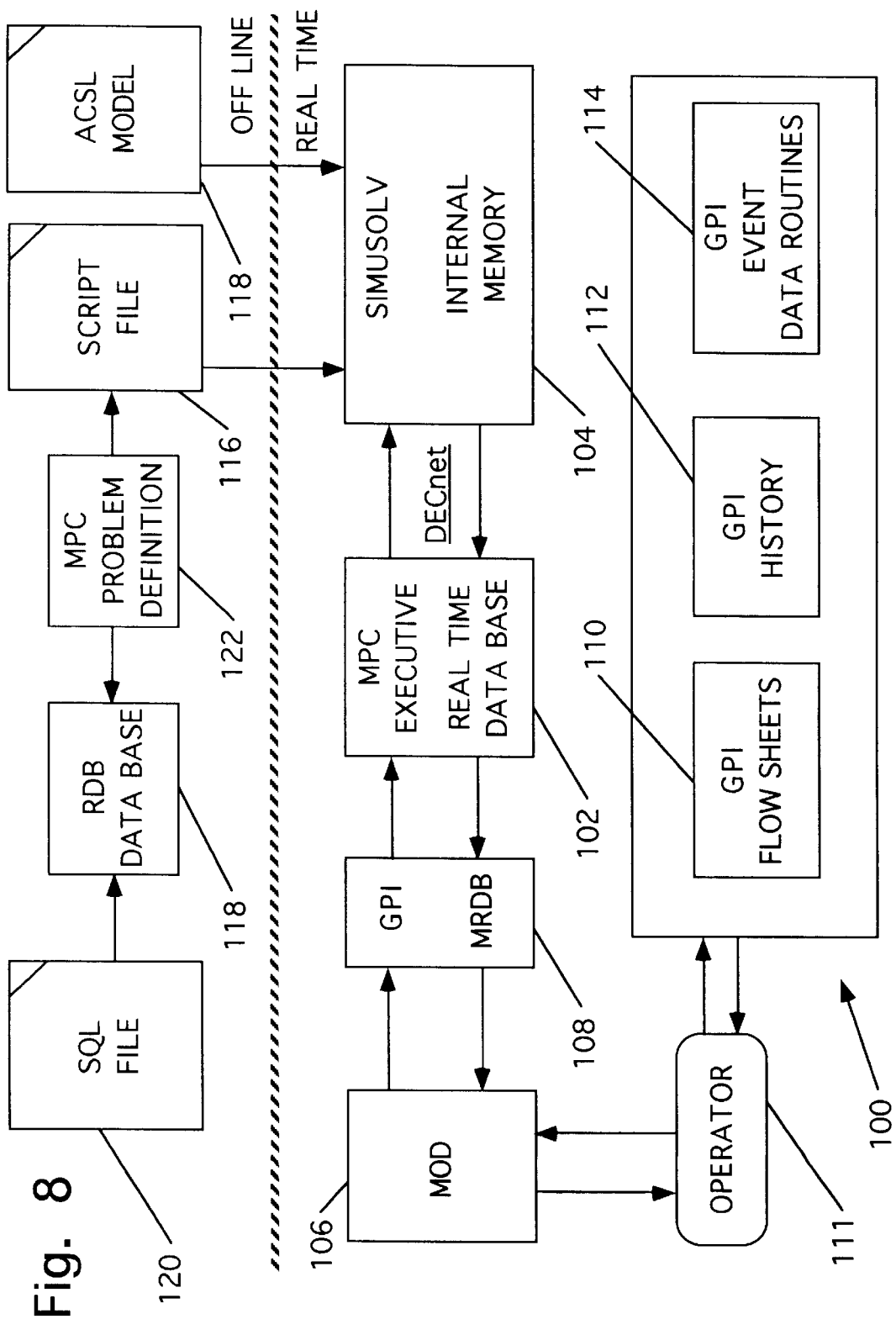

MODEL PREDICTIVE CONTROLLER

This application is a continuation of prior application Ser. No. 07/959,629 filed on Oct. 13, 1992, now U.S. Pat. No. 5,740,033.

BACKGROUND OF THE INVENTION

The present invention generally relates to process control methodologies, and particularly to a process control method and system which seeks to optimize real-time control by using a model and a variable prediction mechanism to anticipate and respond to future process events.

In order to achieve maximum economic efficiency and optimum product quality, the demands for more comprehensive process control automation have continued to increase in both quantity and sophistication. In this regard, substantial advances have been made in terms of the ability to rapidly acquire input data from a multitude of sensors and generate highly reliable output commands for controlling a physical process. However, most process control methodologies have traditionally relied on the use of feedback signals to steer one or more proportional-integral-derivative ("PID") algorithms, as a way to achieve a desired set-point. While this approach to process control has been unquestionably effective, it is primarily reactive in nature. Accordingly, the use of feedback-based control may lead to a sluggish overall system response and/or cause an adjustment to be made that would be larger than would otherwise be desirable.

A chemical batch reactor provides one example of a process control challenge where feedback-based control may not consistently achieve an optimum result. In this regard, batch reactor control will typically involve moving set-points, process delays, large inertia, non-linearities, unmeasured disturbances and multiple control efforts. Accordingly, information from the sensors as to the current state of the batch reactor process is important in terms of achieving the existing set-point, but this information may not be sufficient, by itself, to achieve a subsequent set-point without encountering an unwanted delay in the change of a process parameter, such as temperature or pressure. While a dynamic lag in a process parameter may be overcome by bringing about a significant change in a manipulated parameter (e.g., a heating element), it is generally considered less desirable to force large changes on a process control system.

Additionally, one of the key goals of any batch reactor control process is the ability to minimize product variability from one batch to another. For example, when molecular distribution is used as a grading factor in the production of a polymer, the consistent achievement of a particular molecular distribution profile may well have substantial economic implications on the investment in the production equipment. Accordingly, a continuing need exists to develop process control methodologies which are capable of minimizing product variability in batch reactor processes, as well as other varying process control applications.

Accordingly, it is a principal objective of the present invention to provide a method and system of process control which seeks to optimize the control methodology by anticipating future process events or states and selecting the most beneficial set of control changes.

It is a more specific objective of the present invention to provide a method and system of process control which utilizes a model of the process and an variable prediction mechanism to anticipate and respond to events that will occur during a reaction.

It is another objective of the present invention to provide a model predictive controller which not only seeks to minimize product variability, but also seeks to achieve a more economical and efficient production process.

It is a further objective of the present invention to provide a model predictive controller which runs in real-time, and has the capability to predict and control existing process conditions which are not otherwise measured by the process control equipment.

It is yet another objective of the present invention to provide a model predictive controller which is capable of predicting future deviations from the model on the basis of a trajectory of past and current deviations or errors, as well as modifying set-point profiles on the basis of past disturbances.

It is an additional objective of the present invention to provide a model predictive controller which facilitates a systematic transfer of process knowledge gained through plant experience or research.

It is still another objective of the present invention to provide a model predictive controller which will shift the emphasis of control from measured process quantities to the monitoring and control of the unmeasured process quantities that will have a direct effect on product properties.

SUMMARY OF THE INVENTION

To achieve the foregoing objectives, the present invention provides a model predictive controller for a process control system which includes an interactive modeler and a real-time executive sequencer. The interactive modeler includes both a process model and an independent disturbance model which includes a variable disturbance prediction mechanism. The process model represents the dynamic behavior of the physical process, while the disturbance model represents current deviations and potential future deviations from the process model. The executive sequencer periodically transmits time recorded input data to the interactive modeler, which in turn generates an estimation of current process states using the process and disturbance models. The executive sequencer is also used to project a desired set of future "controlled" parameter values over a predetermined prediction horizon. The interactive modeler then solves a set of equations to determine how the process will react to proposed changes in one or more manipulated parameter values, and ultimately determines an optimized set of manipulated parameter values. This set of manipulated parameter values will be transmitted to the executive sequencer in order to enable the process control system to accurately track a desired set of controlled parameter values (e.g., set-points).

In one embodiment according to the present invention, the process control system includes a separate processor for making independent process control decisions, and the model predictive controller includes an interface for providing communication between the decision making processor and the executive sequencer. In this way, the decision making processor will be able to test manipulated parameter values, which are relayed from the executive sequencer, for validity and/or reasonableness. The executive sequencer will also test these manipulated parameter values for validity and/or reasonableness before transmitting them to the decision making processor. Similarly, the executive sequencer will preferably test the input data obtained from the decision making processor for validity and/or reasonableness. The executive sequencer also includes a real-time database which contains data derived from the input sensors and a list of set-point corners for projecting future set-points.

The interactive modeler may be used to build both the process and disturbance models off-line, as well as respond to the executive sequencer on a real-time basis. In this regard, the executive sequencer may require that the interactive modeler provide an estimation of current process states at intervals which are more frequent that the intervals used to determine an optimized set of manipulated parameter values. As a result of this unique cooperation between the decision making processor, the executive sequencer and the interactive modeler, the process control system will be able to accurately track a predetermined set-point profile in the most effective, reliable and cost efficient manner.

Additional features and advantages of the present invention will become more fully apparent from a reading of the detailed description of the preferred embodiment and the accompanying drawings in which:

BRIEF DESCRIPTION OF THE DRAWINGS

FIG. 8 is an overall block diagram of one embodiment of a model predictive controller software system in accordance with the present invention.

DETAILED DESCRIPTION OF THE PREFERRED EMBODIMENTS

Figure 1:
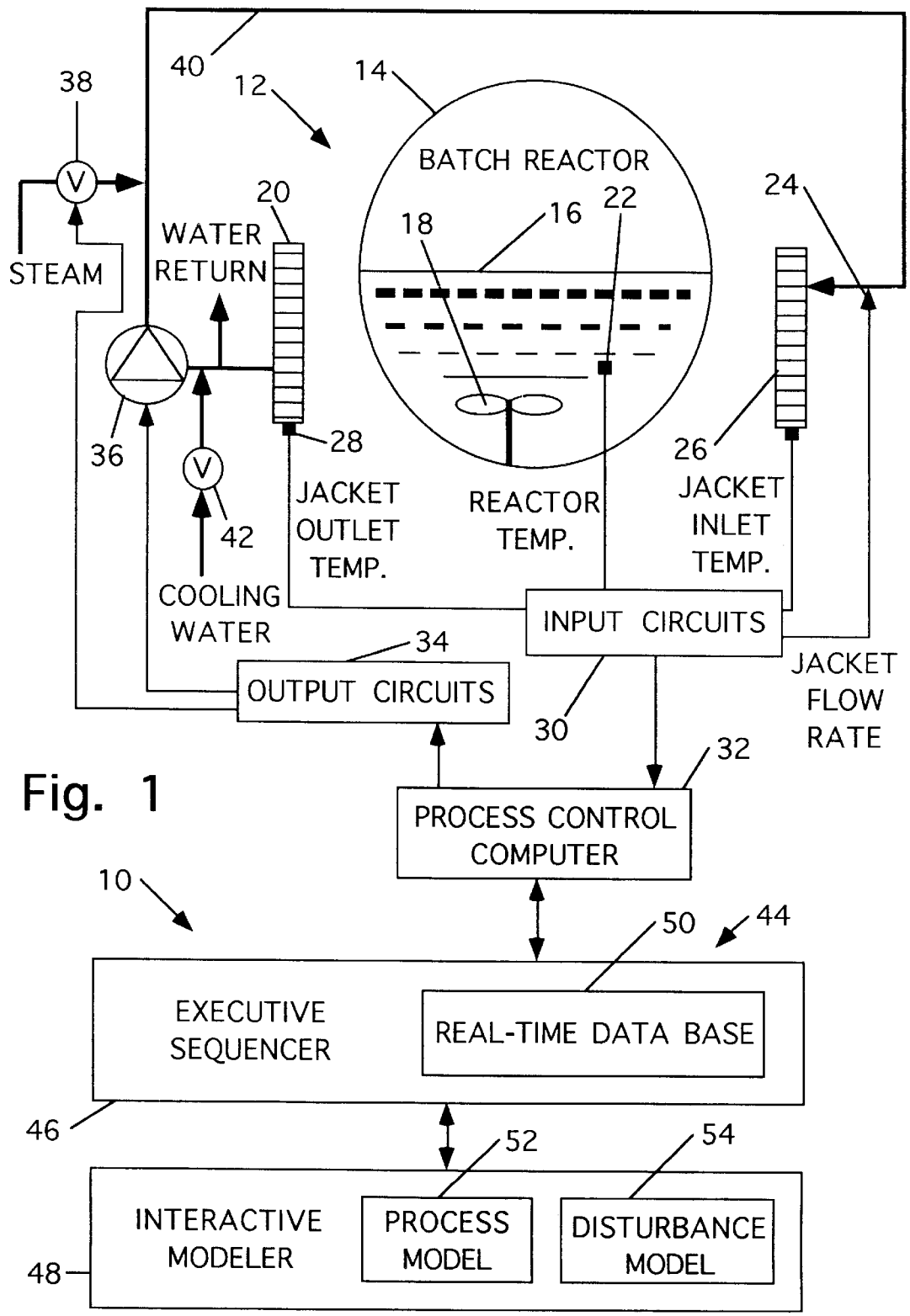
FIG. 1 is a block diagram of a process control system which includes a model predictive controller in accordance with the present invention.

Referring to FIG. 1, a block diagram of a process control system 10 is shown, which features a model predictive controller according to the present invention. More specifically, the process control system 10 is shown in connection with a simplified representation of a suspension batch reactor 12 to illustrate the principles of the present invention. While the suspension batch reactor 12 will be described in connection with the production of a copolymer, such as SARAN (a Dow Chemical Company trademark) for a copolymer derived from vinyl chloride and vinylidene chloride, it should be understood that this particular embodiment is only intended to be exemplary of a wide variety of process control applications for the present invention.

As shown in FIG. 1, the suspension batch reactor 12 includes a reactor vessel 14. The reactor vessel 14 contains a quantity of a suitable suspension fluid 16, such as water. In order to facilitate the desired reaction process, the suspension fluid 16 will also generally contain a surface active agent, a monomer-soluble initiator and one or more reactivity-modifying additives. In a batch reactor of this type, the appropriate monomers may be added to the reactor vessel 14 under separate control mechanisms, so that the concentrations of these monomers may be individually controlled. However, in order to simplify the batch reactor arrangement of FIG. 1, the mechanisms used to introduce the recipe ingredients into the reactor vessel 14 are not shown. However, FIG. 1 does show an agitator 18 which is used to stir the ingredients and assist the formation of the copolymer through its shearing action. An external heat exchange jacket 20 is also provided to adjust the temperature of the polymerization reaction.

In order to control the growth of the coploymer molecules in the reactor vessel 14, various sensors will be provided to measure physical process parameters, such as temperature and flow rate. In this regard, the batch reactor 12 includes a sensor 22 to detect the bulk temperature of the fluid in the reactor vessel 14, a sensor 24 to detect the recirculation flow rate through the reactor jacket 20, and sensor 26 to detect the inlet temperature of the reactor jacket, and a sensor 28 to detect the outlet temperature of the reactor jacket. The signals from these sensors are transmitted to one or more input circuits 30. The input circuits 30 will perform any necessary filtering, averaging and/or conversion to a digital representation of the phenomena being sensed. Then, these digital input signals will be transmitted to a process control computer 32, which will make process control decisions, based at least in part upon the magnitude of the digital input signals.

In the context of classical process control methodologies, the process control computer 32 would employ one or more PID algorithms in order to maintain desired set-points for specific controlled parameters, such as temperature, pressure and monomer delivery rates. Each of these PID algorithms will attempt to follow a set-point profile, which may be a function of various "measured" parameter values. Once these control decisions are made, the process control computer 32 will transmit the appropriate command signals to one or more output circuits 34. The output circuits will perform any needed signal conversion (e.g., digital to analog), and the output circuits may also contain slave controllers for achieving the set-points commanded by the process control computer 32. Then, these processed output signals will be transmitted to control devices, such as pumps, valves, relays and motors. For example, if the process control computer 32 determines that the temperature within the reactor vessel 14 needs to be increased, then an appropriate command signal will be transmitted to the output circuit 34. This command signal may take the form of a set-point to be achieved, if the output circuit 34 is equipped with a slave controller. Otherwise, this command signal may be a signal which directly manipulates a physical device, such as an electronically actuated valve.

A further description of a process control system of the type set forth above may be found in U.S. patent application Ser. No. 07/864,931, filed on Mar. 31, 1992, entitled "Process Control Interface System Having Triply Redundant Remote Field Units", by Glaser et. al.,; U.S. patent application Ser. No. 07/898,923, filed on Jun. 12, 1992, entitled "Secure Front End Communication System And Method For Process Control Computers", by de Bruijn et. al.; U.S. patent application Ser. No. 07/925,089, filed on Aug. 4, 1992, entitled "Method Of Input Signal Resolution For Actively Redundant Process Control Computers", by Baca et. al. Each of these commonly assigned patent applications are hereby incorporated by reference. As will appreciated from a review of these patent applications, the process control computer 32 may be comprised of at least two actively redundant process control computers. Additionally, the input circuits 30 and the output circuits 34 may be contained in a triply redundant field computer unit that is capable of being remotely located from the actively redundant process control computers. Similarly, a front end communication system may also be provided for enabling the transmission of real-time data from the actively redundant process control computers to an operator station which resides on a local area network. In this regard, the front end communication system may employ one or more front end computers as an intelligent interface between the process control computers and the computer network. These front end computers may have the capability of evaluating messages from the advanced control stations that contain a request for data or an instruction for the actively redundant process control computers to modify programmable parameters.

In terms of output control devices for the batch reactor 12 of FIG. 1, the reactor jacket 20 is provided with a pump 36 which recirculates water through the reactor jacket, a valve 38 for injecting steam into the recirculation loop 40, and a valve 42 for alternately injecting cold water into this recirculation loop. The entire batch of reactant, initator, and solvent will generally be loaded into the reactor vessel 14 at room temperature (e.g., 20° C.). Accordingly, the reactor jacket heat transfer fluid (i.e., water) will be heated, using low pressure steam, to increase the temperature of the reactor contents until the initiator becomes active. Once the reaction begins, the exothermic nature of the free radical polymerization requires heat to be removed to maintain an appropriate temperature profile within the reactor vessel 14. When the reactor vessel 14 is fully loaded, it will generally have a significant heat capacity, thereby requiring very large heat fluxes to cause a measurable change in the reactor temperature. Additionally, since ambient temperature cooling water is used to cool the reactor, the driving force for heat removal is relatively limited. These physical constraints will cause a generally slow response to process changes, which could lead to sluggish control using a PID approach to process control.

However, in accordance with the present invention, the process control system 10 is equipped with a model predictive controller 44 which enables the process control system 10 to anticipate and respond to future process events. The model predictive controller 44 generally includes an executive sequencer 46 and an interactive modeler 48. The executive sequencer 46 is adapted to receive a set or image of real-time process data from the process control computer 32, which has been time-stamped by the process control computer. This process data is referenced to and stored in a real-time data base 50 by the executive sequencer 38. The executive sequencer 46 then transmits some or all of this real-time data to the interactive modeler 48 at predetermined intervals.

The interactive modeler 40 includes both a process model 52 and an independent disturbance model 54. The process model 52 represents the dynamic behavior of the physical process, while the disturbance model 54 represents current as well as potential future deviations from the process model. In this regard, the executive sequencer 46 uses the interactive modeler 48 to determine an optimal estimation of the current state of the process and the current disturbances acting on the process. The current state of the process is generally represented by one or more derived or "unmeasured" parameter values, such as the percentage of monomer which has been converted to the SARAN copolymer. The executive sequencer 46 may then forward these unmeasured parameter values to the process control computer 32 for use in its control program. As will be more fully explained below, the process control computer 32 will continue to make process control decisions which are independent of those made by the model predictive controller 44. These process control decisions may be used in lieu of those provided by the model predictive controller 44 under the appropriate circumstances.

At given process intervals, the model predictive controller 44 will be used to determine a set of optimized manipulated parameter values over a predetermined prediction horizon. These manipulated parameter values may take the form of a setting for a directly controlable parameter, such as the temperature of the reactor jacket 20 or the flow rate produced by the pump 36. In order to generate this set of optimized manipulated parameter values, the executive sequencer 46 will project a set of desired controlled parameter values over a predetermined control horizon. These controlled parameter values may take the form of a set-point for an indirectly controlled parameter, such as the temperature within the reactor vessel 14. In other words, this set of controlled parameter values will provide a particular set-point profile that the process control system 10 should seek to track and match.

The executive sequencer 46 will then forward this set of controlled parameter values to the interactive modeler 48. The interactive modeler 48 will in turn solve a series of equations based upon first principles to determined how the physical process will react to various alternative control changes. The goal of this procedure is not only to decide the next set of control changes, but to do an optimization to find the best set of control changes. As a result, the interactive modeler 48 will transmit an optimal set of control changes (i.e., manipulated parameter values) over the prediction horizon to the executive sequencer 46. These future control moves are selected to minimize future set-point deviations given certain physical or programmed contraints.

The executive sequencer 46 will preferably test all of the manipulated parameter values for validity and/or reasonableness, and transmit the current set of accepted manipulated parameter values to the process control computer 32. In this context, the "current" set of manipulated parameter values represents the next set of manipulated parameter values to potentially be implemented by the process control computer 32. In one form of the present invention, the process control computer 32 will also test the manipulated parameter values received from the executive sequencer 46 for validity and/or reasonableness, and then implement accepted manipulated parameter values. In the event that the control changes are not accepted, or there has been an interuption in communication between the process control computer 32 and the executive sequencer 46, then the process control computer 32 will use its own PID algorithms to control the physical process. In any event, the process control computer 32 may continue to be used for sequencing process steps, performing digital output calculations and deciding when alarms should be raised. Thus, it should be appreciated that the process control computer 32, the executive sequencer 46 and the interactive modeler 48 will perform those tasks for which they are best suited. It should also be appreciated that this particular division of responsibility will also enable simulations to be conducted off-line in order to pre-tune the real-time performance of the model predictive controller 44. Additionally, the integration of these system components will enable a process currently running in the plant to remain 30 operational through the action of the process control computer 32, while the model predictive controller 46 is briefly taken off-line for fine tuning.

While the process control computer 32, the executive sequencer 46 and the interactive modeler 48 have been described thus far as separate entities, it should be appreciated that one or more of these entities may be combined in the appropriate application. Thus, for example, the executive sequencer 46 and the interactive modeler 46 may reside in the same computer unit, such as a computer which is connected to the front-end local area network (e.g., a micro-VAX 4000 from DEC). However, it should be appreciated that the provision of a process control computer 32 which is logically separable from the model predictive controller 44 enable each of these entities employ different and distinct process control methodologies. As a result, the methodology of the process control computer 32 will provide a parallel process back-up to the model predictive controller 44, and each of these entities will be able to check the information being passed to each other for validity or reasonableness. In this regard, it is preferred that the executive sequencer test the real-time data received from the process control computer 32 for validity or reasonableness.

Additionally, it should be noted that the batch reactor 12 of Figure provides an example of single-input single-output ("SISO") control. In other words, the control objective is to maintain a pre-specified reactor temperature profile by manipulating the temperature set-point of the reactor jacket 20. However, it should be understood that the principles of the present invention are equally application to multiple-input multiple-output ("MIMO") control methodologies.

Figure 2A:
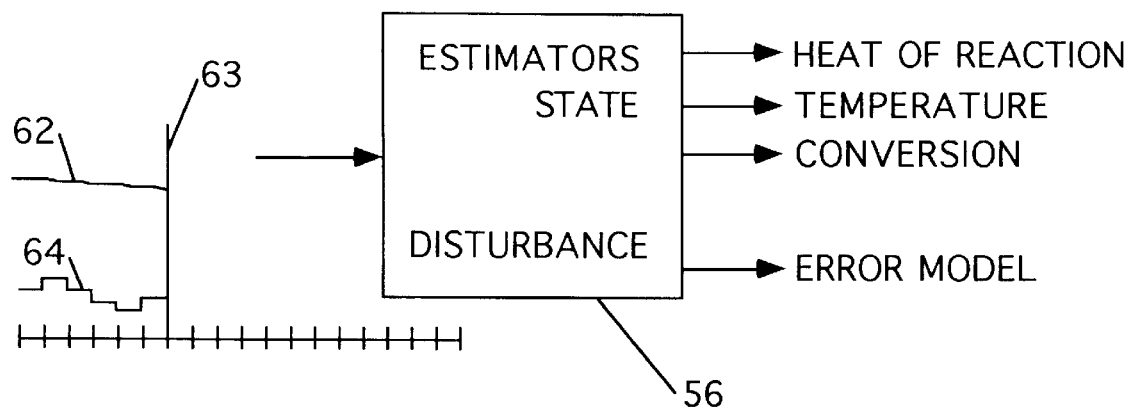
FIGS. 2A–2C provide a diagrammatic illustration of the general sequence of steps taken by the model predictive controller in accordance with the present invention.
Figure 2B:
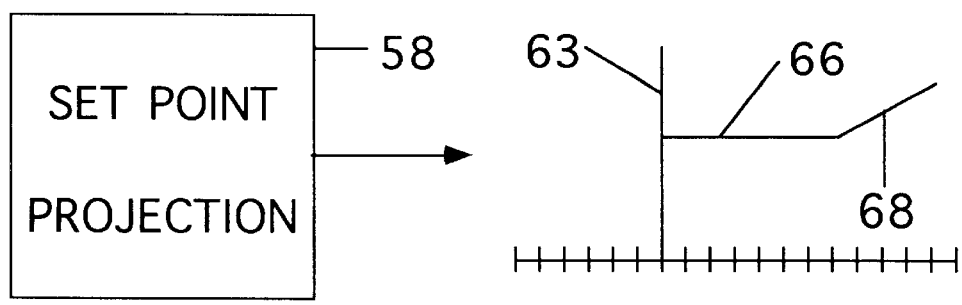
Figure 2C:
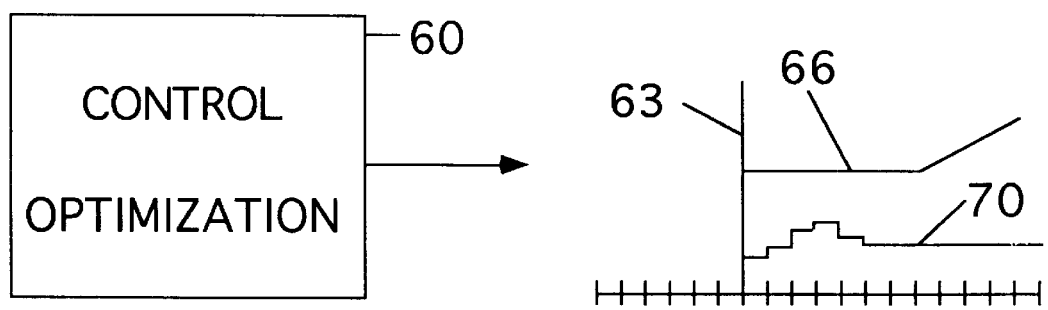

Referring to FIGS. 2A–2C, a diagrammatic illustration of the general sequence of steps taken by the model predictive controller 44 in accordance with the present invention is shown. In this regard, FIG. 2A illustrates the step of state estimation 56, FIG. 2B illustrates the step of set-point projection 58, and FIG. 2C illustrates the step of control optimization 60. In order to provide an estimate of one or more process states (e.g., an unmeasured parameter value), certain existing process information is necessary. In the context of the batch reactor 12, FIG. 2A shows a curve 62 which represents a plot of the temperature within the reactor vessel 14 up to the present time line 63 (i.e., the point at which the last measurement was taken). FIG. 2A also shows a curve 64 which plots the temperature set-point for the reactor jacket 20. This temperature set-point represents the controlled parameter value in this example. With this information, the interactive modeler 48 will determine one or more process states, such as the monomer conversion percentage, the heat of reaction, and a temperature which may be otherwise unmeasured. Additionally, the interactive modeler 48 will also determine the magnitude of the error between the process model 52 and the estimated process state.

Then, as illustrated in FIG. 2B, the executive sequencer 46 will compute the desired future values for the relavent controlled parameters. In terms of the batch reactor 14, the temperature within the reactor vessel 14 will be the controlled parameter of interest, and FIG. 2B also shows a curve 66 which plots this temperature value. The plot of curve 66 also shows a set-point corner 68, which indicates that the reactor temperature should change to a new value at this projected point in time. In this regard, it should be noted that the executive sequencer 46 could employ a look-up table to store the set-point corners for the batch reaction, or use an algorithm which will produce these set-point corners as a function of time. Such an algorithm could provide a fixed set of set-point corners for each batch. Alternatively, it may also be possible for the executive sequencer 48 to be constructed so that this set-point corners will be determined as a function of any disturbance that may have occurred during the reaction process. Additionally, it should be understood that the projection of future set-point corners could be generated by other suitable entities of the process control system 10 in the appropriate application.

With the knowledge of future set-point values for the reaction, the interactive modeler 48 will then proceed to the step of control optimization 60. In this regard, the interactive modeler 48 will determine both a present and future set of manipulated parameter values which will seek to minimize any differences in the magnitude between the projection set-point values and the corresponding controlled parameter values. In the context of the batch reactor 12, the interactive modeler will seek to track and match the future set-points of the reactor temperature with the measured reactor temperature values. Accordingly, FIG. 2C illustrates a curve 70 which plots the present and future temperature set-points for the reactor jacket 20. The "present" temperature set-point in this context means the next temperature set-point which will be implemented by the process control computer 32, assuming that it is validated by both the executive sequencer 46 and the process control computer.

Figure 3:
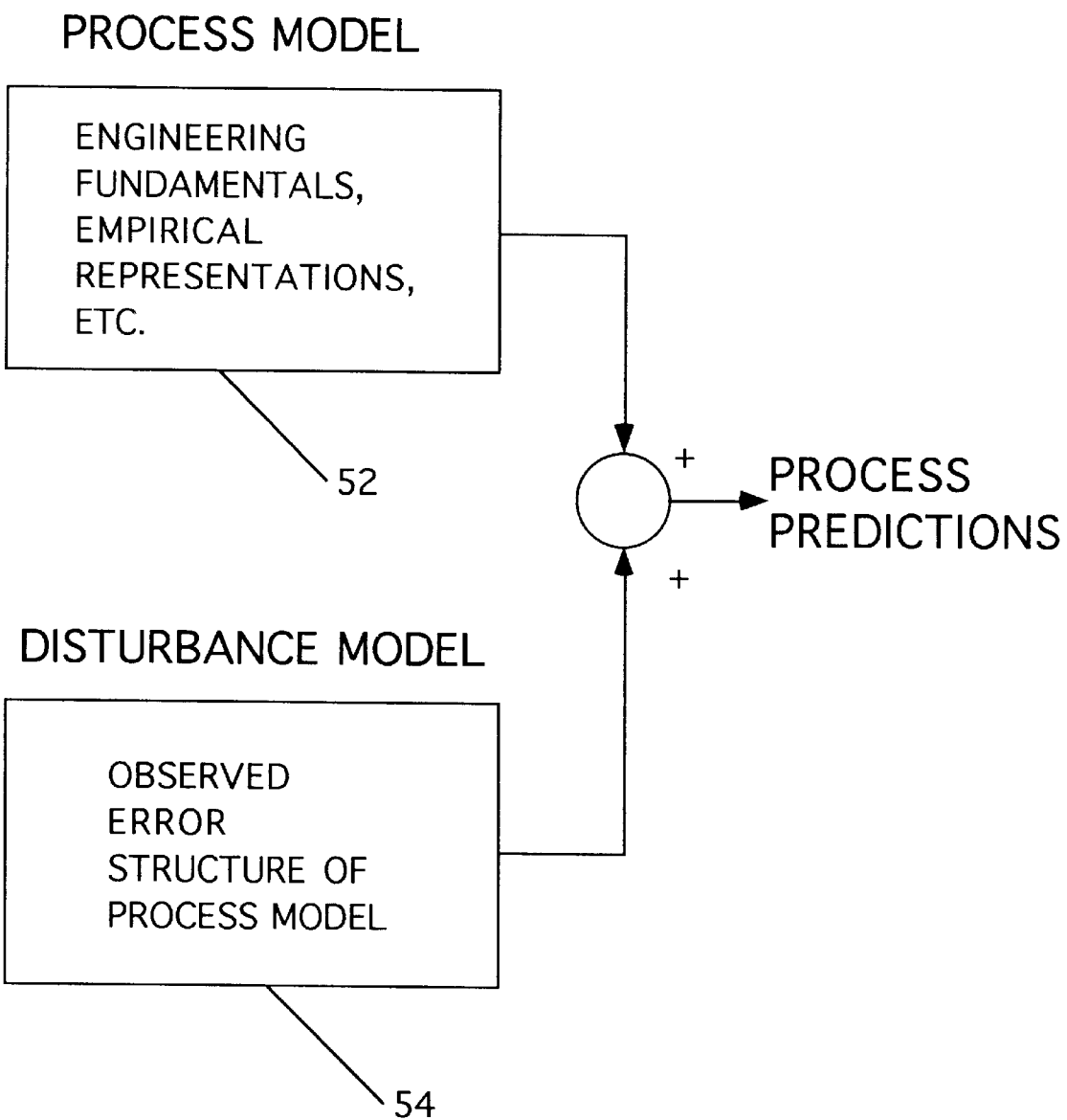
FIG. 3 is a simplified block diagram of how the process and disturbance models are employed in the model predictive controller to determine process predictions.

Referring to FIG. 3, a simplified block diagram is shown of how the process and disturbance models are employed in the model predictive controller 44 to determine process predictions. It should first be noted that model-based process control will only achieve its highest objectives if provisions are made for errors in the process model 52. The model predictive controller 44 addresses this concern in two ways. First, integration of the process model 52 through time is adjusted using feedback which is provided from process measurements through the state estimation step (e.g., using a Kalman filter). Secondly, the disturbance model 54 provides an error model which is independent of the process model 52, and it is used on-line to predict future model error. As shown in FIG. 3, the process model 52 and the disturbance model 54 are combined to form a total model from which future manipulated parameter values will be generated (at intervals commanded by the executive sequencer 46).

Figure 4:
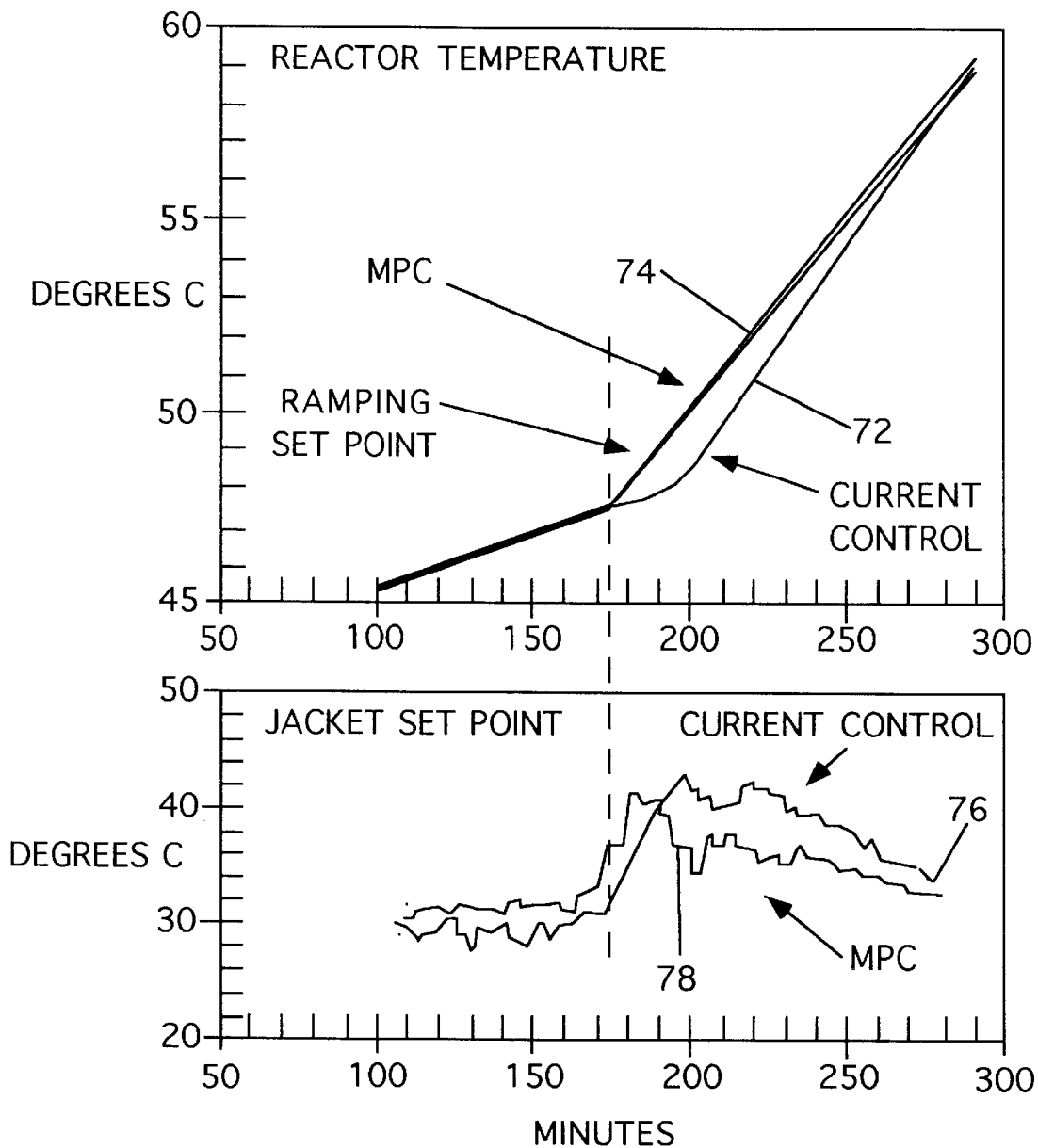
FIG. 4 is a graphical representation of how the model predictive controller may be used to minimize product variability.

The combined power of the process and disturbance model structures in accordance with the present invention may be seen in FIG. 4. FIG. 4 shows how the model predictive controller 44 may be used to minimize product variability, even in the presence of severe process model errors. In this regard, the process model 52 for the batch reactor 14 was constructed such that it made no allowance for the heat of reaction, which becomes substantial once the polymerization reaction is initiated. Curve 72 illustrates how the batch reactor 12 would respond under a current PID control algorithm. More particularly, curve 72 shows that typical PID control has difficulty attempting to match a ramping reactor temperature set-point. This is because normal feedback PID control does not increase the jacket temperature set-point until the change in ramp rate is encountered (curve 76). Changing the jacket temperature at this point in time is too late, and the reactor temperature deviates from its set-point. In contrast, curve 74 shows that the model predictive controller ("MPC") 44 will provide a reactor temperature which follows the ramping set-point temperature much more closely. This is because the model predictive controller 44 will increase the jacket temperature set-point well before the change in ramp rate occurs (curve 78).

Figure 5:
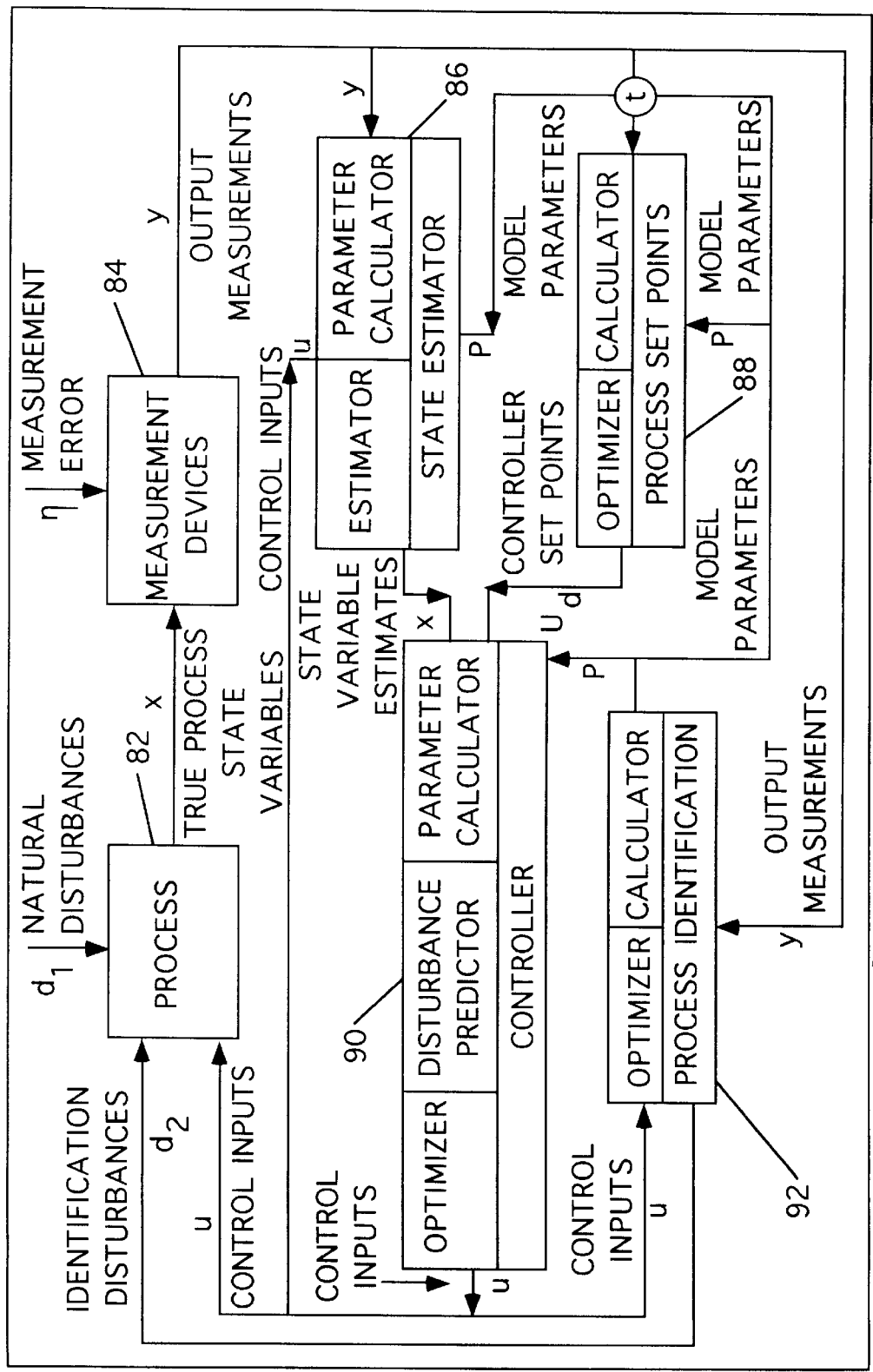
FIG. 5 is an overall block diagram of an advanced process control scheme in accordance with the present invention.

Referring to FIG. 5, an overall block diagram is shown of an advanced process control scheme 80 in accordance with the present invention. The advanced process control scheme 80 provides a comprehensive form of process control which directly uses an explicit model of the process and seeks to optimize some objective function (criteria). FIG. 5 shows that the advanced process control scheme 80 may include the following components:

1. Process 82, which represents the physical system to be controlled. Process inputs include control inputs, natural process disturbances and identification input disturbances. The outputs are the true process state variables which can rarely, if ever, be measured without error.
2. Measurement Devices 84, which represents the mechanical means by which the process outputs are analyzed. The inputs are the true process states and measurement error, producing the output measurements.
3. State Estimator 86, which provides estimates of the process state variables in the presence of measurement error and process disturbances.
4. Process Set Points 88, which specify the current, and sometimes future, controlled variable values that are to be achieved or maintained by adjusting the manipulated variable values.
5. Controller 90, which determines the optimal values of current and future manipulated variable values based on the dynamic model of the process and estimates of process disturbances. The manipulated variable values are determined such that some objective function is satisfied in an optimal manner (maximized or minimized) subject to physical and design constraints. If future manipulated variable values are considered, a Disturbance Predictor is needed to provide reasonable estimates of the evolution of process disturbances into the future (due primarily to plant-model mismatch).
6. Process Identification 92, which determines optimal model parameters for the process model using the process output values.
7. Dynamic Process Model, which predicts the response of the system to past and future control actions. This model must, at a minimum, be representative of the physical system, and optimally, be appropriate, rigorous, and accurate. Although not specifically shown in this particular figure, it should be understood that the dynamic process model is represented by the combination of the process model 52 and the disturbance model 54 in accordance with the present invention. Accordingly, it should be appreciated that the dynamic process model is used by many of the process control scheme components otherwise shown in FIG. 5.

The Dynamic Process Model

The process model 52 is represented as a system of nonlinear algebraic/differential equations (ADEs). These models have the general form

| | |
|---|---|
| $dx/dt = f(x, u(t - t_{d1}), p, l, t)$ | dynamic model equations |
| $g(x, u, p) = 0$ | algebraic model equations |
| $y = h(x(t - t_{d2}), u, p)$ | model state-output relationships |
| $x(t_k) = x_k$ | model initial conditions | where:
x is the vector of state variables
u is the vector of control inputs (manipulated variables)
y is the vector of outputs (model responses)
p is the vector of model parameters
l is the vector of load disturbances The nonlinear functions f, g, and h may have a variety of forms, usually derived from physical relationships (momentum, energy, and material balances). This formulation may also be used for distributed parameter systems that are discretized to form a system of ADEs or ODEs (ordinary differential equations).

The development of mechanistic-based models generally involves an iterative process in which experimental data are collected, a model is proposed, optimal model parameters are estimated, and the goodness of fit of the model examined. In most applications, only an approximate representation of the process is achieved, resulting in mismatch between the model and the plant (i.e., the physical process sought to be controlled). However, this mismatch can be significantly reduced and/or identified if appropriate model development procedures are followed. In this regard, the SimuSolv Reference Guide, Volumes I & II (1990), by Steiner et. al., provides a detailed description of an appropriate model building process and the scientific method. This reference guide, which accompanies the commercially available "SimuSolv" (a trademark of the Dow Chemical Company) modeling and simulation software, is hereby incorporated by reference.

Nonlinear Model Predictive Control Formulation

Figure 6:
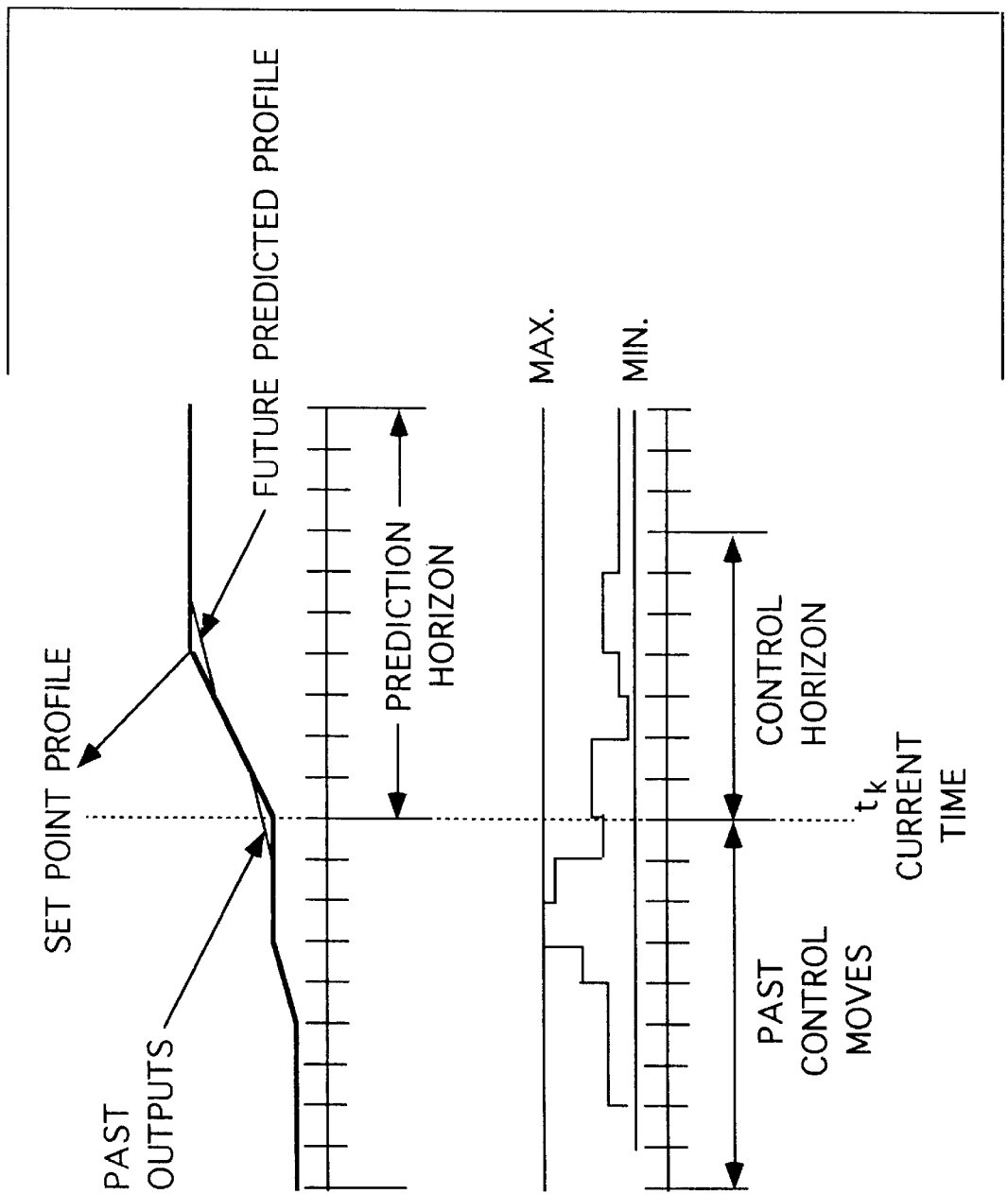
FIG. 6 is a graphical illustration of the method of control optimization in accordance with the present invention.

Nonlinear model predictive control (NMPC) may be characterized as an advanced process control technique in which a "nonlinear" dynamic model is used to predict future process behavior. The dynamic model is used for computing the process responses over a prediction horizon, which is based on the values of the manipulated variables and the current controlled variable values. The values of the manipulated variables are optimized at discrete points throughout a control horizon to minimize the error between the desired set point profile and the predicted outputs. As shown in FIG. 6, the prediction horizon is preferably longer in time than the control horizon. The optimal manipulated variable values for the first sampling period in the prediction horizon are used as the first control move. The prediction horizon is then shifted forward one sampling period and the procedure repeated.

A general mathematical formulation for NMPC may be provided by the following:

$$Mt_k, \overset{Min}{\ldots},$$

$$M(t_k + NS_u)\Phi(u) = \sum_{i=1}^{M} \sum_{j=k}^{k+NS_y(i)} W_y(i,j)\{y_{sp}(i,j) - y_{pred}(i,j)\}^2 +$$

-continued $$\sum_{i=1}^{N} \sum_{j=k}^{k+NS_u(i)} W_{u(i,j)} \{u(i,j) - u(i,j-1)\}^2$$

s.t.  $dx/dt = f(x, u(t-t_{d1}), p, l, t)$     (A)

$g(x, u, p) = O$     (B)

$y = h(x(t-t_{d2}), u, p)$     (C)

$x(t_k) = x_k$     (D)

$x_{min} \leq x(t_i) \leq x_{max}$    $t_i = t_k$ to $t_{k+NSy-max}$   (E)

$y_{min} \leq y(t_i) \leq y_{max}$    $t_i = t_k$ to $t_{k+NSy-max}$   (F)

$u_{min} \leq u(t_i) \leq u_{max}$    $t_i = t_k$ to $t_{k+NSu-max}$   (G)

$|u(t_i) - u(t_{i-1})| \leq \Delta u_{max}$    $t_i = t_k$ to $t_{k+NSu-max}$   (H)

$u(i, t_j) = u(i, t_{k+NSu}(i))$    $t_j \geq t_{k+NSu}(i), i = 1, \ldots, N$   (I)

$t_O \leq t_k < t_{k+NSy-max}$     (J)

Nomenclature

| | |
|---|---|
| f | n-vector of nonlinear dynamic state functions |
| g | $n_i$-vector of algebraic equality constraints |
| h | m-vector of measurement (state-output) equations |
| k | current time step |
| l | l-vector of load disturbances (measured and unmeasured) |
| m | number of measured model response variables |
| n | number of model state variables |
| N | number of manipulated variables |
| $NS_M$ | N-vector of manipulated variable horizon lengths |
| $NS_{u-max}$ | $max(NS_u(i)), i = 1, \ldots, N$ |
| $NS_y$ | m-vector of controller controlled variable horizon lengths |
| $NS_{y-max}$ | $max(NS_y(i)), i = 1, \ldots, m$ |
| p | p-vector of model parameters |
| t | independent variable, time |
| $t_{d1}$ | dead time between manipulated and state variables |
| $t_{d2}$ | dead time between states and measured variables |
| u | $NxNS_{u-max}$ matrix of current and future control variables |
| $U_{max}$ | N-vector of manipulated variable upper bounds |
| $U_{min}$ | N-vector of manipulated variable lower bounds |
| $\Delta u_{max}$ | N-vector of manipulated variable maximum change rates |
| $W_u$ | $NxNS_{u-max}$ matrix of objective function weighting factors for controller movements |
| $W_y$ | $mxNS_{y-max}$ matrix of objective function weighting factors for output residuals |
| x | n-vector of state variables |
| $X_{max}$ | n-vector of state variable upper bounds |
| $X_{min}$ | n-vector of state variable lower bounds |
| y | m-vector of model response variables |
| $y_{max}$ | m-vector of model response variable upper bounds |
| $y_{min}$ | m-vector of model response variable lower bounds |
| $y_{pred}$ | $mxNS_{y-max}$ matrix of predicted model responses |
| $y_{sp}$ | $mxNS_{y-max}$ matrix of model response set points |
| φ | objective function |

The least squares type objective function, Φ (u), is a weighted summation between the desired and predicted process outputs, along with a weighted summation of the changes in the control actions to penalize large control movements. This objective function could be generalized further to include factors such as economics or final condition relationships.

Constraint equations (A)–(D) represent the dynamic process model, defined as a system of nonlinear algebraic/differential equations (ADEs and/or ODEs). Constraint equations (E)–(G) represent physical process constraints, such as acceptable operating limits. Velocity constraints on the control variables are explicitly represented by constraint equation (H). Constraint equation (I) specifies that the values of the control variables beyond the end of their control horizons are constant, and equation (J) requires that time be monotonically increasing.

Several methods are potentially available for solving the nonlinear constrained optimization problem with differential equation equality constraints. The most common class of solution procedure, referred to as sequential methods, solves the control problem as a two-stage procedure. The optimization algorithm iteratively selects new sets of control moves, while a differential equation solver is used to integrate the dynamic model at each iteration. Alteratively, the differential equations could be discretized to a set of algebraic equations using a weighted residual technique. The set of algebraic equations could then be solved at each iteration as in the sequential approach, or added to the optimization problem as a set of equality constraints. This latter approach is described in the article entitled "On the Optimization of Differential-Algebraic Process Systems", AIChE Journal, 33(8), 1989 by Cuthrell and Biegler.

State Estimation

Figure 7:
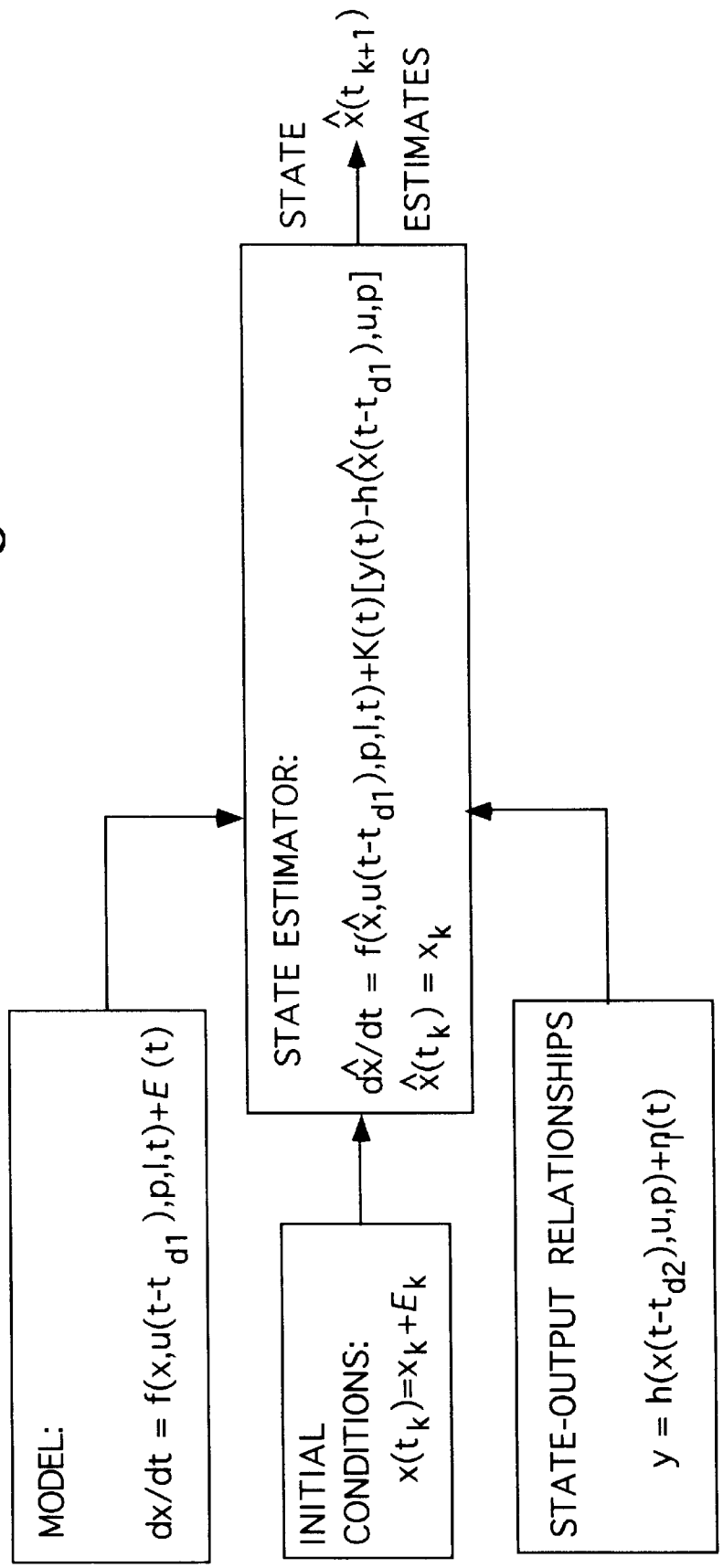
FIG. 7 is a block diagram of the state estimation process.

State estimation techniques are methods for determining the values of the state variables from only a knowledge of the process inputs and outputs. For open-loop unstable systems, state estimation is vital to keep the model state variables and the process states variables from diverging. Sequential techniques continually update the state variable estimates based on current and past process measurements. A schematic of the state estimation process is shown in FIG. 7. If the process model equations are corrupted by noise due to some combination of unknown disturbances, uncertain initial conditions, measurement error, and model error, the resulting model equations are as follows:

$$dx/dt = f(x, u(t-t_{d1}), p, l, t) + \xi(t)$$

$$y = h(x(t-t_{d2}), u, p) + \eta$$

$$x(t_k) = x_k + \xi(tk)$$

The statistics of the noise processes, $\xi(t)$ and $\eta$, are assumed to be known or can be estimated. Standard assumptions for the noise are that $\xi(t_0) \sim (x_0, P_0)$, $\xi(t) \sim (O,Q)$, and $\eta \sim (O,R)$ are white noise processes uncorrelated with each other. The resulting state estimator equation comprises two parts, one arising directly from the process model, and a second feedback term correcting for discrepancies between the actual measurements and the model predictions:

$$d\hat{x}/dt = f(\hat{x}, u(t-t_{d1}), p, l, t) + K(t)[y(t) - h(\hat{x}(t-t_{d2}), u, p)]\hat{x}(t_k) = x_k$$

The magnitude of the feedback correction is controlled by the gain matrix, K(t), which is dependent on the error statistics of the model and measurements. The most widely implemented state estimation technique for nonlinear systems is the Extended Kalman Filter. For a continuous system with discrete measurements, the error covariance and the Kalman gains are computed, in real time, as data becomes available, by integration of the time dependent error covariance equations and model equations (see the nomenclature below):

$$d\hat{x}/dt = f(\hat{x}, u(t-t_{d1}), p, l, t)$$

$$dP/dt = A(\hat{x}, u(t-t_{d1}), p, l, t)P + PA^T(\hat{x}, u(t-t_{d1}), p, l, t) + Q$$

$$\hat{x}(t_0) = x_k \qquad P(t_0) = P_0$$

where $$A(\hat{x}, u(t-t_{d1}), p, l, t) = \frac{\partial f(x, u(t-t_{d1}), p, l, t)}{\partial x}$$

As data become available at time $t_k$, the Kalman gains, the error covariance matrix, and the state variable estimates are updated:

$$K_k = P^-(t_k)H^T(\hat{x}_k^-)[H(\hat{x}_k^-)P^-(t_k)H^T(\hat{x}_k^-) + R]^{-1}$$

$$P(t_k) = [I - K_k H(\hat{x}_k^-)]P^-(t_k)$$

$$\hat{x}_k = \hat{x}_k^- + K_k[y_k - h(\hat{x}_k^-, u_k, p)]$$

where $$H(\hat{x}^-) = \frac{\partial h(x, u, p)}{\partial x}$$

$P^-(t_k), \hat{x}_k^-$ are the estimates of $P(t_k)$ and $\hat{x}_k$, respectively, before measurement updating at time $t_k$ If the trajectory of the states is known a priori, the error covariance and Kalman gains can be computed off-line before the measurements are taken. This estimation technique, referred to as the Fixed Kalman Filter, simplifies the state estimation to updating the states using a constant Kalman gain matrix.

Nomenclature

| | |
|---|---|
| f | n-vector of nonlinear dynamic state functions |
| h | m-vector of measurement (state-output) equations |
| k | current time step |
| K(t) | nxm gain matrix |
| l | l-vector of load disturbances (measured and unmeasured) |
| m | number of measured model response variables |
| n | number of model state variables |
| N | number of manipulated variables |
| P | mxn error covariance matrix |
| p | p-vector of model parameters |
| t | independent variable, time |
| $t_{d1}$ | dead time between manipulated and state variables |
| $t_{d2}$ | dead time between states and measured variables |
| u | $NxNS_{u-max}$ matrix of current and future manipulated variables |
| x | n-vector of state variables |
| $\hat{x}$ | n-vector of state variable estimates (corrected by state estimator) |
| y | m-vector of predicted model responses |
| ξ(t) | n-vector of model errors |
| η(t) | n-vector of output (model response) errors |

Disturbance Prediction

Plant-model mismatch can be caused by a variety of factors, including:

1. Uncertain model parameters
2. Unknown state variables
3. Uncertain initial conditions
4. Unmeasured disturbances
5. Structural errors in the process model
6. Measurement noise To correct for plant-model mismatch, the process model must be modified or enhanced to account for the unknown disturbances and model errors. To account for model error and disturbances that have affected the process, one approach is to incorporate an estimate of the future disturbances into the controller formulation. A simple approach would be to augment the process model with an additive disturbance model over the prediction horizon:

$$d(t_k) = y(t_k) - y_m(t_k)$$

$$Y_{pred}(t_{k+i}) = y_m(t_{k+i}) + d(t_{k+i}), \text{ for } i=1, \ldots, NS_{y-max}$$

where:

d(t) is the model prediction error $y_m(t)$ is the measured plant response y(t) is the model predicted response In order to predict $d(t_{k+i})$, a model of the disturbance process must be developed. The simplest approach is to assume that the future additive disturbances are equal to the current additive disturbance:

$$Y_{pred}(t_{k+i}) = y_m(t_{k+i}) + d(t_k), \text{ for } i=1, \ldots, NS_{y-max}$$

However, experience has shown that the constant disturbance predictor model is not adequate for some industrial applications, resulting in a constant offset from the desired set point. Thus, in accordance with the present invention, a variable estimate of the future disturbances is provided using a window of past disturbances to predict future disturbances. The trajectory of the past and current disturbances are used to update an evolving disturbance model. The disturbance model is a step response model for projecting d(t):

$$d(t_{k+i},j) = \phi ij \, \mu(t_k,j), \text{ for } i=1, \ldots, NS_{y-max} \, j=1, \ldots, m$$

where:

φij is the step response coefficient for $d(t_{k+i},j,)$ $\mu(t_k,j)$ is the magnitude of the step input occurring at time $t_k$ Normalizing this model with respect to the first output disturbance $d(t_{k+1},j)$ results in the following:

$$d(t_{k+i},j) = \beta ij \, \mu(t_k, j), \text{ for } i = 1, \ldots, NS_{y-max}, j = 1, \ldots, m$$

$$\text{where:} \quad \mu(t_k, j) = \phi 1j \, \mu(t_k, j)$$

$$\beta ij = \phi ij / \phi ij$$

In order to use this variable disturbance model (e.g., disturbance model 54), the step response coefficients and inputs are estimated using the following four-step procedure:

1. Construct the set of past disturbance observations, $d(t_k - NS_{y-max},j)$ to $d(t_k,j)$
2. Update the normalized step response coefficients, βij, using the past disturbance observations.
3. Estimate the normalized step input $\mu(t_k,j)$ using the past disturbance observations.
4. Project the disturbances over the prediction horizon.

In step one, the prior disturbance observations are calculated as the difference of the past process measurements and the output of the model integrated through time without the compensation of the state estimator:

$$d(t_k - NS_{y-max+i}, j) = y_m(t_k - NS_{y-max+i}, j) - y_m(t_k - NS_{y-max+1}, j)$$

where:

$$y'_m = \int_{t_k - NS_{y-\max}}^{t_k - NS_{y-\max} + i} f(x, u, p, l, t) dt, \quad x_0 = x(t_k - NS_{y-\max})$$

This approach is motivated by the concept that the future disturbances in the prediction horizon are produced only by model errors that are not corrected by the state estimator.

In step two, a linear model is used to relate the prior disturbance observations:

$$d'_m(t_k - NS_{y-\max+i}, j) = \beta ij \ d'_m(t_k - NS_{y-\max+1}, 1, j), \text{ for } i=1, \ldots, NS_{y-\max}$$
$$j=1, \ldots,$$

Assuming that the coefficients, βij, vary slowly with time and that noise is present in the process measurements, exponentially weighted least squares can be used to estimate the coefficients, βij, using the following relationships:

$$\beta ij(n + 1) = Bij(n) +$$
$$K_j(n + 1)[d(t_k - NSy - \max + i, j) - \beta ij(n) d'_m(t_k - NSy - \max + i, j)]$$

where:

$$K_j(n + 1) = \frac{P_j(n) y'_m(t_k - NS_{y-\max} + 1, j)}{\lambda + y'_m(t_k - NS_{y-\max} + 1, j)^2 P_j(n)}$$

$$P_j(n + 1) = \frac{P_j(n)}{\lambda} \left[ 1 - P_j(n) \frac{y'_m(t_k - NS_{y-\max} + 1, j)^2}{\lambda + y'_m(t_k - NS_{y-\max} + 1, j)^2 P_j(n)} \right]$$

$$0 < \lambda \leq 1$$

In step three, the magnitude of the step response, $\mu'(t_k, j)$, is estimated. Since the best available estimate of the error produced by integrating the model over a future sample period is the most recently measured error, the following approximation is used:

$$\mu'(t_k, j) = d(t_k, j) \text{ for } j=1, \ldots m$$

In step four, the future disturbances are estimated using the step response model, utilizing the step coefficients, βij, and step responses, $\mu'(t_k, j)$ calculated using the previously described expressions. It should be noted that this method is generally only applicable when the controlled variables can be measured directly. However, other methods may also be employed, such as the autoregressive integrating moving average ("ARIMA") method. It is also important to understand that the step response variable disturbance model is independent of the process model. In other words, while the process model will necessary be specific to the physical process being controlled, the disturbance model may be generically applied to a variety of process control applications.

An alternative approach to the additive disturbance model is to extend the Kalman filter, used for state estimation, through the prediction horizon, using the following expressions:

$$\hat{x}(t_{k+i}) = \hat{x}(t_{k+i}) + K(t_{k+i})[y_m(t_k) - y(t_k)] \text{ for } i=1, \ldots, NS_{y-\max}$$

where:

$$\hat{x}^-(t_{k+1-1}) = \int_{t_{k+i-1}}^{t_{k+1}} f(x, u, p, l, t) dt, \quad x_0 = x(t_{k+i-1})$$

The implementation of this approach using a Discrete Kalman Filter for state estimation disturbance prediction is described in "Nonlinear QDMC with Stat Estimation—Formulation and Application to an 'Industrial Challenge' Semi Batch Process", by Gattu and Zafiriou, American Control Conference, Boston Mass. (1991). This conference paper is hereby incorporated by reference. However, it should be noted that this approach is dependent upon the process model.

Nomenclature

| | |
|---|---|
| d | model prediction error |
| f | n-vector of nonlinear dynamic state functions |
| k | current time step |
| K(t) | nxm gain matrix |
| l | l-vector of load disturbances (measured and unmeasured) |
| m | number of measured model response variables |
| n | number of model state variables |
| $NS_y$ | m-vector of model prediction variable horizon lengths (time) |
| $NS_{y-\max}$ | $\max(NS_y(i))$, i = i, . . . , m |
| p | p-vector of model parameters |
| t | independent variable, time |
| u | $NxNS_{u-\max}$ matrix of current and future control variables |
| x | n-vector of state variables |
| $\hat{x}$ | n-vector of state variable estimates (corrected by state estimator) |
| y | m-vector of model response variables |
| $y_m$ | m-vector of measured plant response variables |
| $y_{pred}$ | $mxNS_{y-\max}$ matrix of predicted model responses |

Referring to FIG. 8, an overall block diagram is shown of one embodiment of a model predictive controller software implemented system 100 in accordance with the present invention. In this regard, the MPC executive block 102 corresponds to the functions performed by the executive sequencer 46 of FIG. 1. Similarly, the SimuSolv block 104 corresponds to the functions performed by the interactive modeler 48, and the MOD block 106 corresponds to the functions performed by the process control computer 32.

As indicated above, the process control computer 32 will retain overall control of the process (e.g., the batch reactor 12) through its application program, as represented by the MOD block 106. However, the application program may also be used to direct the operation of the MPC executive software 102. This direction may be achieved by the process control computer 32 keeping the executive sequencer 46 apprised of the step or process control state that it is in (e.g., loading the reactor vessel 14, initiating the procedure for heating the reactor vessel, and so forth). In this way, the executive sequencer 46 will preferably receive the information it needs to keep generally in step with the process control computer 32. The executive sequencer 46 may also provide the process control computer 32 with similar step information, in order to enable a determination to be made that the executive sequencer is functioning in step with the process control computer. As part of this overall procedure, it is preferred that both the process control computer 32 and the executive sequencer 46 each perform a check on the health of the ability to communicate with each other on a periodic basis (e.g., every 15 seconds).

As shown in FIG. 8, there is a GPI ("Global Process Information") block 108, which is interposed between the MPC executive block 108 and the MOD block 106. The GPI block 108 represents a software implementation for a network based process control application. In this regard, the process control computer 32 may be connected to a plant local area network, which will facilitate overall plant operation control. In such an application, the executive sequencer 46 may utilize a GPI network computer to manage communication with the process control computer 32, as well as provide a relational data base ("MRDB") as a way for the operator and a historical data logger to access data generated by the model predictive controller 44. The use of such an interface will also enable certain operator functions to be performed, such as visually displaying flow sheets (block 110), examining a history of parameter values or plant measurement values (block 112), and performing event-driven data routines (block 114).

Additionally, it should be noted that the GPI block 108 may be used as a communication interface for a plurality of model predictive controllers. For example, in an application where a continuous reactor has three separate temperature zones that need to be controlled, three model predictive controllers may be used to minimize the amount of time required to solve the optimization problem for each of these zones. In such an application, the GPI block 108 may be used to pass temperature zone boundry information to each of the independently functioning SimuSolv blocks 104.

The SimuSolv block 104 represents an extended form of the SimuSolv computer program identified above, which includes the capability of running in a real-time environment. As shown in FIG. 8, the SimuSolv block 104 communicates with the MPC executive block 102 through a software layer of a DECnet link. This approach to communication enhances the modularity of the model predictive controller 44, so as to better enable further enhancements. For example, in the appropriate application, the SimuSolv block 104 could be replaced with other potentially suitable modeling, integration and optimization packages, such as SPEEDUP (a Prosys Technology Limited trademark), to perform Dynamic Matrix Control. In this regard, Dynamic Matrix Control ("DMC") represents a form of model-based control which uses a substantially different model type and optimization mechanism than that discussed above.

As will be discussed more fully in connection with FIG. 10, the SimuSolv block 104 is adapted to read a command script which is stored in script file 116. This command script provides a generic interface to define a specific process control problem to be solved by the model predictive controller 44. FIG. 8 also shows a model file 118 which is used to translate the mathematically defined process model into a language that a computer will be able to understand. In one embodiment herein, the Advanced Continuous Simulation Language "ACSL" (a Mitchell and Gauthier Associates, Inc. trademark) is used to create the model file 118. Accordingly, the SimuSolv block 104 will interpret the ACSL based model, as well as read the script file 116 to register the control problem to be solved.

It should also be noted that in this embodiment, the SimuSolv block 104 provides the numerical engine for the model predictive controller 44. In this regard, the SimuSolv block 104 may be used to perform all numerical calculations. The execution of these numerical functions (e.g., state estimation) will be controlled by the MPC executive 102, which directs the sequence of operations for the model predictive controller 44. As part of this process, the MPC executive 102 collects, validates and transmits input data and calculated results between the SimuSolv block 104 and the GPI block 108. The MPC executive 102 is also used to project controlled parameter values (e.g., set-points) for the SimuSolv block 104 over the prediction horizon.

From the above, it should also be appreciated that the MPC executive 102 coordinates the operation of SimuSolv block 104 with the MOD block 106, so as to enable each of them to proceed under their own set of operation sequences. For example, the MPC executive 102 enables the model predictive controller 44 to employ separate sampling and control intervals. In one form of the present invention, the process control computer 32 could be used to read measured parameter values from the input circuits 30 at predetermined intervals (e.g., once per second). Then, selected ones of these measured parameter values may be collected by the executive sequencer 46 at a different interval rate (e.g., once per minute). This sampling rate should be at least ten times faster than the dominant time constant of the process (e.g, the ability to change the internal temperature of the reactor vessel 14). The selected measured parameter values would then be transfered to the interactive modeler 48 in order to enable the SimuSolv block 104 to calculate the current state of one or more unmeasured parameter values. Then, another interval rate may be employed to cause the SimuSolv block 104 to generate an optimized set of manipulated parameter values (e.g., once every four minutes). In this regard, it should be appreciated that it may take a relatively longer period of time for the SimuSolv block 104 to determine the optimized set of manipulated parameter values than it will take to determine current process states.

FIG. 8 also shows the provision of a relational data base 118 which is created off-line. The data base 118 is preferably used to relate the identification of data (e.g., data tags) used in the MOD block 106 to the data identifiers used by the GPI block 108 and the data identifiers used by the SimuSolv block 104. In order to provide a truly modular architecture for the model predictive controller 44, each of the above identified components need to be isolated from each other sufficiently so that they may be replaced without unduly affecting other of these components. Accordingly, each of these system components may employ their own particular ways of identifying the same data parameters or variables. Then, for example, when the MPC executive 102 receives measured parameter values from the GPI block 108, it may reference the data base 118 to determine how to identify this data for the SimuSolv block 104. Thus, it should be appreciated that the SimuSolv block 104 need not know how the data was acquired or what names were used by the MOD block 106 to store this data. The data base 118 may also be used for other data as well, such as recipe dependent data (e.g., set-point profiles). In this way, the memory requirements of the KPC executive 102 may be minimized, such that it holds only the information being passed back and forth between the GPI block 108 and the SimuSolv block 104. The data base 118 may be constructed as the result of a query from an SQL file 120. Additionally, it may be helpful in the appropriate application to provide an MPC problem definition block 122, which could be used to assist the off-line preparation of the script file 116, by referencing the data base 118.

Figure 9A:
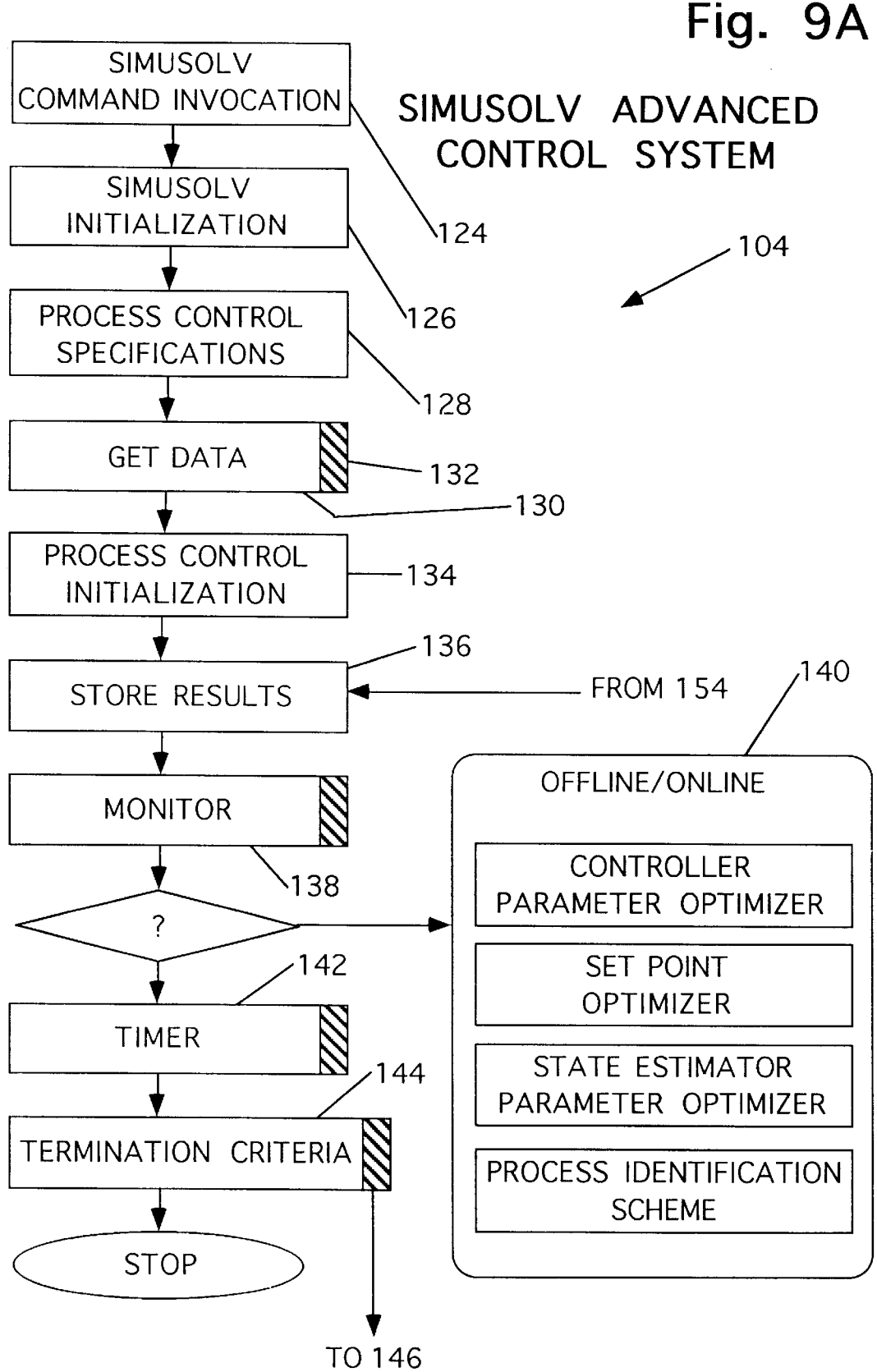
FIG. 9 (comprising FIGS. 9A and 9B) is a block diagram of the SimuSolv block shown in FIG. 8.
Figure 9B:
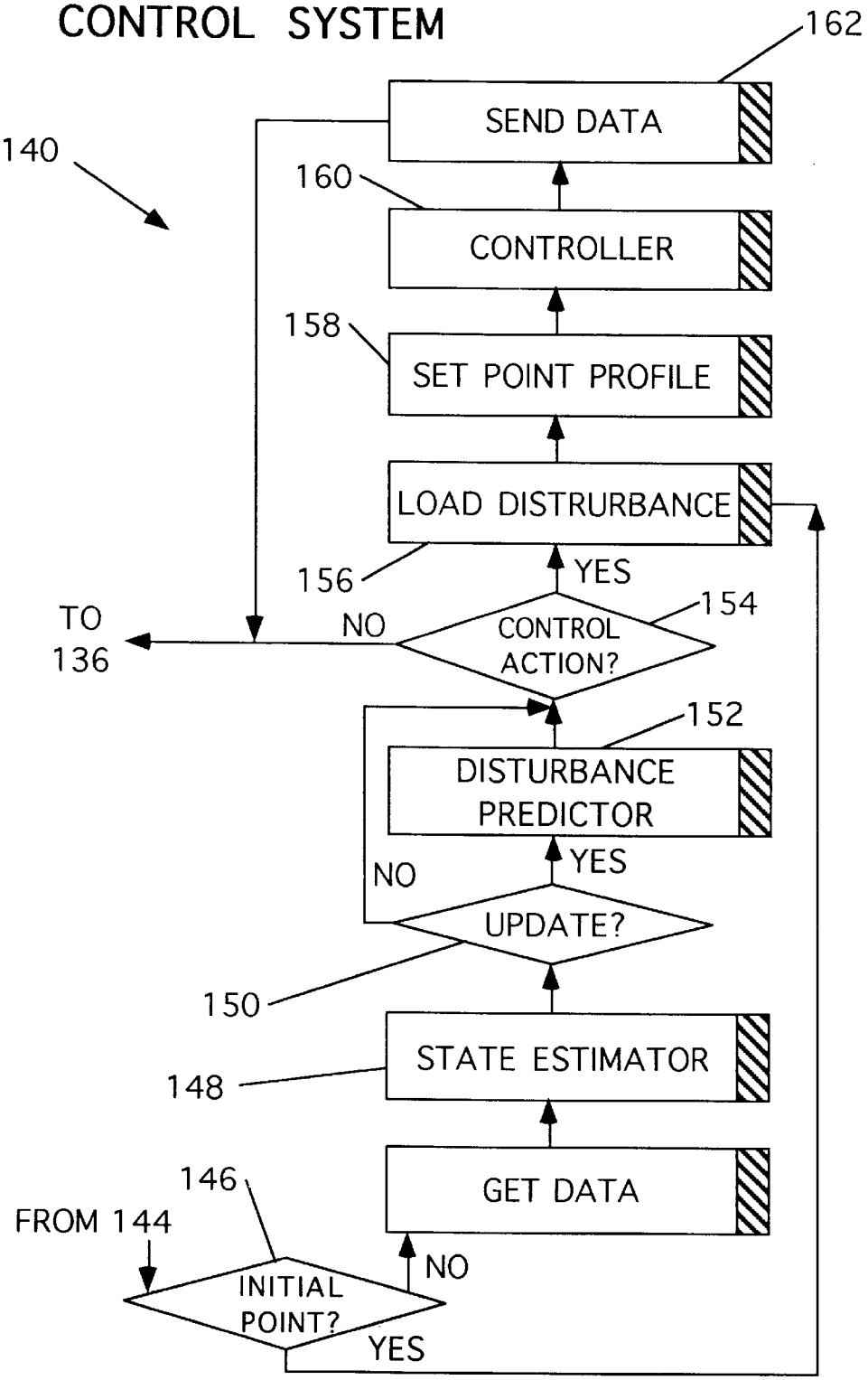

Referring to FIG. 9, an block diagram is shown of the sequence of routines and events during real-time process control using the SimuSolv block 104. Each of the modules shown in FIG. 9 are self-contained, with many of these modules supplying interfaces to user-supplied Fortran subroutines. Such user-supplied subroutines may be employed to replace the functionality of the module, thereby providing an easy way for the user to customize the model predictive controller 44 to any specific application, without changing the executive sequencer 46.

The SimuSolv command invocation module 124 refers to the command that is used to initiate the SimuSolv block 104. The SimuSolv invocation command is an operating-system dependent command (e.g., VAX/VMS) that provides the SimuSolv block 104 with various file specifications and user-supplied options. For example, the invocation command will identify the script file 116 and the model file 118, as well as any optional Fortran files which will be used to replace a default SimuSolv routine.

Then, the SimuSolv initialization module 126 will be executed. SimuSolv initiation is required before any processing within the SimuSolv block 104 can be conducted. By default, the Fortran subroutine SSMAIN in the SimuSolv main program will be called to perform this initialization (e.g., security checking, memory allocation and output file creation). However, the user may optionally replace the default SimuSolv main program which determines which and when the other modules of the SimuSolv block 104 should be called.

Next, the process control specification module 128 will be executed. The purpose of this subroutine is to read and analyze the command script file 116. As will be discussed more fully below, the command script file 116 is based upon a general purpose script, which supports a wide variety of problem formulations, ranging from SISO applications to MIMO inferential control problems. The process control specification module 128 will return a "0" if the translation and syntax analysis was sucessful. If the process control specification module 128 encounters an error in the form or type of calculations requested, then a specific integer value will be returned to identify the error.

Assuming that the analysis of the command script file 116 was successful, then the get data module 130 will be called. The get data module 130 retrieves current process variable values (e.g., measured parameters) from the plant or from a simulation model of the plant process. The get data module 130 includes a general interface which enables the user to customize the data retrieval to any system. This capability is illustrated in FIG. 9 by the hashed block 132. Additionally, the pseudocode for this and many of the other SimuSolv modules discussed herein are illustrated below in Appendix A. However, it should be noted that several of the modules discussed in connection with FIG. 9, such as the get data module 130, are particularly useful for control simulation. As will be apparent from the discussion of FIGS. 11A–11M and 12A–12G, the executive sequencer 46 controls and implements functions, such as the function contained in the get data module.

The process control initialization module 134 is thereafter. The process control initialization module 134 sets the initial conditions for the process model and sets up the controller optimization problem. As with many of these modules, a general interface is provided to allow the user to customize the control initialization process.

The store results module 136 puts user-specified variable values into a binary file which can be accessed by the SimuSolv graphics and output utilities. This binary file may subsequently be used for post analysis of the process control results. As will be appreciated by the discussion below, the SimuSolv block 104 will loop back to the store results module 136 at the appropriate intervals. The monitor module 138 provides, by default, a text-based output of the current values for user specified variables.

At this point, the processing flow of the SimuSolv block 104 may potentially be diverted temporarily to a block of adaptive functions 140. One or more of the adaptive functions 140 may be employed in future process control applications in order to fine tune the operation of the model predictive controller 44 either on-line or off-line. For example, the projection of controlled parameter set-points may be optimized to compensate for plant disturbances. In this regard, the process model 52 may be used to predict one or more characteristics of the finished product (e.g., the percentage conversion of monomer). Then, the procedure used for control optimization would then be employed to modify the set-point profile in order to achieve a specific criteria (e.g., a 99% conversion of monomer). Similarly, various parameters used in the model predictive controller 44 could be modified as a result of past performance or current plant disturbances, such as the Kalman filter gains or objective function weights. In this regard, it should be understood that such modifications could be performed on-line without necessarily modifying the command script file 116 or the model file 118. More specifically, a suitable operator station, such as the operator workstation 111 in FIG. 8, may be employed to make these changes during the running of the process. These changes could then be transmitted to the model predictive controller 46 through either the MOD block 106 or the GPI block 108. However, these changes could also be made off-line and stored for use during future process runs. For example, changes in one or more of these parameters with time may be stored even in the MOD block 106 along with other recipe information. Additionally, the process model 52 may be updated on-line in the appropriate application by causing a change in the value of a variable used in the set of equations which define the process model. For example, the MPC executive 102 could issue a command to the SimuSolv block 104 between batches to update the process model 52 as a result of process information received during the last batch run.

A timer module 142 is also provided to pause the SimuSolv system, so that the processing of information is performed at a user-specified rate. The timer module 142 provides the ability to support both real-time and simulated process control applications with the same executive sequencer 46. For example, the timer routine 142 enables the user to specify a processing rate that is faster or slower than real-time for simulation purposes. The termination criteria module 144 determines if control of the process should be stopped and the control loop exited.

Assuming that the control loop is not to be terminated at this point, then the SimuSolv block 104 will determine whether this is the initial point in the model predictive controller process (diamond 146). If the answer is yes, then the state estimation and disturbance prediction steps will be bypassed. Otherwise, the SimuSolv block 104 will proceed to call the get data module 130 again. Once the measured parameter values have been acquired, then the state estimator module 148 will be called. As discussed above, the state estimation procedure approximates the values of the process state variables in the presence of unknown process disturbances, uncertain initial conditions, measurement error and process model error. These state estimation techniques incorporate feedback from the process (e.g., measured parameter values) to keep the model state variable and the actual process state variable values from diverging.

Then, a decision may be made as to whether the estimate of future process disturbances should be updated (diamond 150). Assuming that this step is not to be bypassed, then the disturbance predictor module 152 will be called. As discussed above, a variable disturbance prediction procedure is employed over the entire prediction horizon. The process model response variable values may then be augmented with these estimated disturbance during the procedure for determining an optimal set of manipulated parameter values, in order to achieve offset-free tracking of the preferred set-point profile.

Diamond 154 indicates that the control loop may be directed back to the store results module 136 when it is not time to decide any potentially new control actions. However, assuming that the executive sequencer 46 has issued a command for the SimuSolv block 104 to perform control optimization, then the load disturbance module 156 will be called. The load disturbance module 156 is used to update future known process disturbances and event time values.

Then, the set-point profile module 158 will be called to specify the values of selected controlled variables over future prediction horizons. The set-point profiles may be pre-specified in the control script 116, or provided incrementally by the user using a general interface. Additionally, as discussed above in connection the adaptive functions block 140, these set-point profiles may be optimized on-line.

With all of the necessary control information now known or estimated, the controller module 160 will be called. The controller module 160 determines the optimal values of the current, and sometimes future, manipulated parameter values. While a nonlinear model predictive control ("NMPC") strategy is employed in the embodiment discussed herein, a general interface is nevertheless employed to allow user-specified controller techniques to be supplied.

Finally, the send data module 162 will be called in order to transfer at least the current controlled variable values to the plant or to a simulation model. At this point, the SimuSolv block 104 will return to the store results module 136 in order to continue the control loop for the next cycle.

Figure 10A:
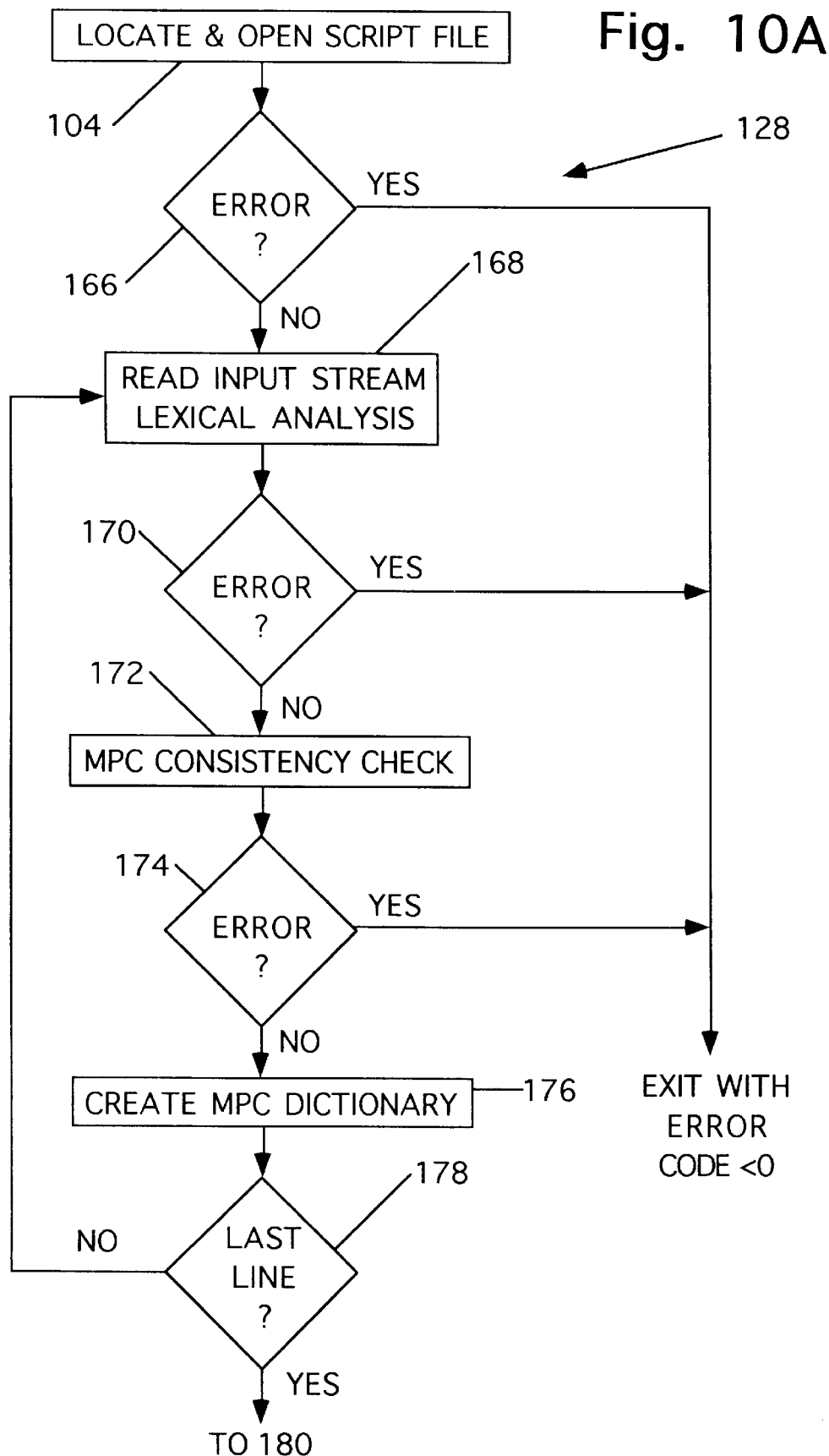
FIG. 10 provides a flow chart of the process control specifications module shown in FIG. 9.
Figure 10B:
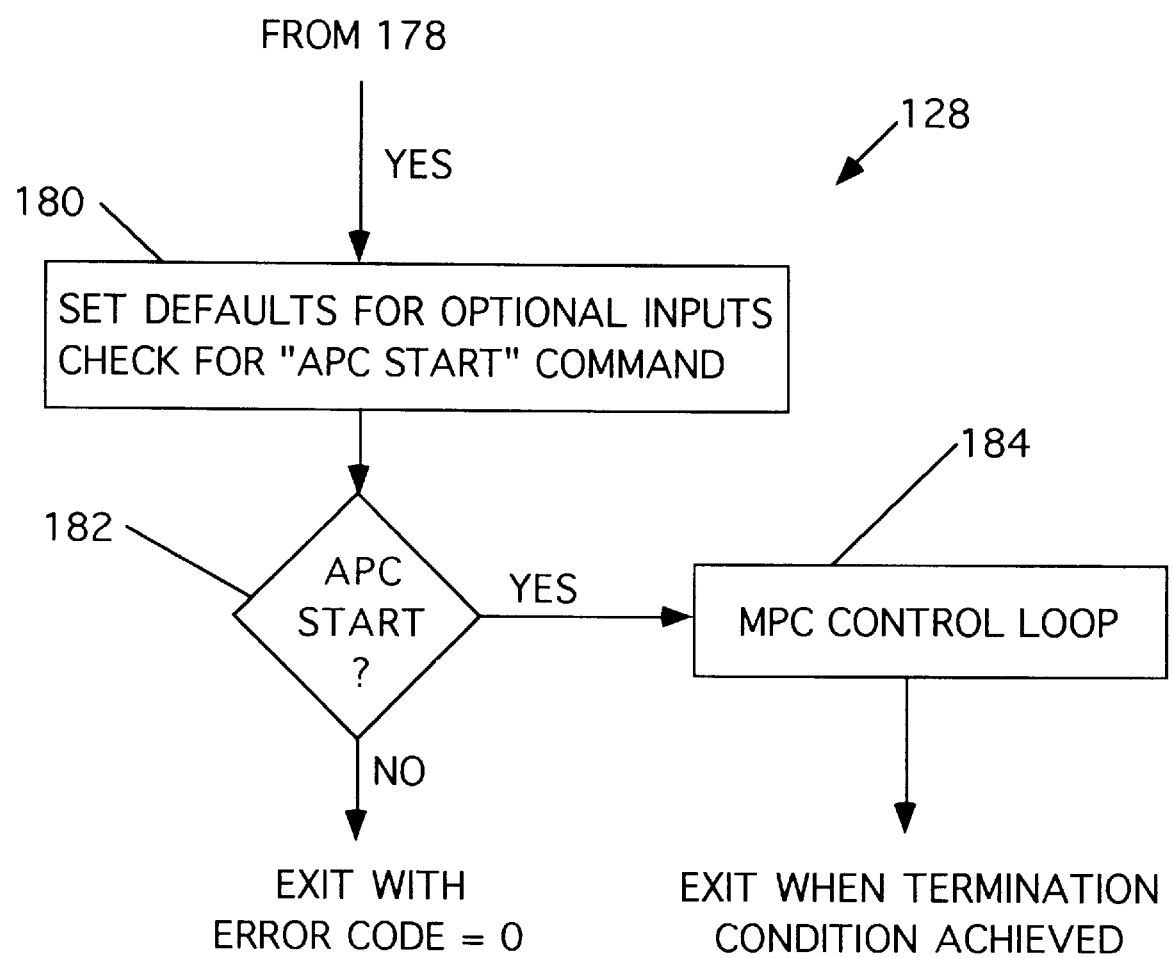

Referring to FIG. 10, a flow chart of the process control specifications module 128 is shown. As an initial step (block 164), the command script file 116 is identified (the name of which has been supplied as input), located, and opened. This script file contains a series of commands that defines a specific control application. In the event that this step encounters an error (diamond 166), then this subroutine will exit with an error code that will assist in identifying the error.

Next, the script file 116 will be scanned one line (referred to as an input stream) at a time, as shown by block 168. This action, called parsing, works by calling a low-level input scanner. The low-level input scanner, called a lexical analyzer, picks up items from the input stream. The selected items are known as tokens. Tokens are compared to the input construct rules, called grammar rules for the SimuSolv block 104. If a violation of one of the grammar rules is identified, scanning is halted and the subroutine is exited with an error code indicating the nature of the violation (diamond 170).

In the next step (block 172), the input stream, which is grammatically correct, is further checked to make sure it makes sense from a model predictive control standpoint. That is, as the script is read, problem definition information obtained from previously input lines is used to make sure that the information currently being input is consistent and complete. For example, if the name of a model variable has been defined previously as a state variable, it can not be also defined as a measured disturbance variable. If an incorrect, inconsistent or incomplete input is identified, processing is halted and the subroutine is exited with an error code indicating the violation (diamond 174).

Then, the input stream information, which is grammatically correct and consistent from a model predictive control standpoint, is appended to the end of the SimuSolv User Dictionary (block 176). New variables are created to describe and store the input stream information. Storing this information as part of the SimuSolv User Dictionary provides the user with direct access to all the process control information. In particular, the user has read and write access to the variable values and read access to the variable names. Then, a check is made to determine if the current input stream information was the last line in the script file (diamond 178). If this was not the last line, the subroutine will jump to block 168 in order to read the next line.

Assuming that all of the script file lines have been read, then optional input streams which were not received are given their default values (block 180). If the last command before the 'END' statement in the process control script file is 'APC START' (diamond 182), the main SimuSolv program is called to immediately begin controlling the process (block 184). This option is generally intended for process control simulations, rather than actual real-time control. If the 'APC START' command is not entered, the subroutine is exited and the error code is set to zero (successful return).

The general format of the process control command script is shown below in Table I. While this type of command script is preferred, it should be understood that other types of suitable model predictive controller commands could be employed in the appropriate application. After the command script of Table I is described, then a specific example of a command script will be set forth using the batch reactor 12 of FIG. 1.

TABLE I

PROCESS CONTROL $$\begin{bmatrix} \text{State Variables} \\ \quad \text{Names v [v]} \ldots \\ \quad \text{Initial Conditions v} = [v = rc] \ldots \\ \text{End} \end{bmatrix}$$

MEASURED PROCESS VARIABLES
    Names v {v} . . .
    [Sample Intervals rc [rc] . . . ]
End
MEASURED DISTURBANCE VARIABLES
    Names v {v} . . .
    [Sample Intervals rc [rc] . . . ]
End
MANIPULATED VARIABLES
    Names v {v} . . .
    [Sample Intervals rc [rc] . . . ]

$$\left[ \text{Dead Time Type} = \left\{ \frac{\text{None}}{\text{System}} \right\} \right]$$

[Dead Times rc [rc] . . . ]

TABLE I-continued

End
CONTROLLED VARIABLES
  Names v [v] . . .
End
PLANT DATA $$\left[ Speed = \left\{ \begin{array}{c} Simulation \\ \hline Real\,Time \\ User \end{array} \right\} \right]$$

$$\left[ Source = \left\{ \begin{array}{c} Simulation \\ \hline Real\,Time \\ User \end{array} \right\} \right]$$

Tags v = plant_v [v = plant_v] . . .
Set Point Tags v = plant_v [v = plant_v] . . .
[Sample Interval = rc]

$$\left[ Time\,Units = \left\{ \begin{array}{c} Seconds \\ \hline Minutes \\ Hours \end{array} \right\} \right]$$

End
CONTROLLER $$\left[ Type = \left\{ \frac{Nmpc}{User} \right\} \right]$$

[Period = ic]
Prediction Horixons v = rc [v = rc]
Predicion Intervals v = rc [v = rc]
Control Horizons v = rc [v = rc]
Control Intervals v = rc [v = rc]
Objective Weights v = rc [rc] . . . [v = rc [rc] . . .]
[Control Change Rates v = rc [rc] . . . [v = rc [rc] . . ]
[Lower Bounds v = rc [v = rc] ]
Upper Bounds v = rc [v = rc]
[Equality Bounds v = rc [v = rc]]

$$\left[ Objective\,Function\,Method = \left\{ \frac{System}{User} \right\} \right]$$

$$\left[ \begin{array}{l} Optimizer \\ \left[ Method = \left\{ \begin{array}{c} Grg \\ \hline Search \\ User \end{array} \right\} \right] \\ \left[ Diff = \left\{ \frac{Forward}{Central} \right\} \right] \\ \left[ Print = \left\{ \begin{array}{c} None \\ \hline Final \\ Initial \\ Improve \\ Full \end{array} \right\} \right] \\ [Delta = rc] \\ [Maxit = ic] \end{array} \right]$$

End
SET POINT PROFILES $$\left[ Type = \left\{ \begin{array}{c} System \\ \hline Real\,Time\,User \\ \text{'filename'} \end{array} \right\} \right]$$

$$\left[ Time\,Type = \left\{ \frac{Absolute}{Relative} \right\} \right]$$

TABLE I-continued $$\left\{\begin{array}{l}\left[\begin{array}{l}\text{Initial Times } v = rc\,[v = rc]\ldots\\ \text{Time Intervals } v = rc\,[v = rc]\ldots\end{array}\right]\\ \text{Time Profiles } v = rc\,[rc]\ldots[v = rc[rc]\ldots]\end{array}\right\}$$

Profiles $v = rc\,[rc]\ldots[v = rc\,[rc]\ldots]\ldots$
End $$\left[\begin{array}{l}\text{STATE ESTIMATOR}\\ \left[\text{Type} = \left\{\begin{array}{l}\text{None}\\ \text{Fixed Kalman Filter}\\ \text{Extended Kalman Filter}\\ \text{User}\end{array}\right\}\right]\\ \left[\begin{array}{lllll}\text{State Covariance Matrix}\\ & \text{State-1} & \text{state-2} & \ldots & \text{state-n}\\ \text{state-1} & rc & rc & \ldots & rc\\ \text{state-2} & rc & rc & \ldots & rc\\ \ldots & \ldots & \ldots & \ldots & \ldots\\ \text{state-n} & rc & rc & \ldots & rc\end{array}\right]\\ \left[\begin{array}{lllll}\text{Gain Matrix}\\ & \text{response-1} & \text{response-2} & \ldots & \text{response-m}\\ \text{state-1} & rc & rc & \ldots & rc\\ \text{state-2} & rc & rc & \ldots & rc\\ \ldots & \ldots & \ldots & \ldots & \ldots\\ \text{state-n} & rc & rc & \ldots & rc\end{array}\right]\\ \quad[\text{Estimator Lower Bounds } v = rc\,[vc = rc]\ldots]\\ \quad[\text{Estimator Upper Bounds } v = rc\,[v = rc]\ldots]\\ \text{End}\end{array}\right]$$

$$\left[\begin{array}{l}\text{DISTURBANCE PREDICTOR}\\ \left[\text{Type} = \left\{\begin{array}{l}\text{None}\\ \text{Constant}\\ \text{Variable}\\ \text{Kalman Filter}\\ \text{User}\end{array}\right\}\right]\\ [\text{Variable Lambda } v = rc\,[v = rc]\ldots]\\ [\text{Variable Scaling Factors } v = rc\,[b = rc]\ldots]\\ \text{End}\end{array}\right]$$

$$\left[\begin{array}{l}\text{LOAD DISTURBANCES}\\ \text{Type} = \left\{\begin{array}{l}\text{System}\\ \text{Real Time}\\ \text{User}\end{array}\right\}\\ \left\{\begin{array}{l}\left[\begin{array}{l}\text{Future Parameters } v\,[v]\ldots\\ \text{Maximum Future Events } = ic\end{array}\right]\\ [\text{Events } t = rc\ v = rc\,[v = rc]\ldots[t = rc\ v = rc\,[v = rc]\ldots]]\end{array}\right\}\\ \text{End}\end{array}\right]$$

TABLE I-continued $$\begin{bmatrix} \text{SIMULATOR} \\ \text{Type } \{\frac{\text{System}}{\text{User}}\} \\ \text{[Initial Conditions } v = rc\,[v = rc]\ldots] \\ \text{[Parameters } v = rc\,[v = rc]\ldots] \\ \left[\text{Response Noise } v = \begin{Bmatrix} R \\ A \end{Bmatrix} \text{GAUSS(rc, [rc])} \left[ v = \begin{Bmatrix} R \\ A \end{Bmatrix} \text{GAUSS(rc, [rc])}\right]\ldots\right] \\ \text{[Control Deadtimes } v = rc\,[v = rc]\ldots] \\ \text{[Events } t = rc\ v = rc\,[v = rc]\ldots[t = rc\ v = rc\,[v = rc]\ldots]\ldots] \\ \text{End} \end{bmatrix}$$

TERMINATION CRITERIA $$\left[\text{Type} = \{\frac{\text{System}}{\text{User}}\}\right]$$

Equal $v = rc\,[v = rc]\ldots$
Lower $v = rc\,[v = rc]\ldots$
Upper $v = rc\,[v = rc]\ldots$
END $$\begin{bmatrix} \text{RESULTS} \\ \left[\text{Monitor} = \begin{Bmatrix} \text{System} \\ \text{User} \\ \text{None} \end{Bmatrix}\right] \\ \text{[Prepare } v\,[v]\ldots] \\ \text{[Output } v\,[v]\ldots] \\ \text{[Save Output 'filename']} \\ \text{[Debug Output Device = ic]} \\ \text{End} \end{bmatrix}$$

'The following commands can be input in any order, and from outside the command script.'

$$\begin{bmatrix} \text{APC Debug} \begin{Bmatrix} \text{Initialization} \\ \text{Get Data} \\ \text{Store Results} \\ \text{Monitor} \\ \text{Timer} \\ \text{Termination Criteria} \\ \text{State Estimator} \\ \text{Disturbance Predictor} \\ \text{Set Point Profiles} \\ \text{Controller} \\ \text{Send Data} \end{Bmatrix} \end{bmatrix}$$

$$\begin{bmatrix} \text{APC Nodebug} \begin{Bmatrix} \text{Initialization} \\ \text{Get Data} \\ \text{Store Results} \\ \text{Monitor} \\ \text{Timer} \\ \text{Termination Criteria} \\ \text{State Estimator} \\ \text{Disturbance Predictor} \\ \text{Set Point Profiles} \\ \text{Controller} \\ \text{Send Data} \end{Bmatrix} \end{bmatrix}$$

[APC Start]
End

Where:

TABLE I-continued

| | |
|---|---|
| v | Is a SimuSolv variable |
| rc | Is a real constant |
| [ ] | Indicates optinional inputs |
| { } | List of items - one must be selected |
| . . . | Indicates optional additional items |
| plant_v | Is an external plant variable name |
| state-1 | Is a SimuSolv state variable |
| response-1 | Is a measured response variable |

From the above table, it should be apparent that each instructional command or sub-command is paired with an END statement. The instructional command "PROCESS Control" is used to delimit the specification and invocation of a process control application. "State Variables" is an optional process control sub-command to identify the state variables, along with their initial condition names and values. In most cases, the state variables and their initial conditions are explicitly defined in the model file 118. However, there are two types of model formulations which would need this optional definition, namely when algebraic expressions are used to define a state variable rather than a differential expression, and when the system is defined by a set of time-dependent algebraic equations.

"Measured Process Variables" is a sub-command which is used to identify the measured process variable names and their associated sample intervals (e.g., the reactor jacket input and output temperatures). "Measured Disturbance Variables" is an optional sub-command which is used to identify measured disturbance variable names and their associated sample intervals. Measured disturbance variables are used to update corresponding variables in the process model 52. In the context of the batch reactor 12, the measured disturbance variables may be comprised of the fluid flow rate through the reactor jacket 20 and the speed of the agitator 18.

"Manipulated Variables" is the sub-command which identifies the manipulated variable names and their associated sample intervals and dead times. Manipulated variables are the variables which are adjusted by the model predictive controller 44 to achieve the desired product output, such as the temperature set-point of the reactor jacket 20. The dead times constant represents the delay that affects the result sought to be achieved by a control move. For example, if the dead time on a manipulated variable is 10 minutes, then the control move (i.e., a set-point change) will not be realized in the process until 10 minutes later. "Controlled Variables" is the sub-command which identifies controlled variable names (e.g., the internal temperature of the reactor vessel 14).

"Plant Data" is the sub-command which is used to identify the source of the plant data, plant data variable names, the plant sample interval, and the speed of the controller(i.e., the rate at which the process calculations are to be controlled). The source of the plant data may be derived from a control simulation model, a user-supplied subroutine, or the real-time (i.e., time-stamped) data received from the executive sequencer 46. "Tags" represents the identity of SimuSolv variable names and the corresponding plant tag names for all measured plant variables, including time.

"Controller" is the sub-command used to specify the options for the optimizing controller in the interactive modeler 48. For example, the nonlinear model predictive control (NMPC) formulation may be selected, or a user-supplied subroutine may be called. "Period" specifies the number of plant data samples between controller calculations. Additionally, it should be noted that the Prediction Horizons and Prediction Intervals may be separately specified for each of the controlled variables. Similarly, the Control Horizons and Control Intervals may be separately specified for each of the manipulated variables. The maximum rates of change may be specified for the manipulated variables.

Furthermore, the upper and lower bounds for the manipulated variables may also be specified. These bounds or limits should be enforced throughout the prediction horizons at the points where step changes are made to manipulated variables (assuming that the manipulated variables remain constant between step changes). These limits may be the same or different from the upper and/or lower limits separately employed by the executive sequencer 46 and the process control computer 32 to determine whether the manipulated parameter values are reasonable or valid. While the interactive modeler 48 will transmit an error message to the executive sequencer 46 when one of its upper or lower bounds have been exceeded, the executive sequencer 46 may be used to independently evaluate whether these or other bounds were exceeded. Similarly, the process control computer 32 will also preferably compare the values of the manipulated parameters that are received from the executive sequencer 46 to independently determine whether these values are reasonable.

It should also be noted that the "Controller" sub-command enables an alternative selection of the optimizer method to be employed. While the generalized reduced gradient ("GRG") method may be used as a default, the Nelder-Mead direct search ("SEARCH") method or a user-supplied method may also be selected.

"Set Point Profiles" is the sub-command used to specify the set-point profile for each controlled variable. Again, a choice is available as to the source of the set-point profile. If a set-point is needed between defined time profile points, linear interpolation may be used to calculate the set-point value.

"State Estimator" is the sub-command used to specify the type of state estimation calculation. When the extended Kalman filter is selected, then the initial values for the state covariance matrix may also be specified. Additionally, the upper and/or lower bounds of the state variable values may also be specified. If the value outside these bounds is calculated by the state estimator, then the state variable value will be set to the upper or lower limit which was exceeded.

"Disturbance Predictor" is the sub-command used to identify the type of disturbance predictor for controller prediction methods. The selection of "Constant" causes a constant value to be used throughout the prediction horizon, and the selection of "Kalman Filter" causes the Kalman filter to be extended throughout the prediction horizon. However, when "Variable" is selected, a variable estimated of future disturbances is calculated using a window of past disturbances, as discussed above. When a variable disturbance model has been selected in accordance with the present invention, the "Variable Lambda" sub-command may also be utilized to specify a forgetting factor (0 to 1.0) for each SimuSolv prediction variable that is measured.

"Load Disturbances" is the optional sub-command used to specify future load disturbances. In this regard, the source of the disturbance values may be specified, as well as the time that the disturbance values should be modified. These disturbance values are incorporated into the process model, at the appropriate times, during process control calculations.

"Simulator" is the sub-command that is used to specify a particular simulation model. Such a simulation model of the plant process may be used to help develop or fine tune the model predictive controller 44 off-line. In this regard, it should be noted that "Response Noise" may be specified to incorporate random noise into the measured parameter values.

"Termination Criteria" is the sub-command used to identify the conditions at which the control of the process through the model predictive controller 44 should stop. For example, the time of reaction and/or the percentage conversion of monomer could be evaluated at discrete intervals for this purpose. The "Results" sub-command specifies the variables to be output during process control and the file names used to store the process control specifications and intermediated results. "APC Debug" is an optional sub-command for specifying verbose output during process control. In this regard, verbose output may be reported to the system operator before and after each of the modules in the SimuSolv block 104. Conversely, the "APC Nodebug" sub-command may be used to suppress verbose output.

In Table II below, an example of a command script is shown for the batch reactor 12 of FIG. 1. This command script includes state estimation, variable disturbance prediction, and measurement noise as well. Even in the case where the process model does not account for a heat of reaction term, this command script will enable the model predictive controller 44 to accurately track a temperature set-point profile for the internal temperature of the reactor vessel 14. This is because feedback information is provided through the state estimator and the variable disturbance predictor to enable the model predictive controller 44 to adjust for plant-model mismatch. In this regard, it should be again noted that the variable disturbance predictor does not update or modify the process model 52. Rather, an estimate of the future disturbances (i.e., plant-model mismatch) is incorporated into the controller objective function during the optimization of future set-points for the manipulated variable. Accordingly, it should be understood that the variable disturbance predictor is capable of accurately predicting the growth of plant-model mismatch into the future.

The following definitions are provided to further identify selected terms used in the command script of Table II:

State Variables:

| | |
|---|---|
| TJIN = | input temperature of the reactor jacket |
| TJOUT = | output temperature of the reactor jacket |
| RTEMP = | reactor temperature after lag |
| RINT = | internal reactor temperature |
| CONV = | percentage conversion of monomer |
| CINIT = | initiator concentration |

Measured Process Variables:

| | |
|---|---|
| TJIMEA = | jacket input temperature from sensor 26 |
| TJOMEA = | jacket output temperature from sensor 28 |
| RTMEAS = | reactor temperature from sensor 22 |

Measured Disturbance Variables:

| | |
|---|---|
| FLOWJ = | jacket recirculation rate from sensor 24 |

Manipulated Variables:

| | |
|---|---|
| JSETPT = | jacket temperature set-point |

Controlled Variables:

| | |
|---|---|
| RTMEAS = | predicted reactor temperature |

Simulator:

| | |
|---|---|
| QEST = | estimation of the reaction rate |
| QON = | ON/OFF flag used in the process model during calculation of the rate of change for the reactor internal temperature (QRXN) |

TABLE II

```
PROCESS CONTROL
    STATE VARIABLES
        NAMES = TJIN TJOUT RTEMP RINT CONV CINIT
        INITIAL CONDITIONS  TJIN0 = 20.0   TJOUT0 = 20.0   RTEMP0 = 20.0
                            RINT0 = 20.0   CONV0 = 0.05    INIT0 = 0.001223
    END
    MEASURED PROCESS VARIABLES
        NAMES = TJIMEA TJOMEA RTMEAS
    END
    MEASURED DISTURBANCE VARIABLES
        NAMES = FLOWJ
    END
    MANIPULATED VARIABLES
        NAMES = JSETPT
    END
    CONTROLLED VARIABLE
        NAME = RTMEAS
    END
    PLANT DATA
        SPEED   = SIMULATION
        SOURCE  = SIMULATION
        TAGS        TIME    = TAG001   TJIMEA  = TAG002
                    TJOMEA  = TAG003   RTMEAS  = TAG004
                    JSETPT  = TAG005   FLOWJ   = TAG006
        SET POINT TAGS    JSETPT = TAG005
```

TABLE II-continued

```
        SAMPLE INTERVAL   = 1.0
        TIME UNITS        = MINUTES
    END
    CONTROLLER
        TYPE = NMPC
        PERIOD = 4
        PREDICTION HORIZONS    RTMEAS =  35.0
        PREDICTION INTERVALS   RTMEAS =  5.0
        CONTROL HORIZONS       JSETPT =  30.0
        CONTROL INTERVALS      JSETPT =  6.0
        OBJECTIVE WEIGHTS      RTMEAS =  0.0 3.0 4.0 5.0 6.0 7.0
                               JSETPT =  0.1 0.1 0.1 0.1 0.1 0.1
        LOWER BOUNDS           JSETPT =  15.0
        UPPER BOUNDS           JSETPT =  100.0
    END
    SET POINT PROFILE
        TYPE       = SYSTEM
        TIME TYPE  = ABSOLUTE
        TIME PROFILE   RTMEAS =  0.0 72.0 640.0 700.0 950.0
        PROFILE        RTMEAS = 31.0 35.0  47.0  63.0  70.0
    END
    STATE ESTIMATOR
        TYPE = FIXED KALMAN FILTER
        GAIN MATRIX
                  TJIMEA   TJOMEA   RTMEAS
            TJIN   0.999    0.0      0.0
            TJOUT  0.0      0.999    0.0
            RINT  -0.013    0.0139   1.8515
            RTEMP  0.0      0.0      0.995
            QEST  -0.0001   0.0008   0.1724
            CONV   0.0      0.0      0.0
            CINIT  0.0      0.0      0.0
    END
    DISTURBANCE PREDICTOR
        TYPE = VARIABLE
        VARIABLE LAMBDA              RTMEAS = .99
        VARIABLE SCALING FACTORS     RTMEAS = 0.0
    END
    SIMULATOR
        TYPE = SYSTEM
        INITIAL CONDITIONS  TIME = 0.0
                            TJIN = 20.0   TJOUT = 20.0   RTEMP = 20.0
                            RINT = 20.0   CONV  = 0.05   CINIT = 0.001223
                            QEST = 0.0
        PARAMETERS          QON = 0.0
        RESPONSE NOISE      RTMEAS   = AGAUSS(1.0,0.0)
                            FLOWJ    = RGAUSS(1.0,0.0)
                            TJIMEA   = AGAUSS(2.0,0.0)
                            TJOMEA   = RGAUSS(1.0,0.0)
    END
    TERMINATION CRITERIA
        EQUAL TIME  = 950.0
        UPPER TIME  = 950.0
    END
    RESULTS
        MONITOR = SYSTEM
        PREPARE TIME SSPTV  RTMEAS  JSETPT  SSFSPV  QRXN
    END
END
```

Referring to FIGS. 11A–11M, a set of transformation graphs is shown to illustrate the flow of data through the model predictive controller 44. The conventions used for the transformation graphs are generally as follows. The solid lines represent the flow data, while the dashed lines represent of commands. For example, in FIG. 11A, the solid lines show the flow of data into, out of and through the executive sequencer 46. Similarly, the dashed lines show the flow of commands internally to the executive sequencer. Additionally, the solid circles in the transformation graphs represent processes or operations which are performed on the data, while the dashed circle represents the central controlling process. Furthermore, a set of two equal, parallel lines represents a data file. During the description of the transformation graph shown in FIG. 11A, reference will also be made to a set of state transition diagrams. These state transition diagrams are shown in FIGS. 12A–12G to illustrate the sequencing operations which are implemented by the executive sequencer 46.

Figure 11A:
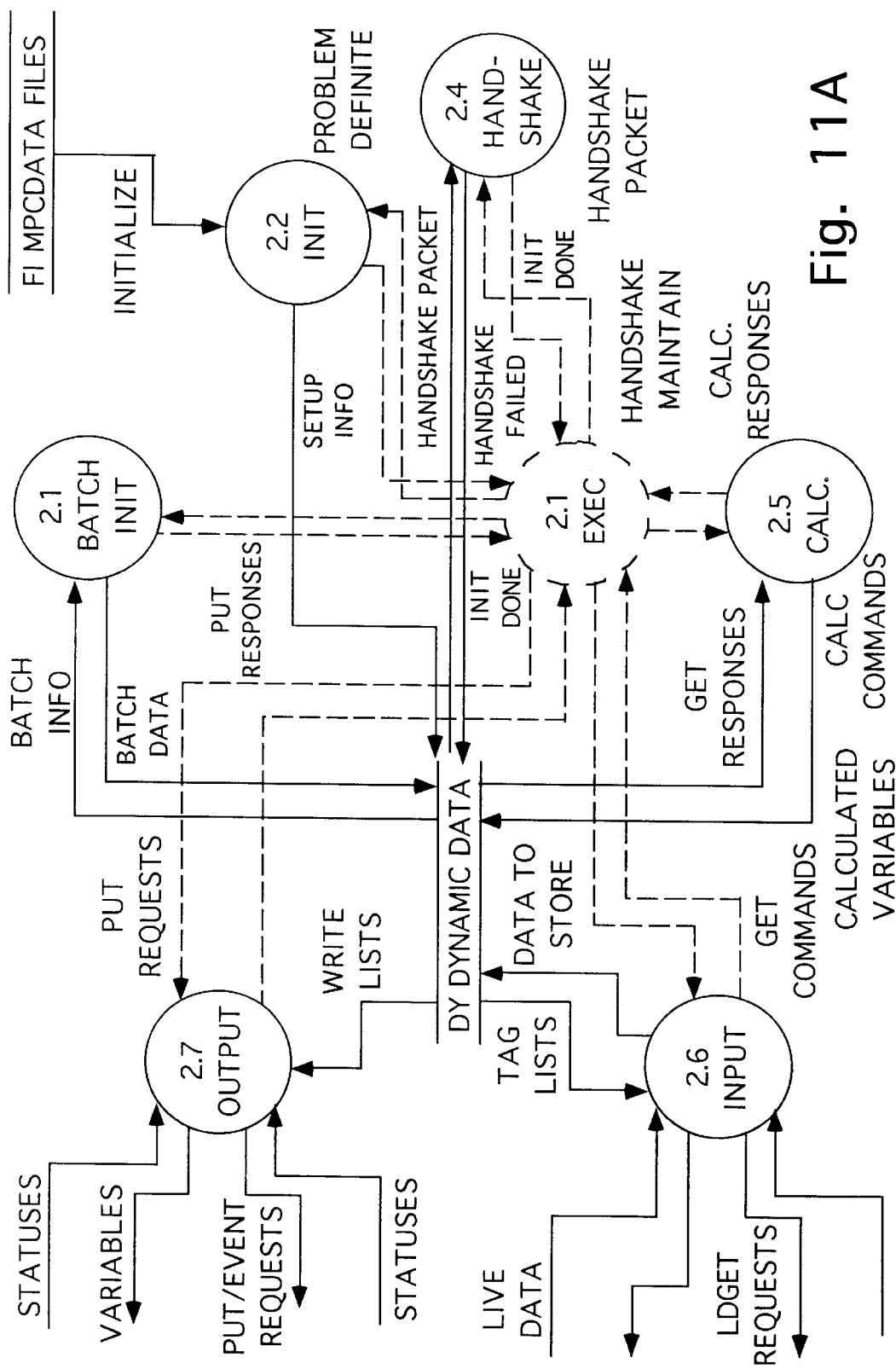
FIGS. 11A–11M provide a set of transformation graphs which illustrates the flow of data through the executive sequencer of the model predictive controller.

Referring first to FIG. 11A, transformation graph 2.0 shows the structure and flow of the executive sequencer 46 during real-time operations. Most of the processes illustration in transformation graph 2.0 will be shown in more detail through one or more of the other transformation graphs or state transition diagrams included in the figures hereto. For example, the central Executive process 2.1 is shown in more detail through the state transition diagrams of FIGS. 12A–12G, while the System Initialization process 2.2 is shown in more detail through the transformation graphs of FIGS. 11B–11C.

The central Executive process 2.1 is responsible for the overall coordination of the real-time operations executed by the model predictive controller 44. In this regard, the Executive process 2.1 is responsible for sequencing the model predictive controller 44 through the process control problem. While the discussion of the executive sequencer 46 below is specifically in reference to a batch reactor control problem, it should be appreciated that the executive sequencer may be readily configured for other suitable proces control problems.

As generally shown in FIG. 11A, the executive sequencer 46 will perform two separate initialization routines. First, the model predictive controller system must be initialized (System Initialization process 2.2), and then a batch-specific initialization will be performed for each batch run (Batch Initialization process 2.3). Then, the executive sequencer 46 will proceed to control the sequencing of the steps discussed above for determining process states and optimizing future set-points. In this regard, FIG. 12A shows the sequence of states that the Executive process 2.1 will go through to direct the overall operation the model predictive controller.

Figure 11B:
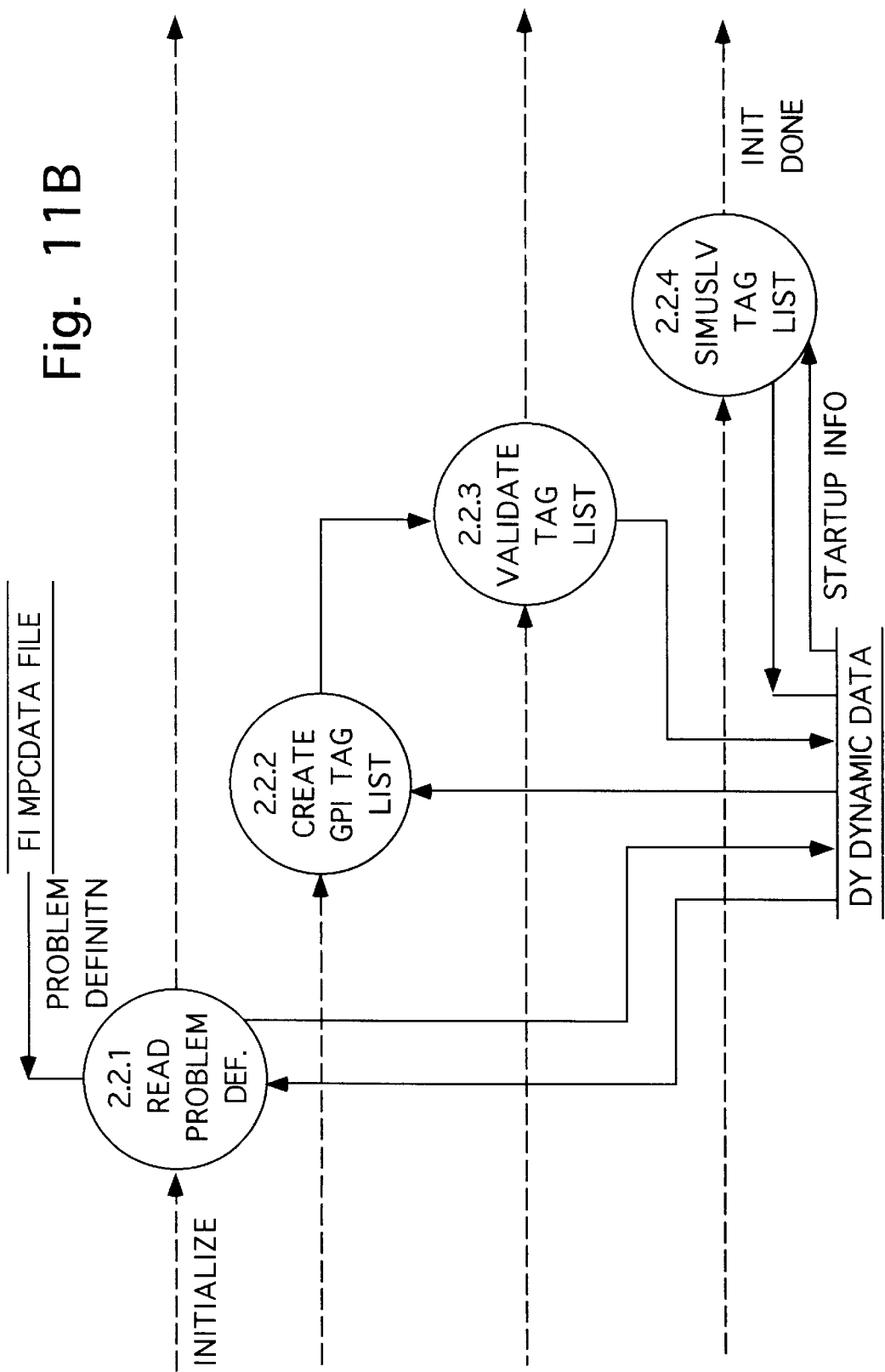
Figure 11C:
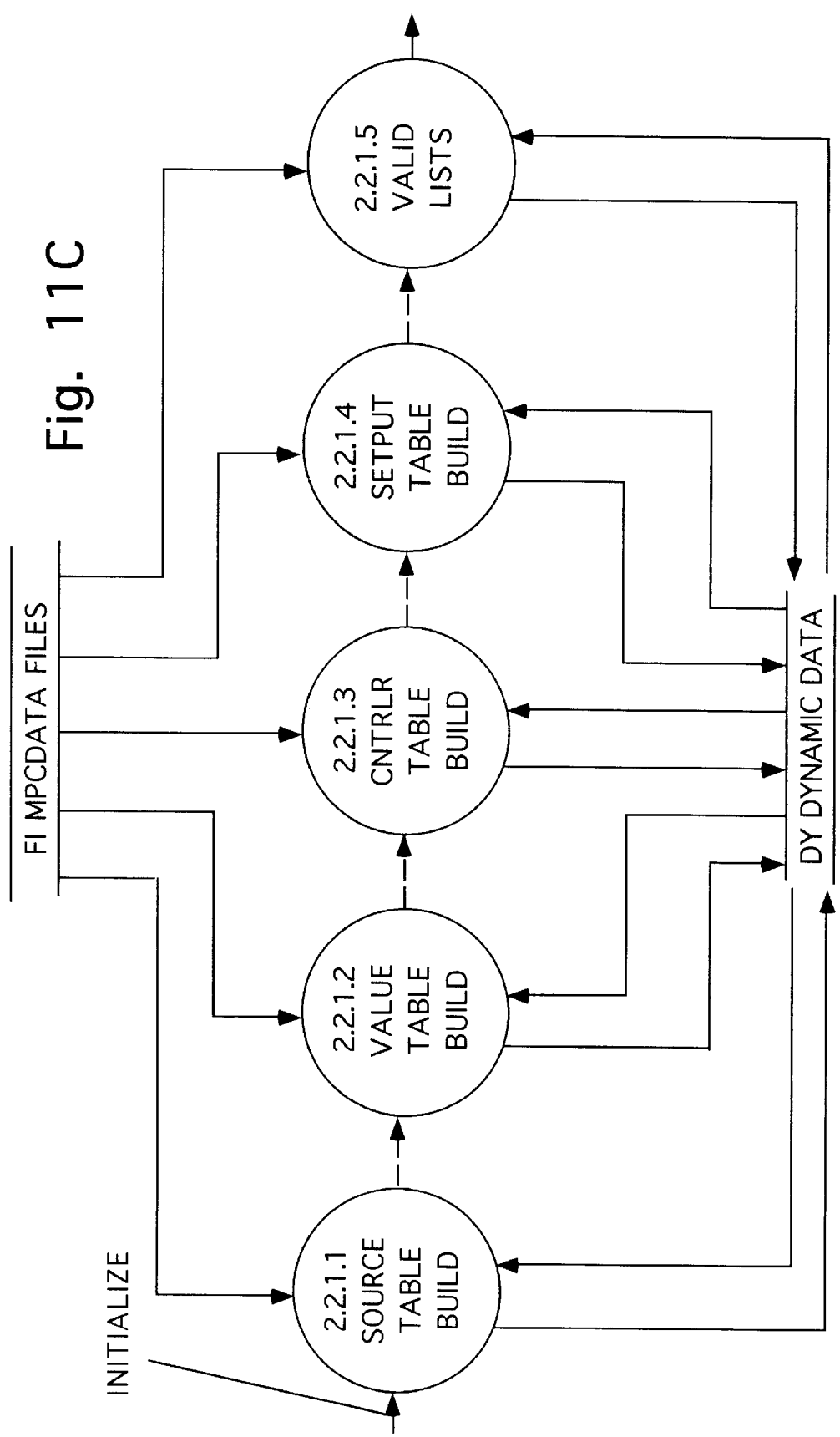
Figure 11D:
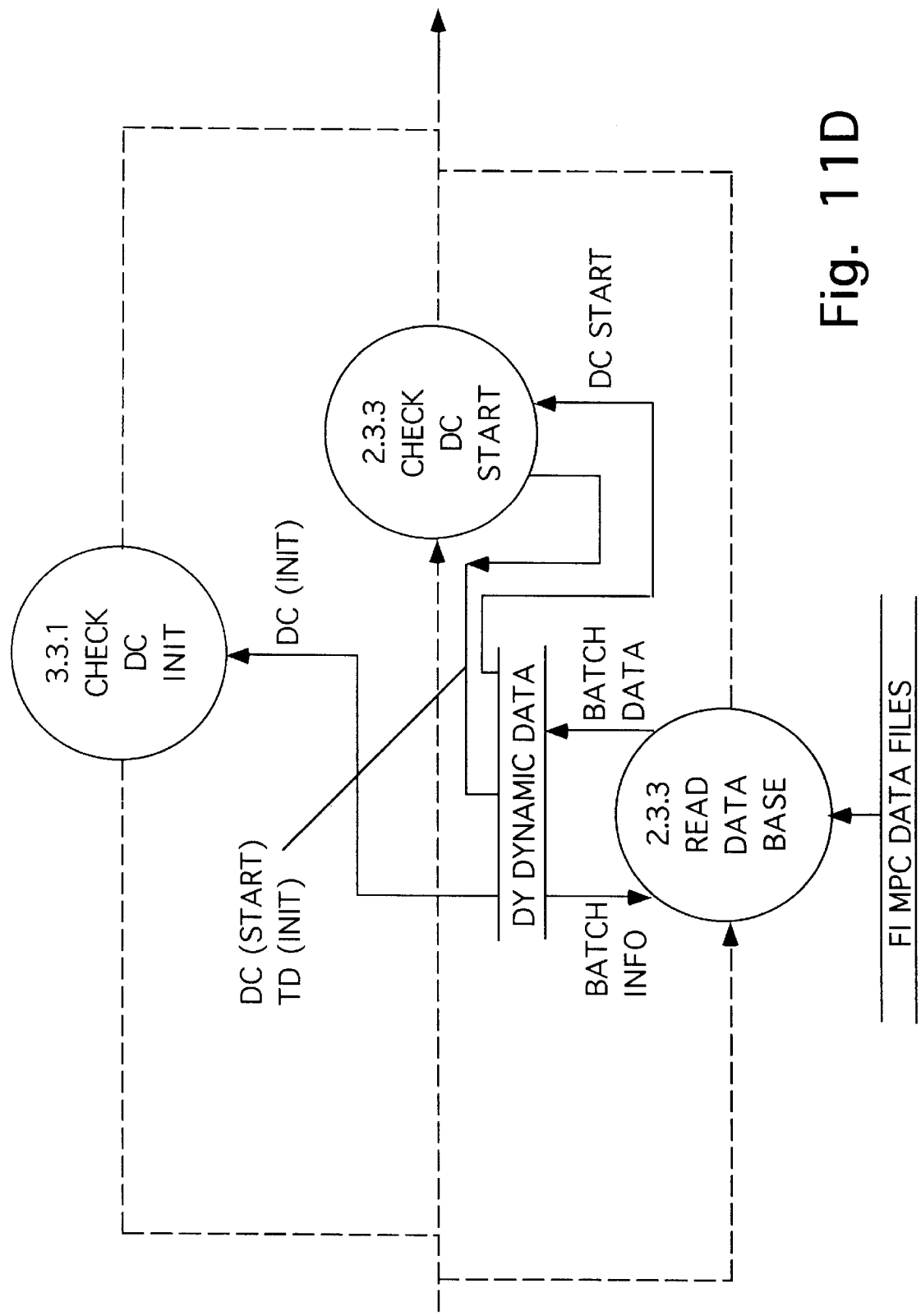
Figure 12A:
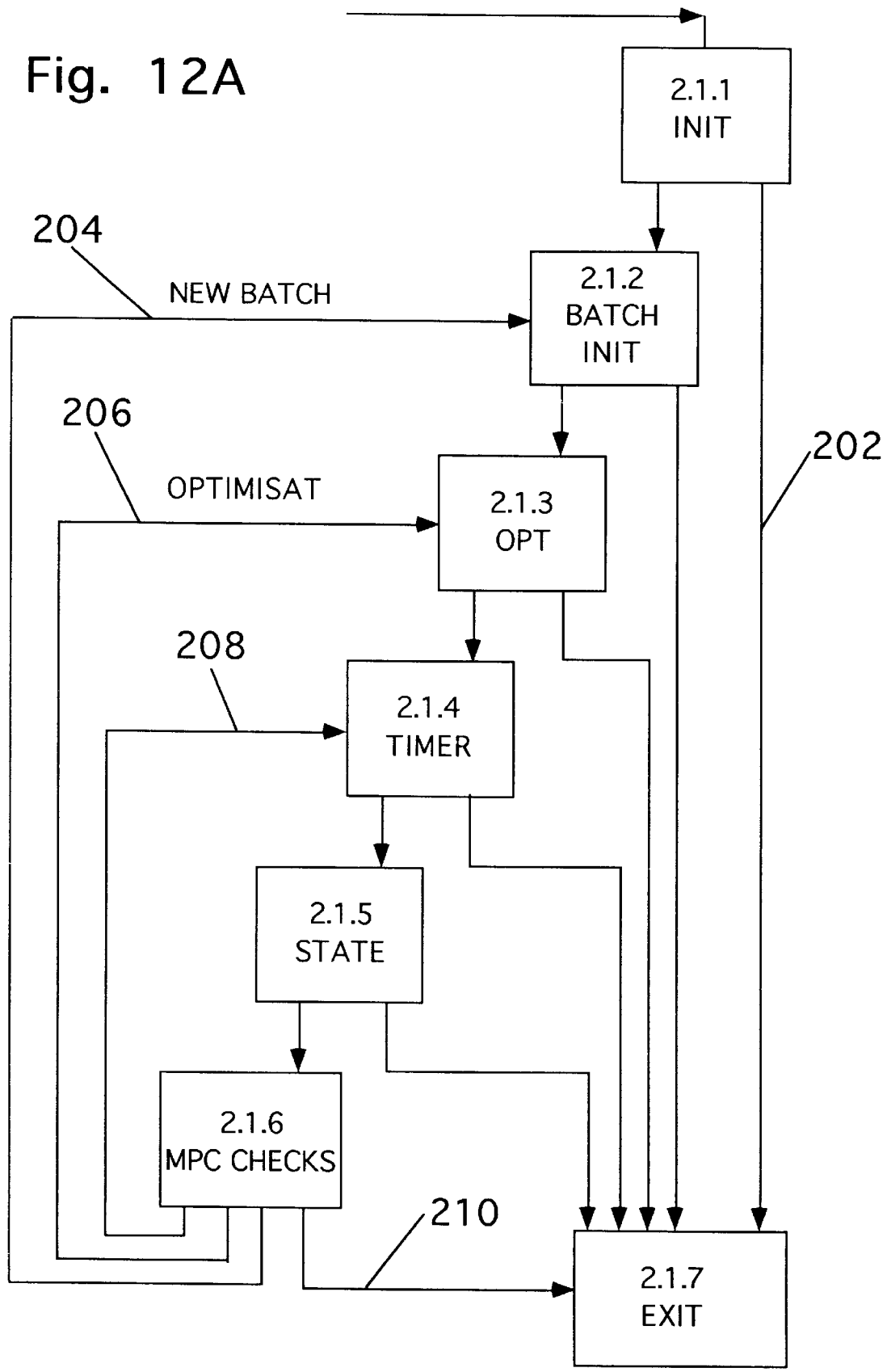
FIGS. 12A–12G provide a set of state transition diagrams which illustrates the sequencing implemented by the executive sequencer.
Figure 12B:
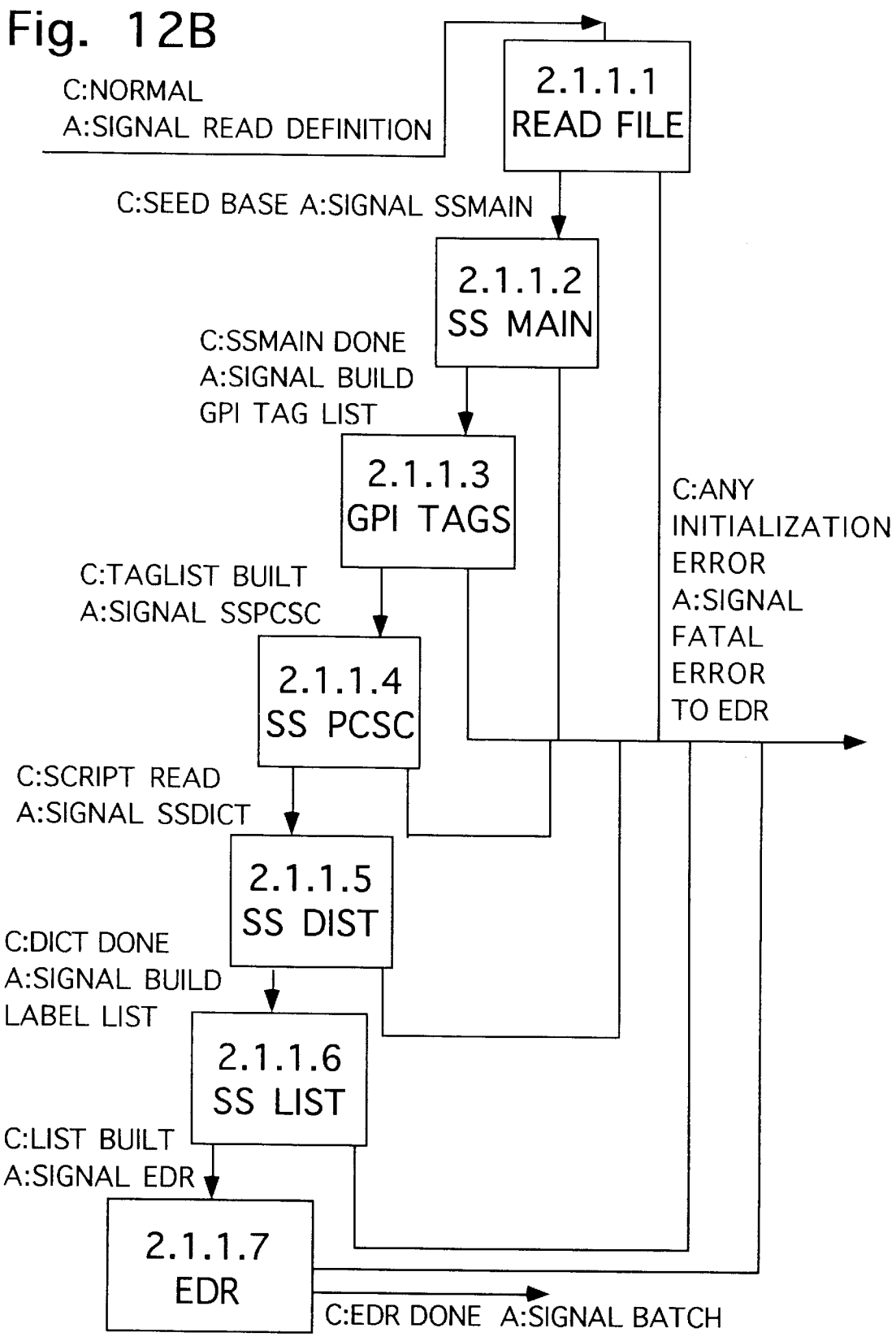
Figure 12C:
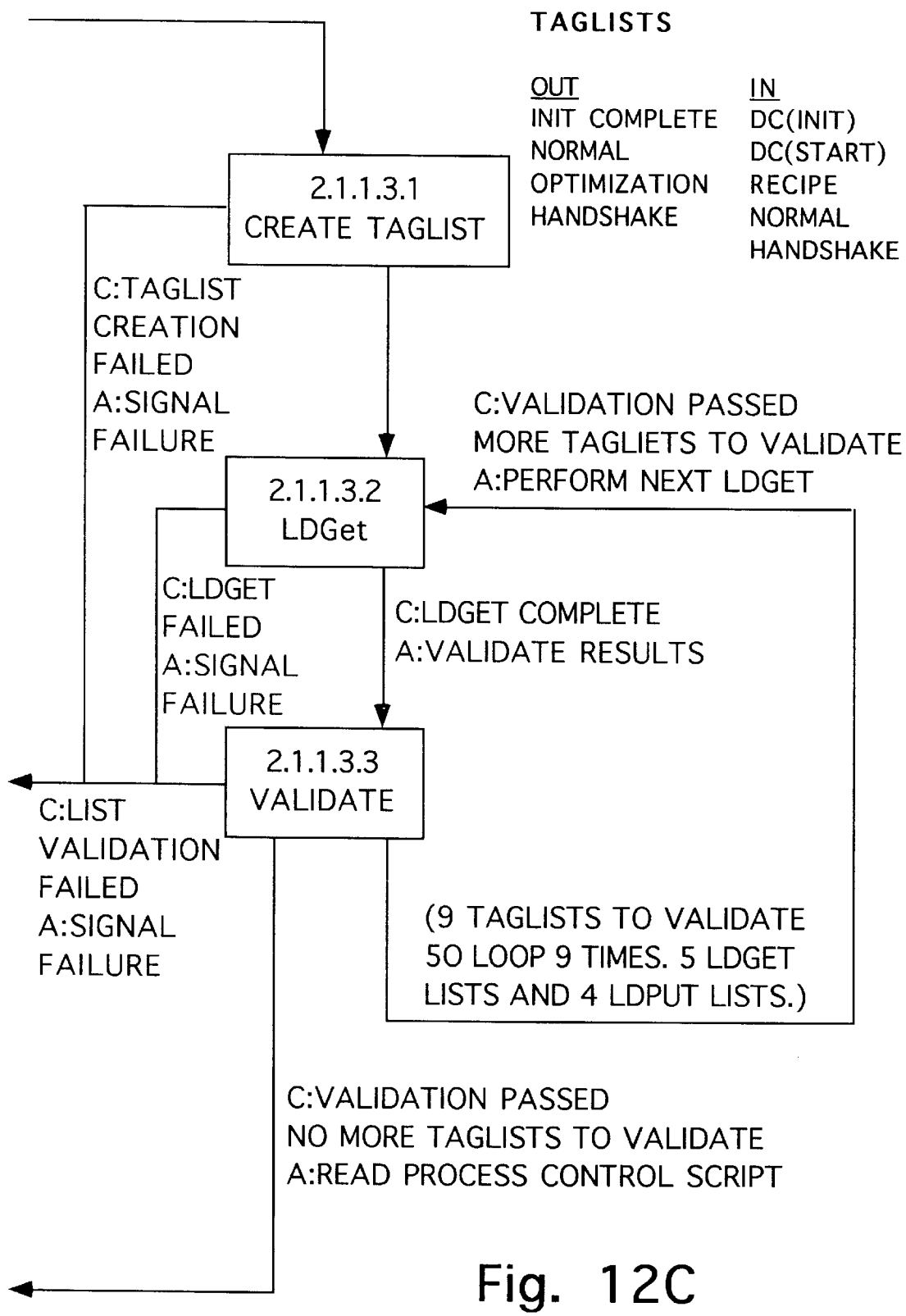
Figure 12D:
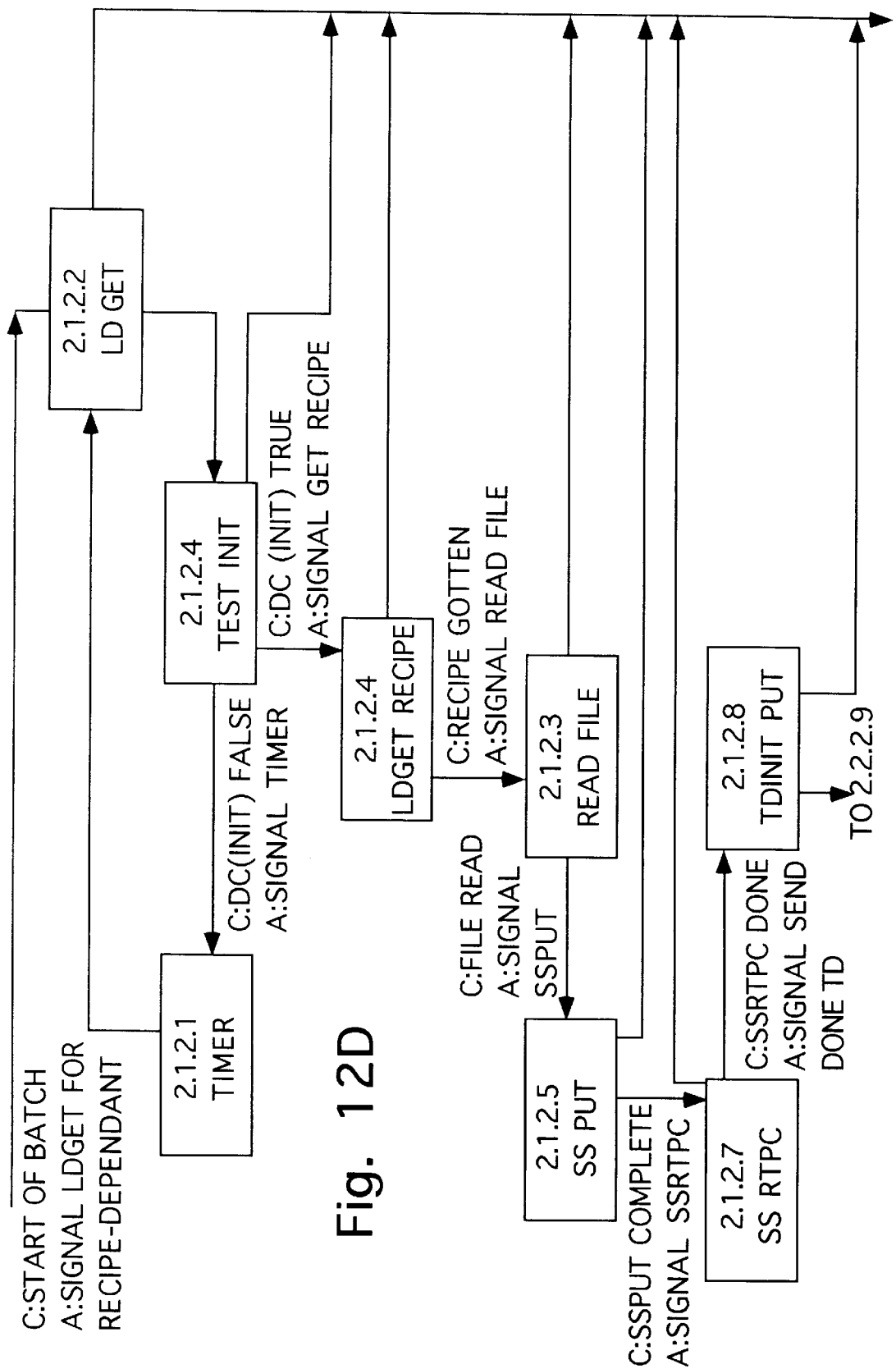

As will be apparent from FIG. 12A, the Initialization routine 2.1.1 will trigger the sequencing required for system initialization. The System Initialization procss 2.2 of FIG. 11A will then perform the appropriate initialization steps. This system initialization includes the steps of reading an MPC Problem Definition file into memory, validating the MPC Problem Definition, calling SSMain to inialize the SimuSolv block 104, building a set of GPI/plant tag lists, and acquiring the variable labels from the SimuSolv dictionary. The state transition diagram of FIG. 12B shows the sequence taken by the System Initialization routine 2.1.1., and FIG. 12C shows the sequence taken to create the GPI/plant tag lists. Addtionally, FIGS. 11B and 11C show the flow of commands and data throughout the the System Initialization process 2.2.

It should be noted that the MPC Problem Definition file may be stored in the RDB data base 118 shown in FIG. 8. As an example, the MPC Problem Definition file may include such information as long descriptions of the variables, numerical values for tuning specific parameters, and the validation criteria for the real-time data. The process of validating the MPC Problem Definition includes the steps of commanding the SimuSolv block 104 to interpret the script file 116, passing the plant tag names to the GPI block 108 to insure their present existence, and getting the necessary SimuSolv variable names from the SimuSolv dictionary.

As indicated by line 202 of FIG. 12A, error paths are provided at each state of the process so that any problems may be reported to an event data recorder ("EDR"). Assuming that the System Initialization process 2.2 was successful, then the Executive process 2.1 will proceed to the Batch Initialization state 2.1.2. Before the beginning of each batch run, the executive sequencer 46 will query the process control computer 32 for batch related data (e.g., recipe information) using the Batch Initialization process 2.3. In this regard, return line 204 indicates that the batch initialization sequence will be executed again for the next batch reaction.

The Batch Initialization process 2.3 includes the steps of reading the current recipe tag name from the "DY" Dynamic Data file shown in FIG. 11A (also shown as the real-time data base 50 of FIG. 1), reading the recipe information from the MOD block 106 using the GPI block 108, rereading the MPC Problem Definition file for recipe independent data, building a recipe table tag list, putting the new information into the SimuSolv block 104, re-initializing the process model, and recording the start of the batch run. These steps are shown through the state transition diagram of FIG. 12D and the transformation graph of FIG. 11D.

As shown by the Handshake process 2.4 of FIG. 11A, the executive sequencer 46 will periodically initiate a hand shaking sequence with the executive process control computer 32 (e.g., every 15 seconds). In this regard, the following steps are preferably taken each hand shaking period: retrieve the current status of the MOD block 106 from the GPI block 108, test the current status, set an MPC Handshake value equal to the current status just received, and send the MPC Handshake value back to the MOD block 106. If the MOD status is tested and found incorrect, then a request for the current status may be repeated for a predetermined number of times before setting an internal error flag.

Once the Batch Initialization process 2.3 has been completed, then the Executive process 2.1 will proceed to the Calculation state 2.1.3 shown in FIG. 12A. The sequence of steps taken at this point are shown through the state transition diagram of FIG. 12E. In this regard, the Calculation state 2.1.3 will trigger the Calculation process 2.5 shown in FIG. 11A. The flow of commands and data during the Calculation process 2.5 is shown in the transformation graph of FIG. 11E. While not shown in FIGS. 11E and 12E, the executive sequencer 46 will receive process data from the Input process 2.6, which will then be stored in the DY Dynamic Data file. Once this data is available, then the Dynamic Data file will be read, and future set-points calculated for the controlled variables, as indicated by the Set-Point Projection state 2.1.3.1 of FIG. 12E.

In one embodiment according to the present invention, the set-points for the controlled variable are maintained as a list of "corners", that is places in time where the slope of the set-point changes. Looking out to the prediction horizon, the element of time will be divided into fixed prediction intervals, and the set-point at each of those intervals will be calculated by the Set-Point Projection process 2.5.3 of FIG. 11E, based on the set-point corners and the current time value.

Figure 11E:
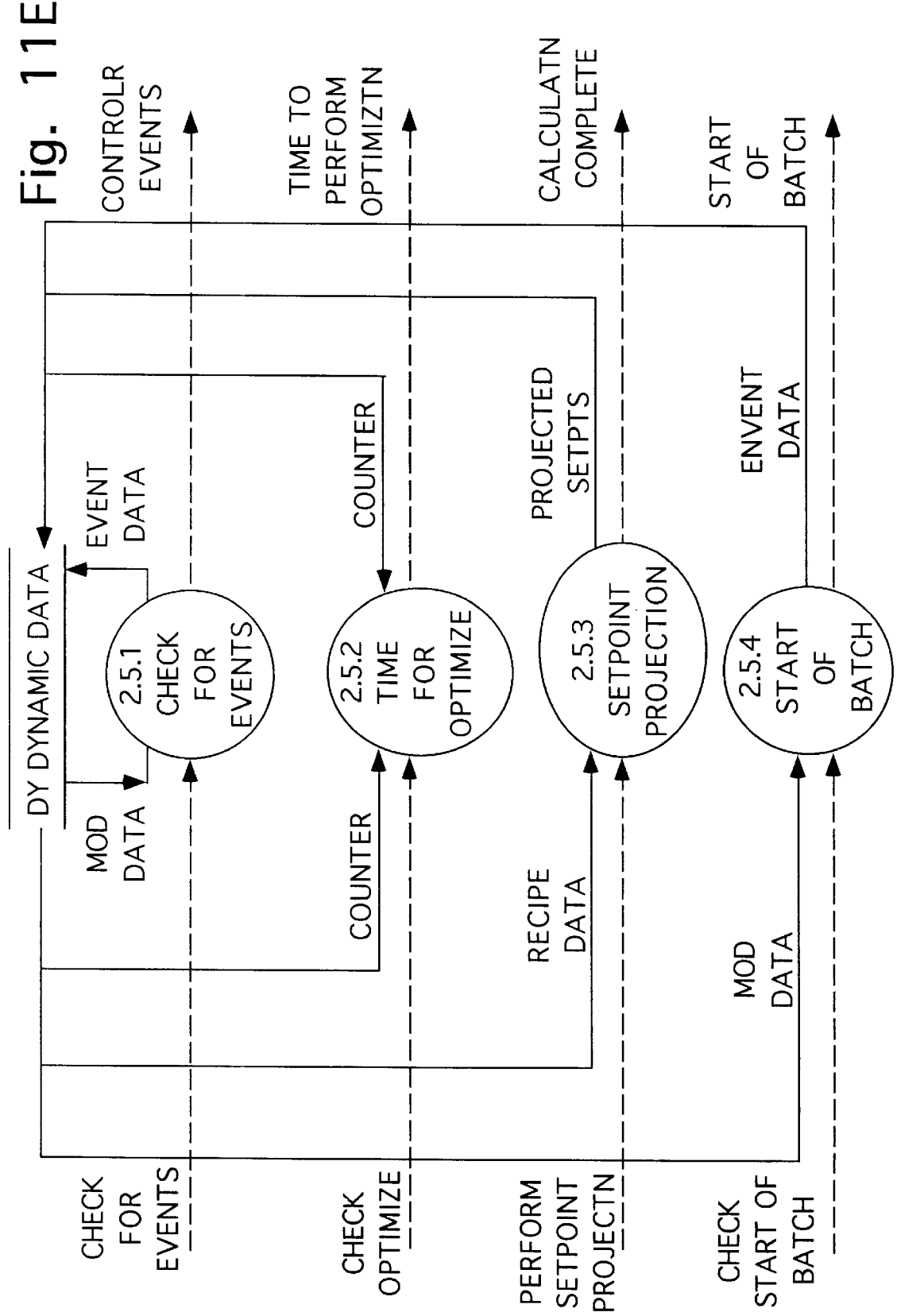
Figure 11F:
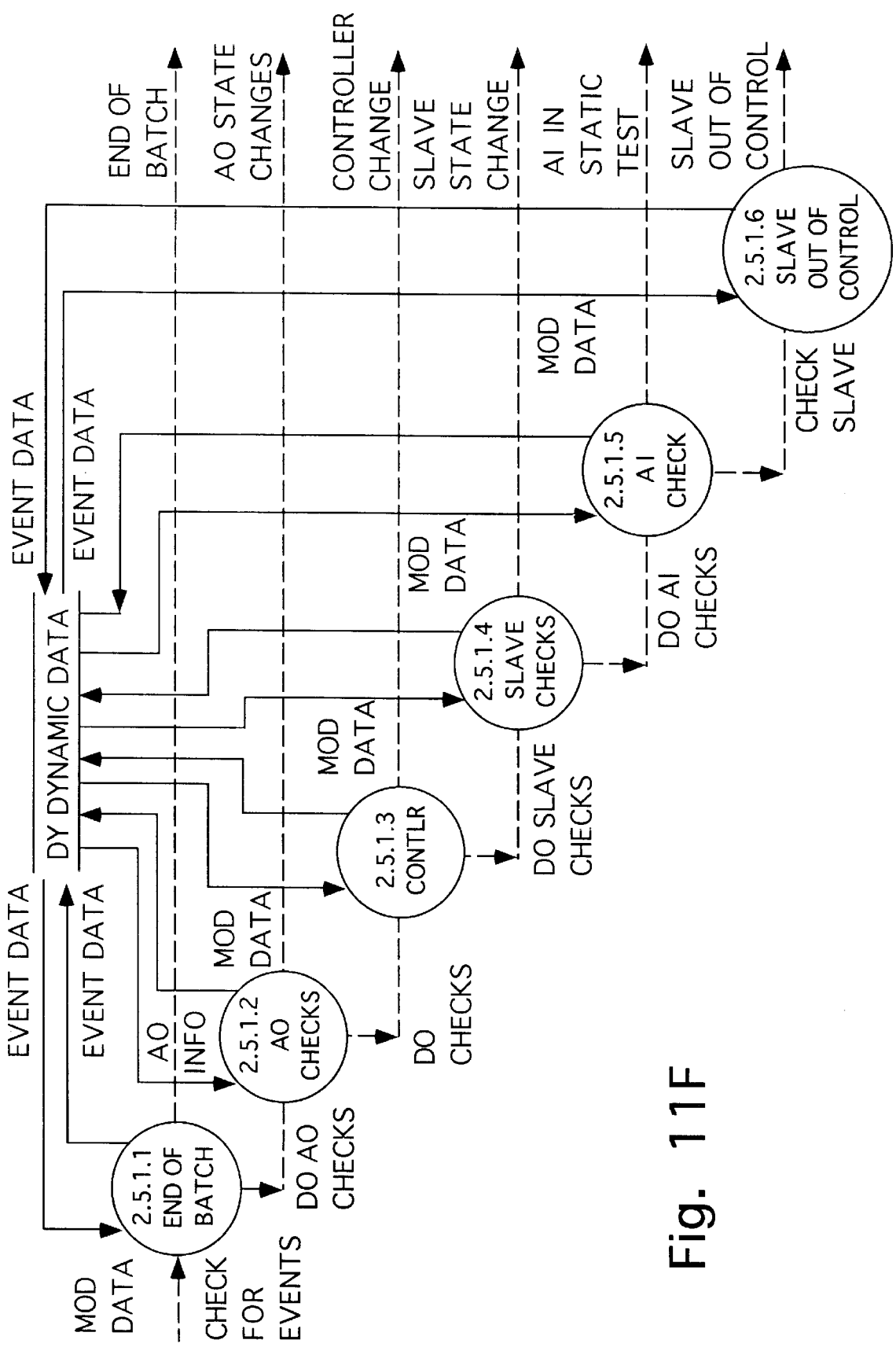

Additionally, as shown in FIG. 11E, the executive sequencer 46 will preferably also check for and identify process events. The Check for Events process 2.5.1 is shown in the transformation graph 11F. In this regard, a number of different process events may be checked for, including a check for the end of the batch run, a check for whether an analog outputs "AO" have reached their upper/lower limits, and whether any slave controllers have reached their upper/lower limits. While the process control computer 32 may also conduct such tests, it should be appreciated that insured reliability is increased through such redundancy. Additionally, it should also be appreciated that the model predictive controller 44 may also be employed in applications in which the executive sequencer 46 communicates directly with slave controllers.

Figure 12E:
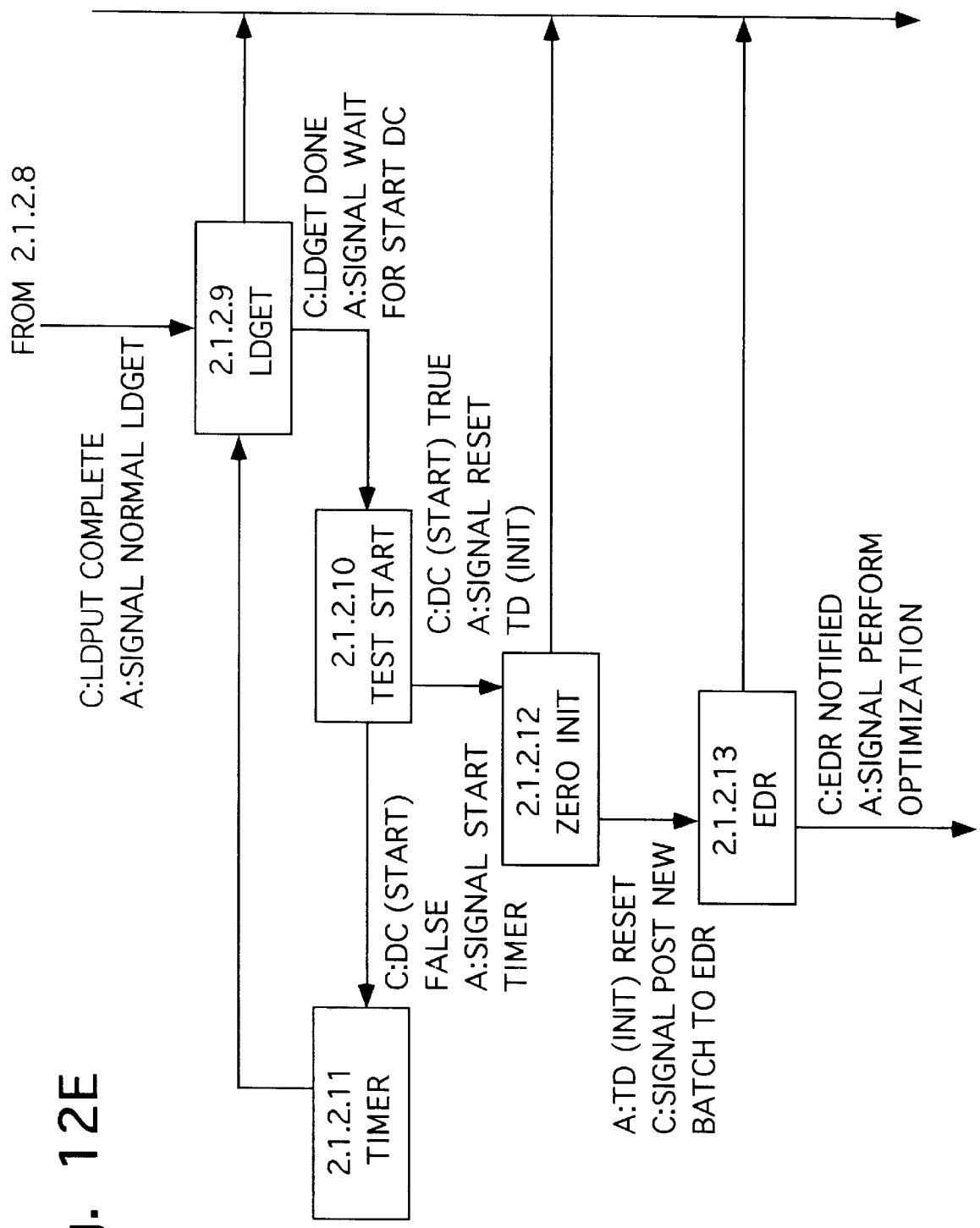
Figure 12F:
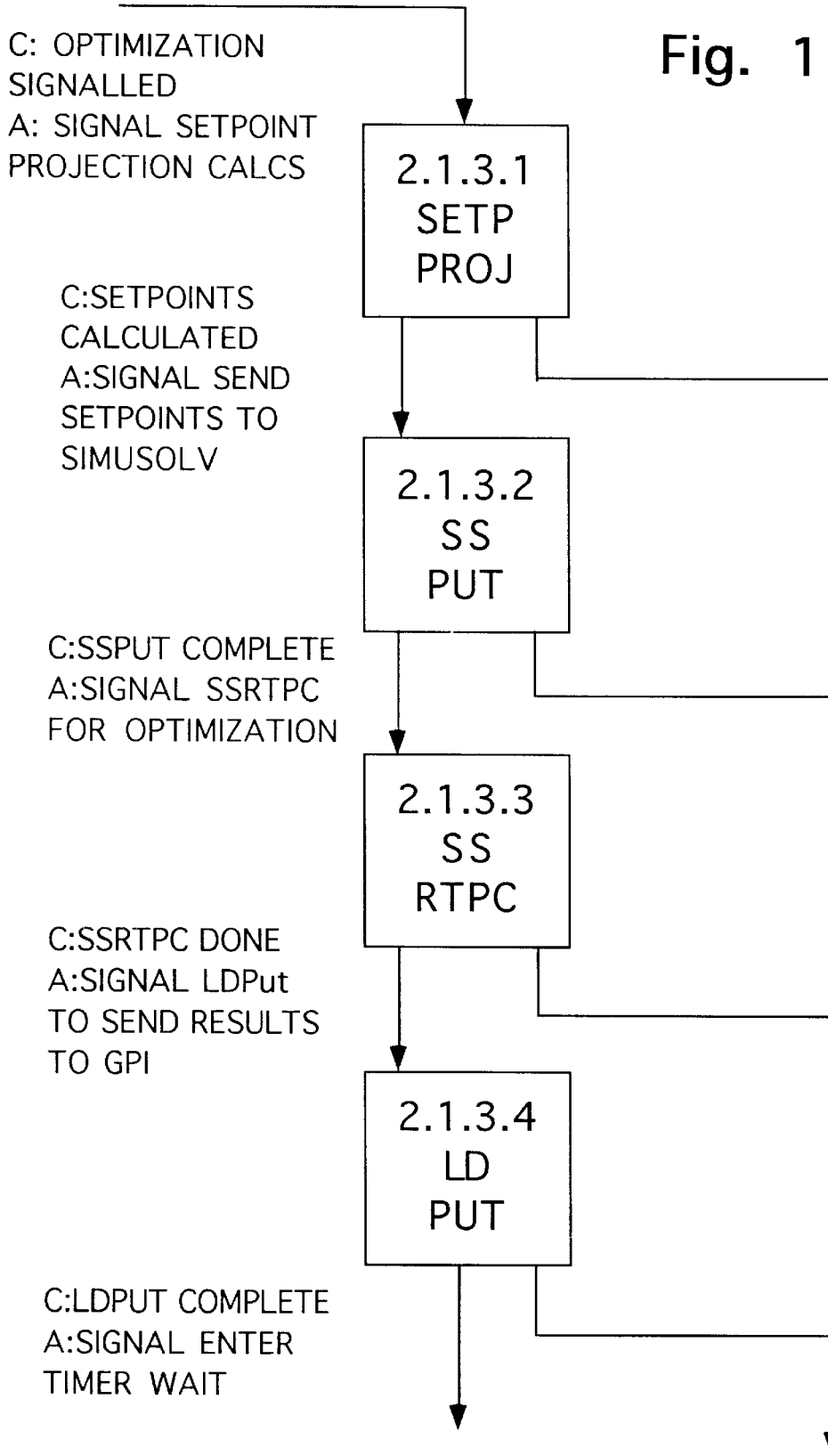

Then, as shown by the SimuSolv Put state 2.1.3.2 of FIG. 12E, the projected set-points will be sent to the SimuSolv block 104. The executive sequencer 46 will also check to see if it is time to perform an optimization (process 2.5.2 of FIG. 11E). If it is time to optimize, then the appropriate command will be sent to the SimuSolv block 104 to perform the set-point optimization for the manipulated variables. The executive sequencer 46 will then wait for the results to be returned by the SimuSolv block 104, as indicated by state 2.1.3.3 of FIG. 12E. These results will then generally be sent to the GPI block 108, as indicated by the state 2.1.3.4 of FIG. 12E.

Referring again to FIG. 12A, shows that once the optimization process is complete, the executive sequencer 46 will wait in a timer loop for the MPC Handshake process 2.4 to be repeated. Assuming that the MPC Handshake process was successful and the time is appropriate, then the executive sequencer 46 will proceed to the State Estimation state 2.1.5. The steps executed for this procedure include retreiving current process data, sending this data to the SimuSolv block 104, commanding SimuSolv to perform the process state and bias estimation, retrieving the results, and sending the results to the GPI block 108. These steps are shown through the state transition diagram of FIG. 12F.

Figure 12G:
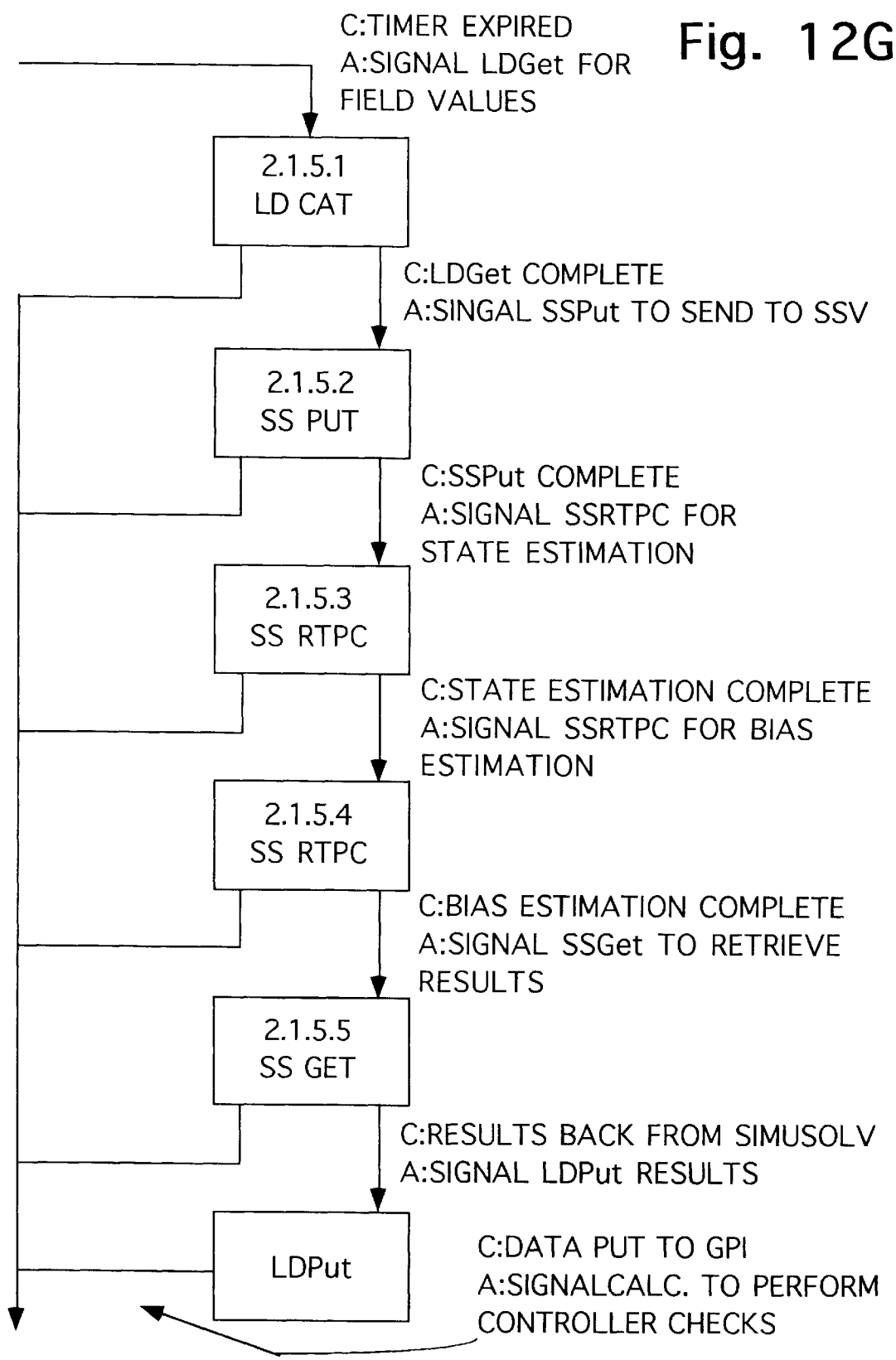
Figure 12H:
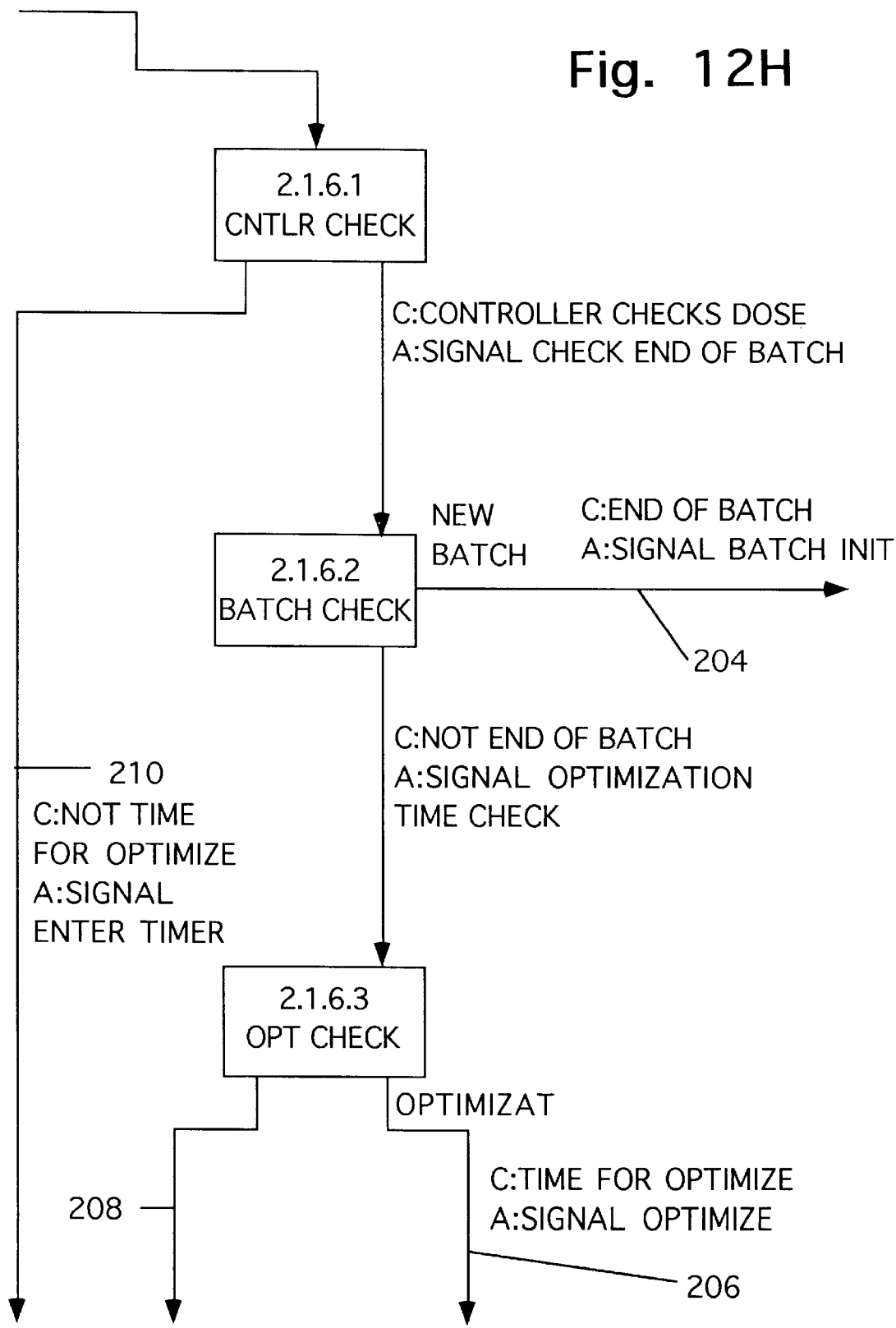

Then, as shown by the MPC Check state 2.1.6, the executive sequencer 46 will perform a number of steps to order to determine the next control direction to take. These steps include performing end of batch checking, checking to see that the process control computer 32 is operating properly, and checking to see if it is time to perform set-point optimization. These steps are shown through the state transition diagram of FIG. 12G. In this regard, the lines 204–210 in both FIGS. 12A and 12G show the direction which will be taken as a result of the checks.

Referring again to FIG. 11A, the Input process 2.6 and the Output process 2.7 are shown. The flow of information during the Input process 2.6 is shown in more detail through the transformation graphs of FIGS. 11G–11I. Similarly the flow of information during the Output process 2.7 is shown in more detail through the transformation graph of FIGS. 11J–11M.

Figure 11G:
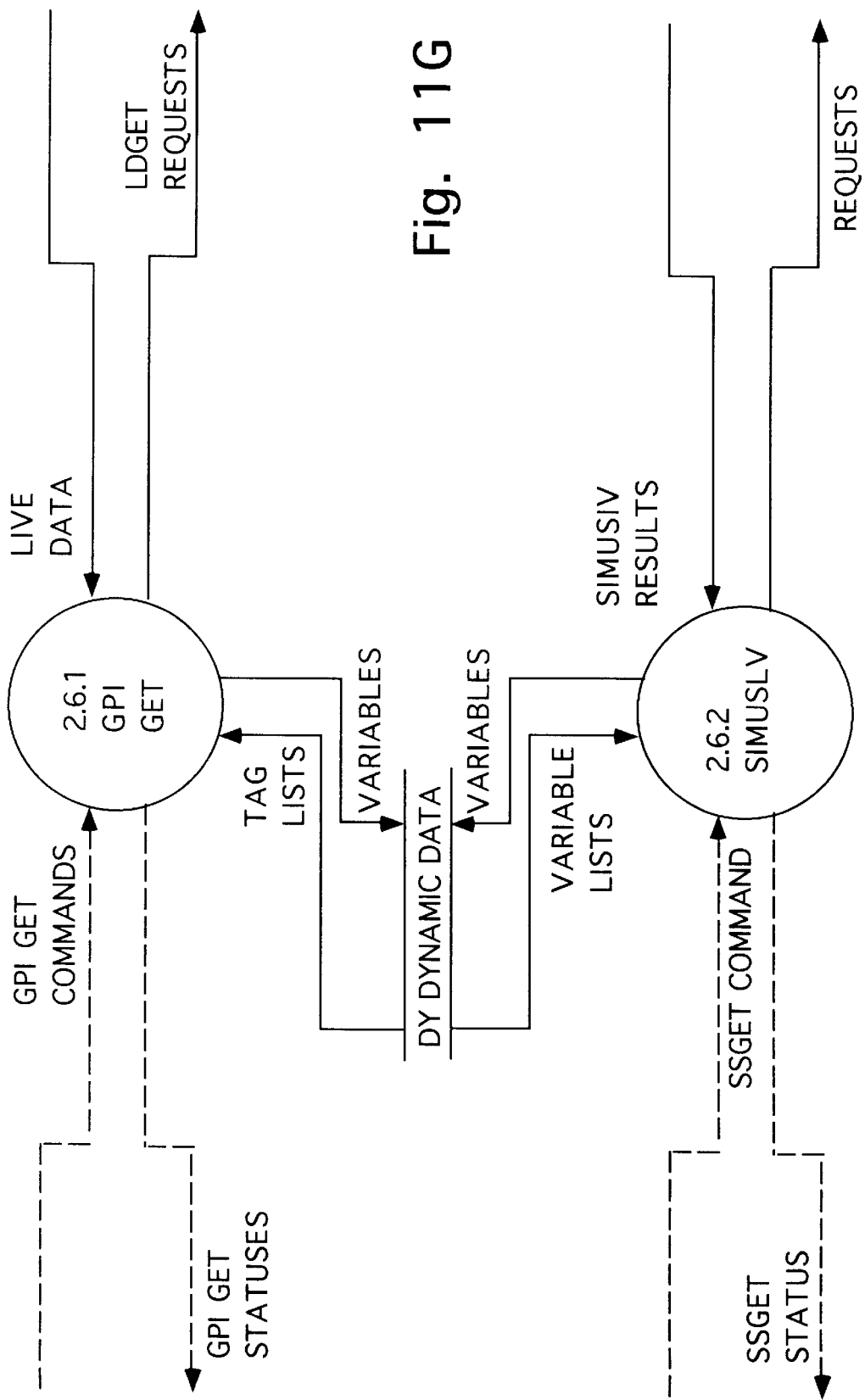
Figure 11H:
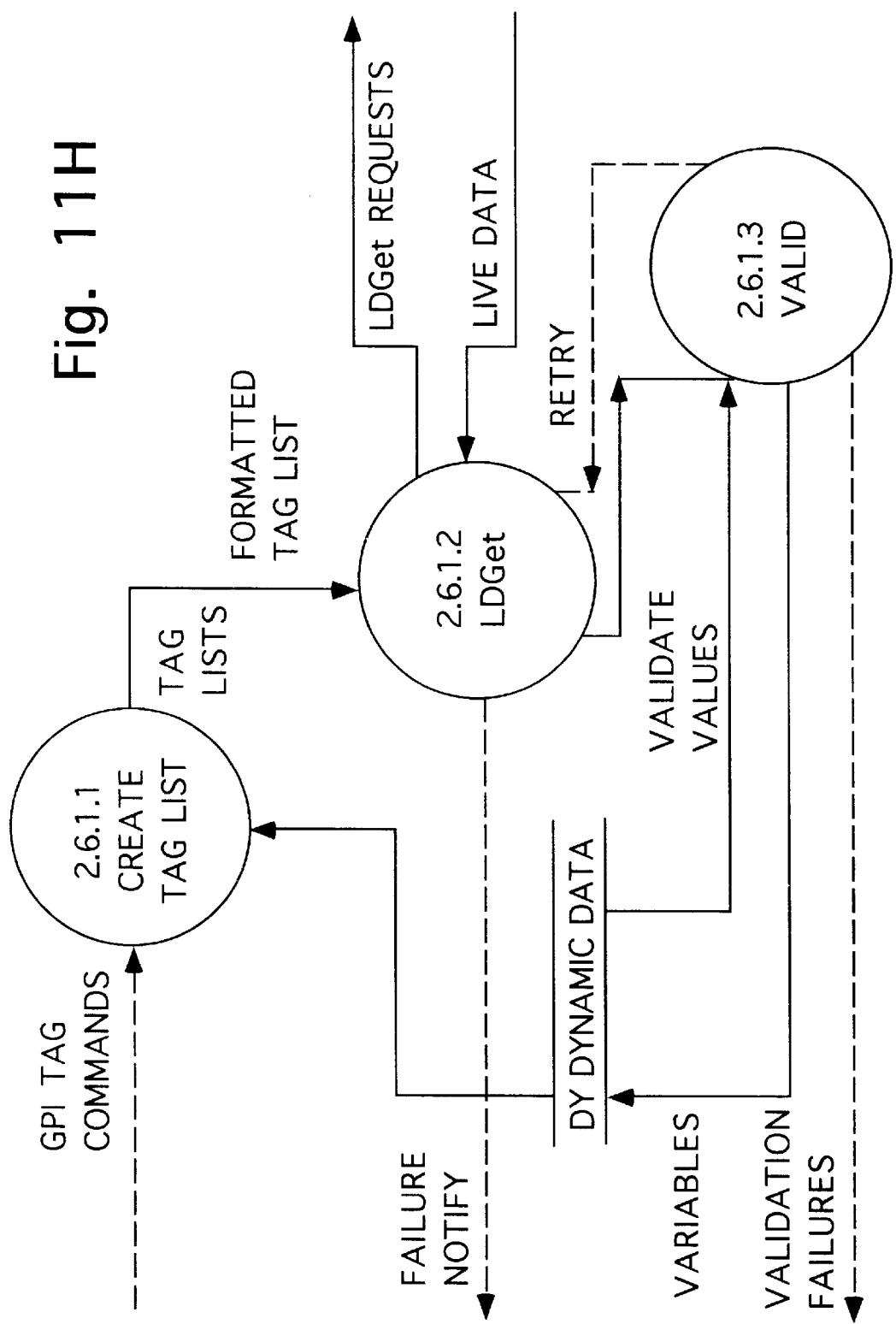
Figure 11I:
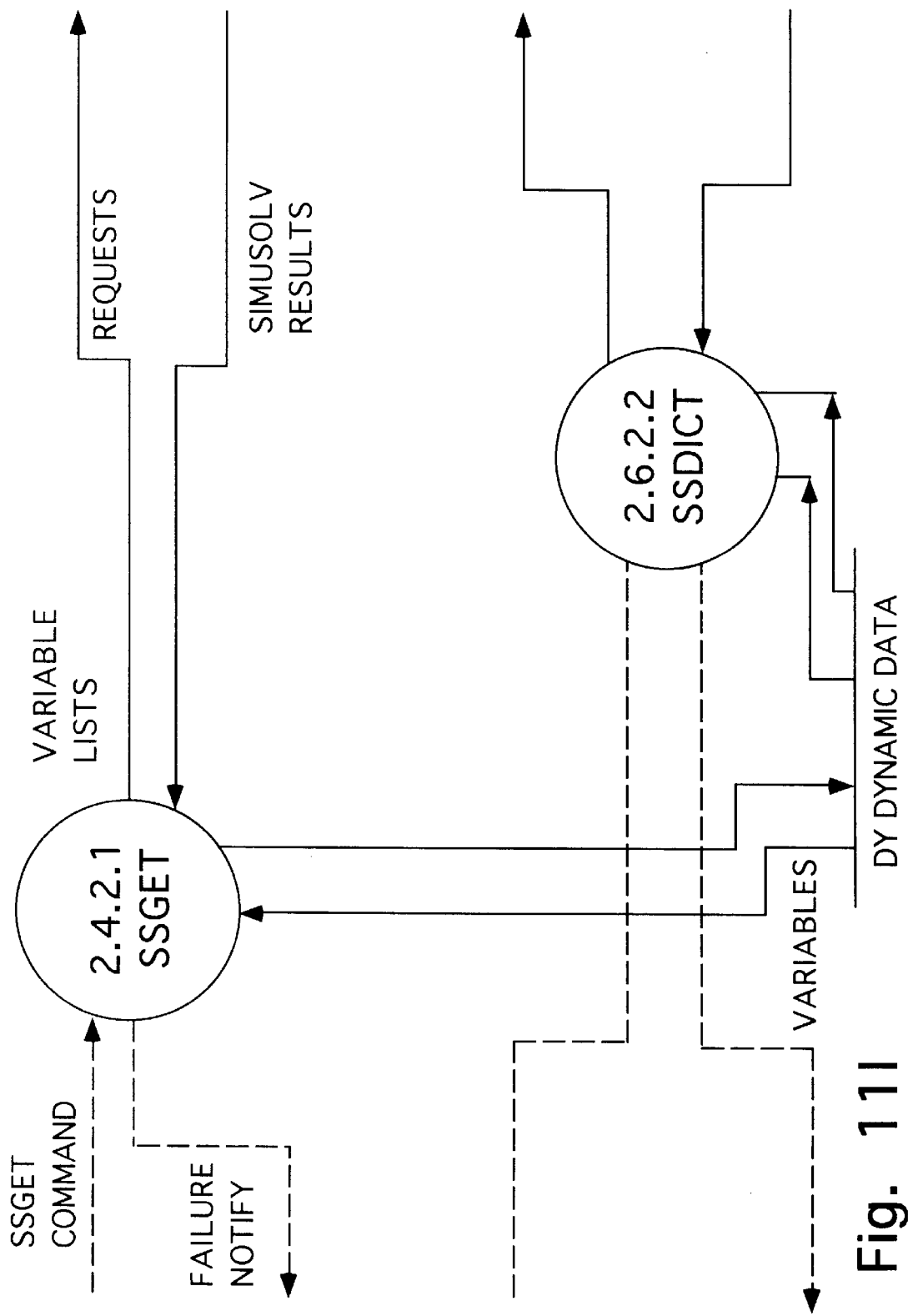

FIG. 11G shows that the Input process is comprised of two processes, namely the GPI Get process 2.6.1, and the SimuSolv process 2.6.2. The GPI Get process 2.6.1 is shown in FIG. 11H, while the SimuSolv process 2.6.2 is shown in FIG. 11I. In this regard, the Executive process 2.1 periodically command real-time data from the GPI block 108, and when this data is received, it is stored in the DY Dynamic Data file. Similarly, the Executive process 2.1 will also command that the SimuSolv block return its results to the executive sequencer 46.

Figure 11J:
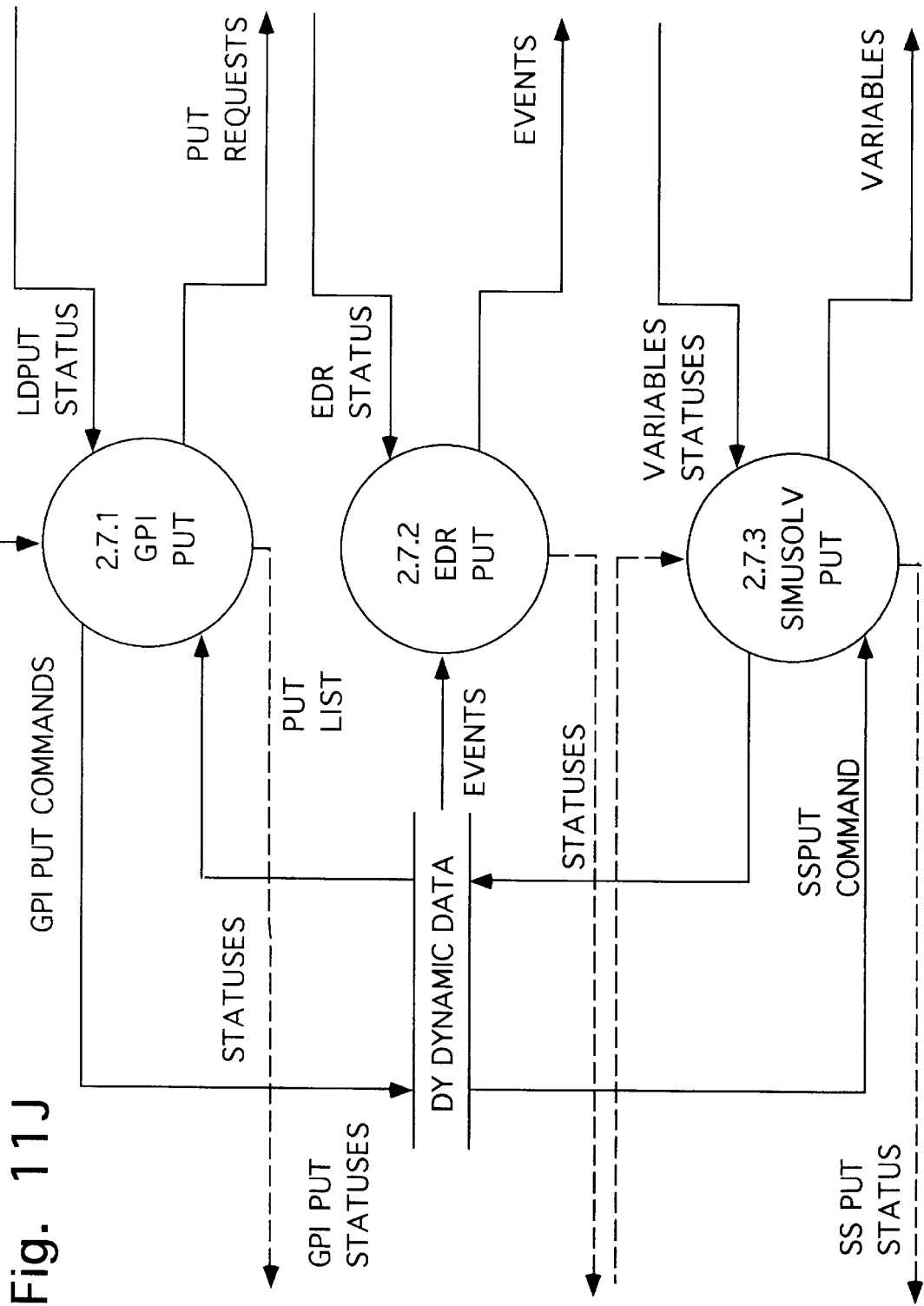
Figure 11K:
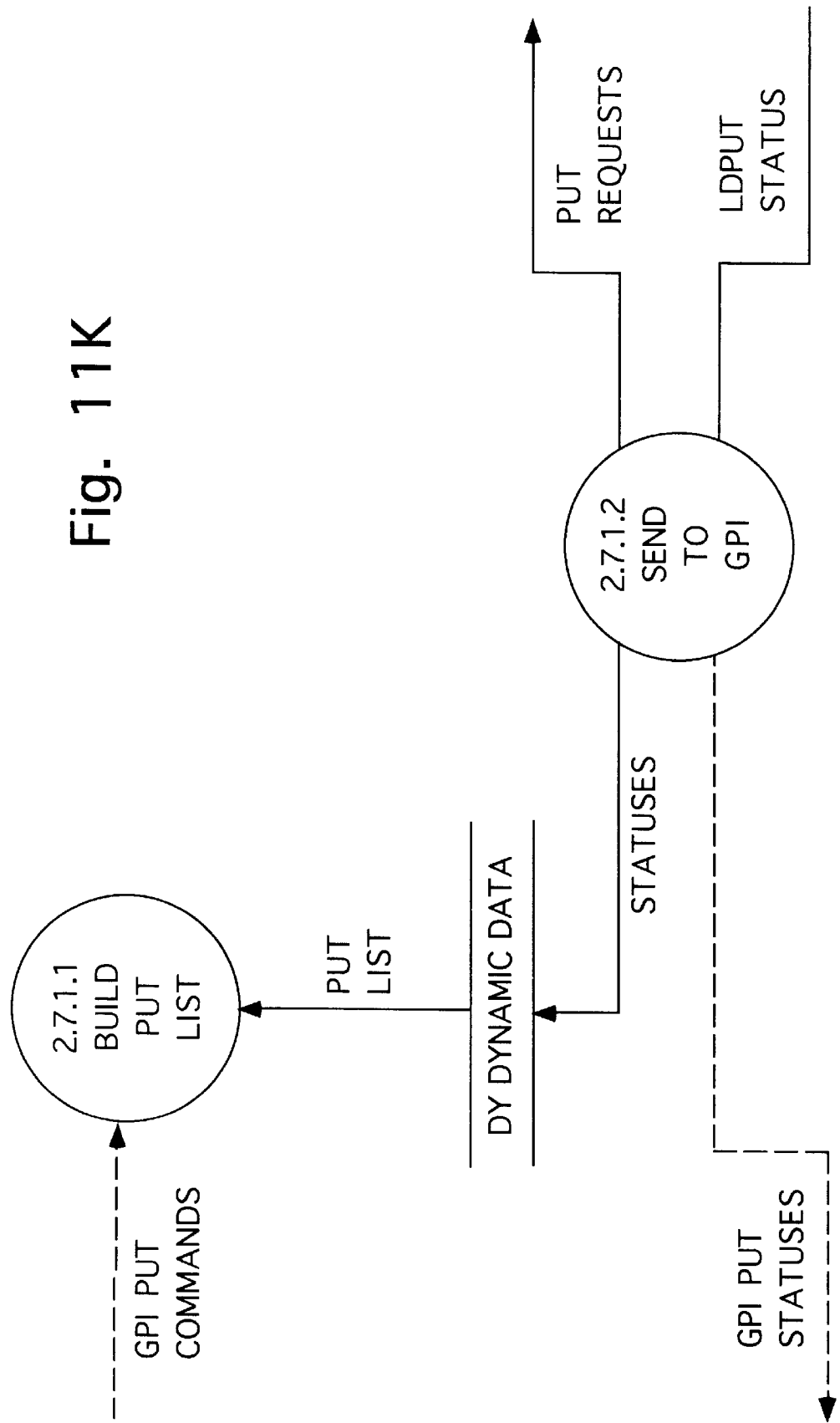
Figure 11L:
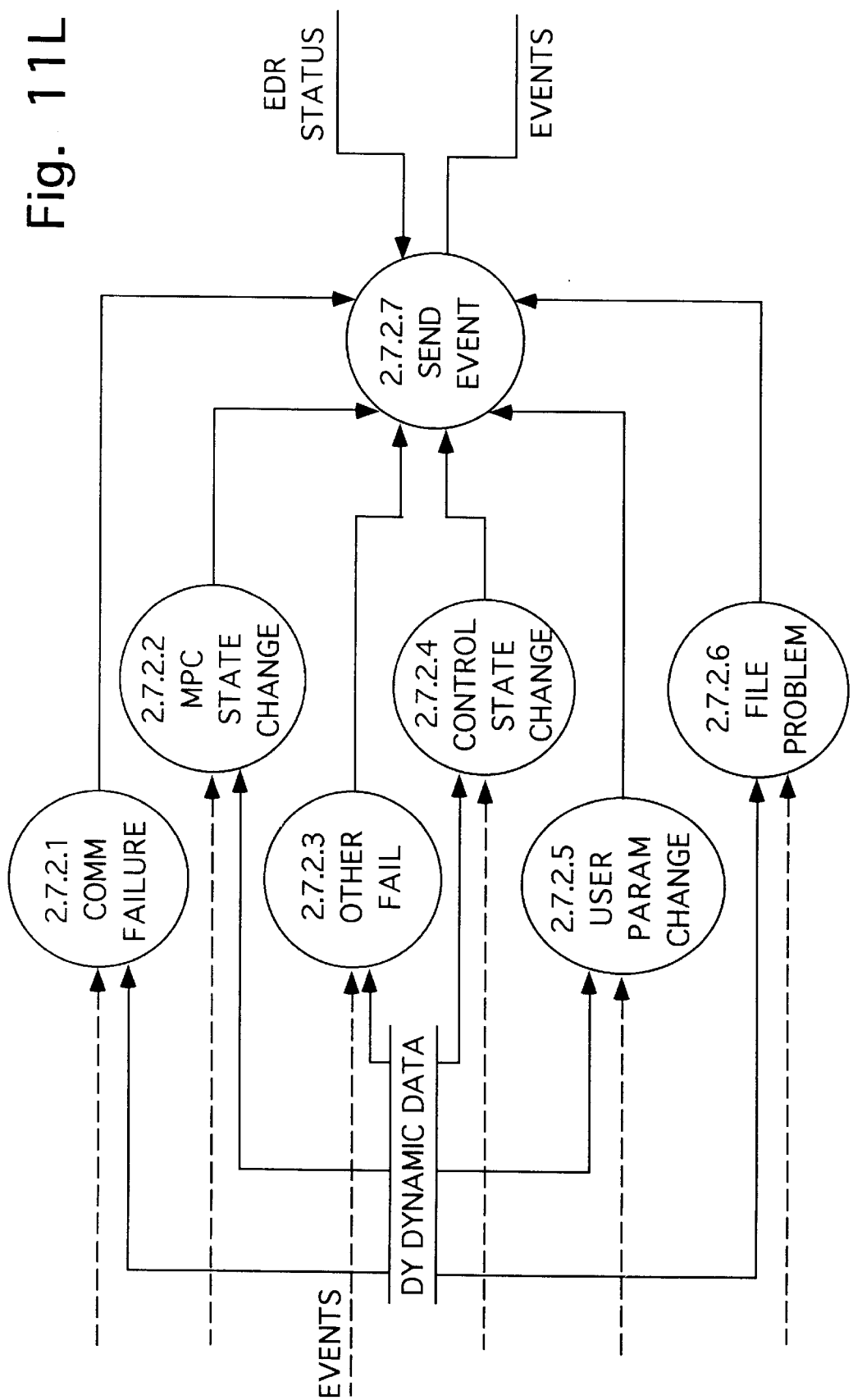
Figure 11M:
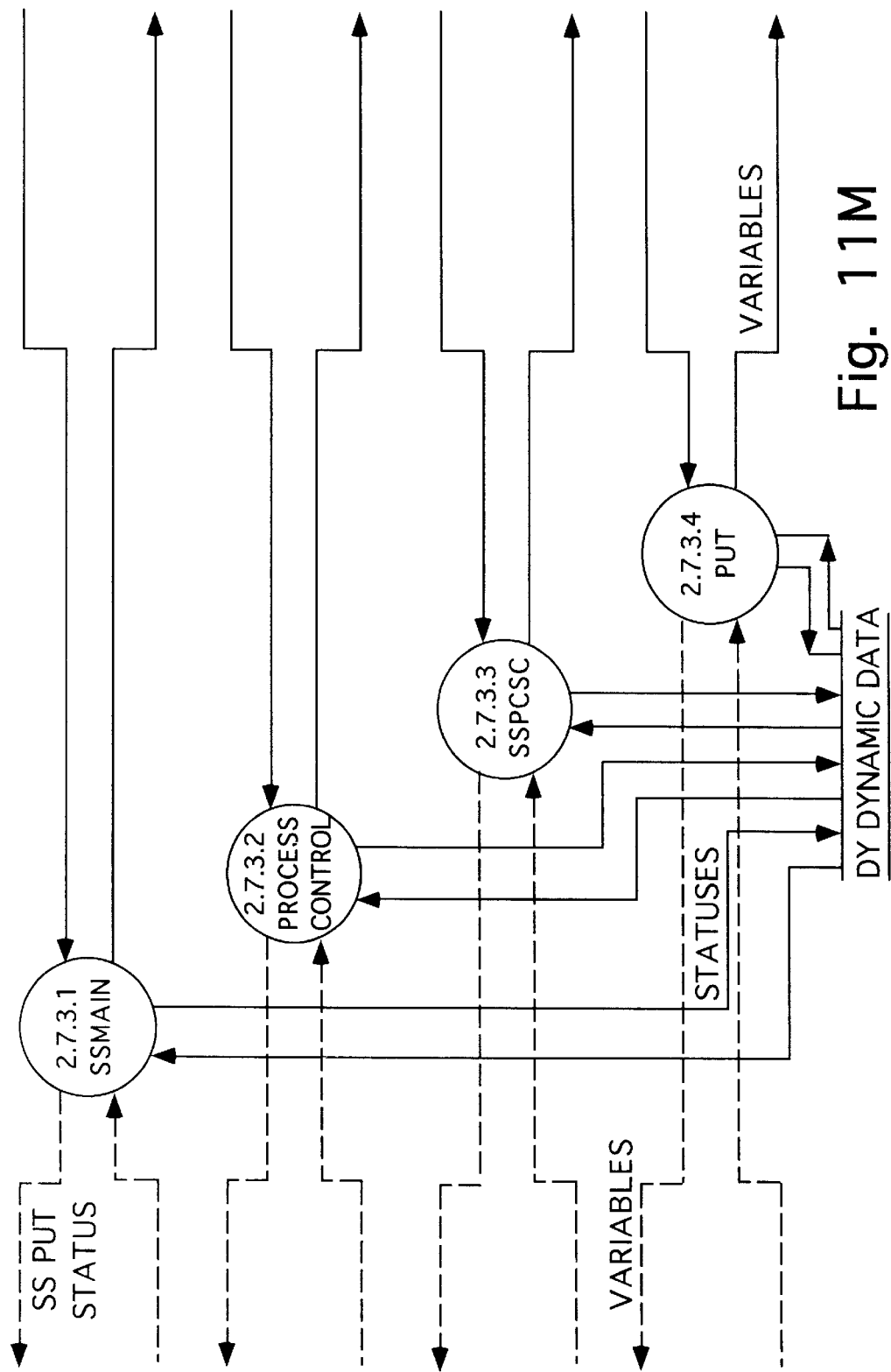

FIG. 11J shows that the Output process is comprised of three processes, namely the GPI Put process 2.7.1, the EDR Put process 2.7.2, and the SimuSolv Put process 2.7.3. The GPI Put process 2.7.1 is shown in FIG. 11K, the EDR Put process 2.7.2 is shown in FIG. 11L, and the SimuSolv Put process 2.7.3 is shown in FIG. 11M. In this regard, it should be noted that the EDR Put process 2.7.2 is used to prepare packets of information which are indicative of important process changes and other events, including failures. For example, in the event that the MPC Handshaking process fails, then the EDR Put process 2.7.2 will transmit this information so that the error will be logged and appropriate action taken.

Figure 13A:
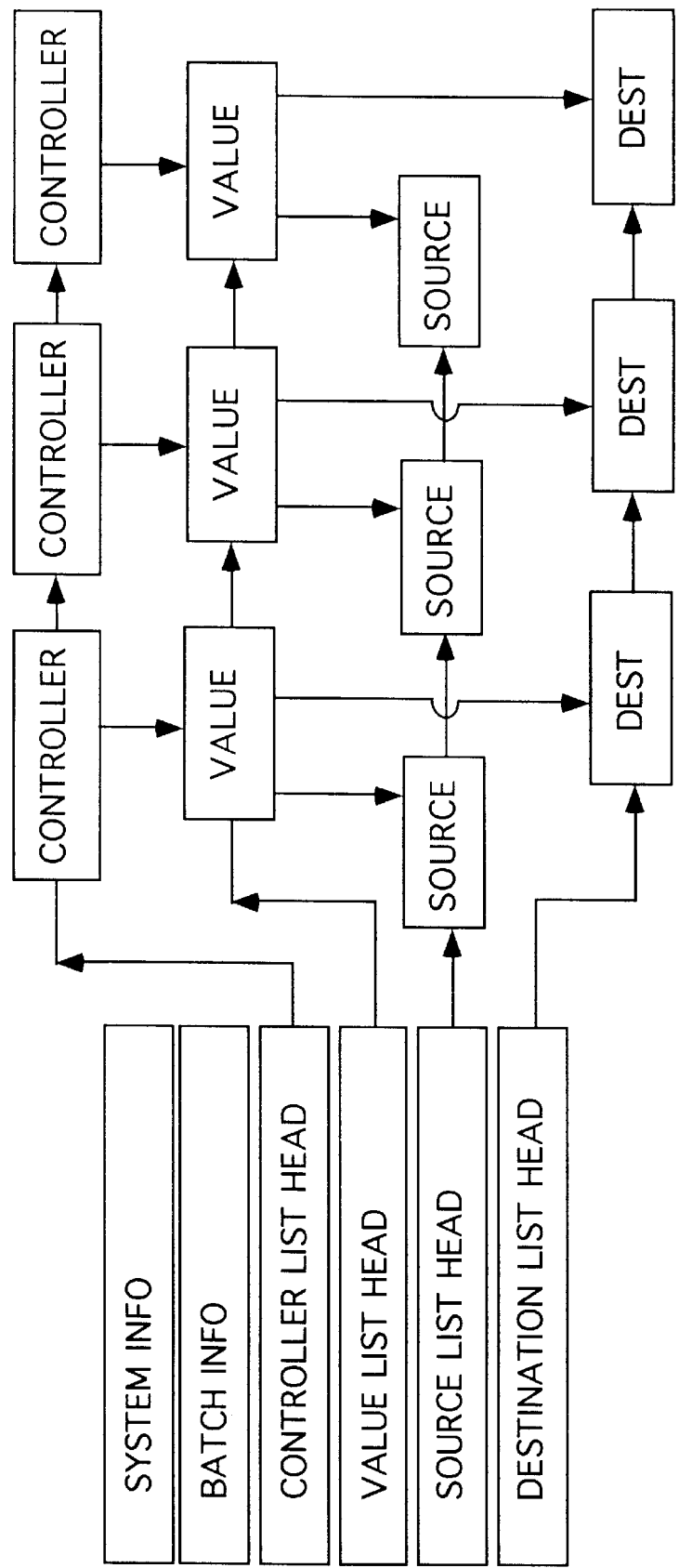
FIGS. 13A–13B provide two examples of the data structures employed in the real-time data base of the executive sequencer.
Figure 13B:
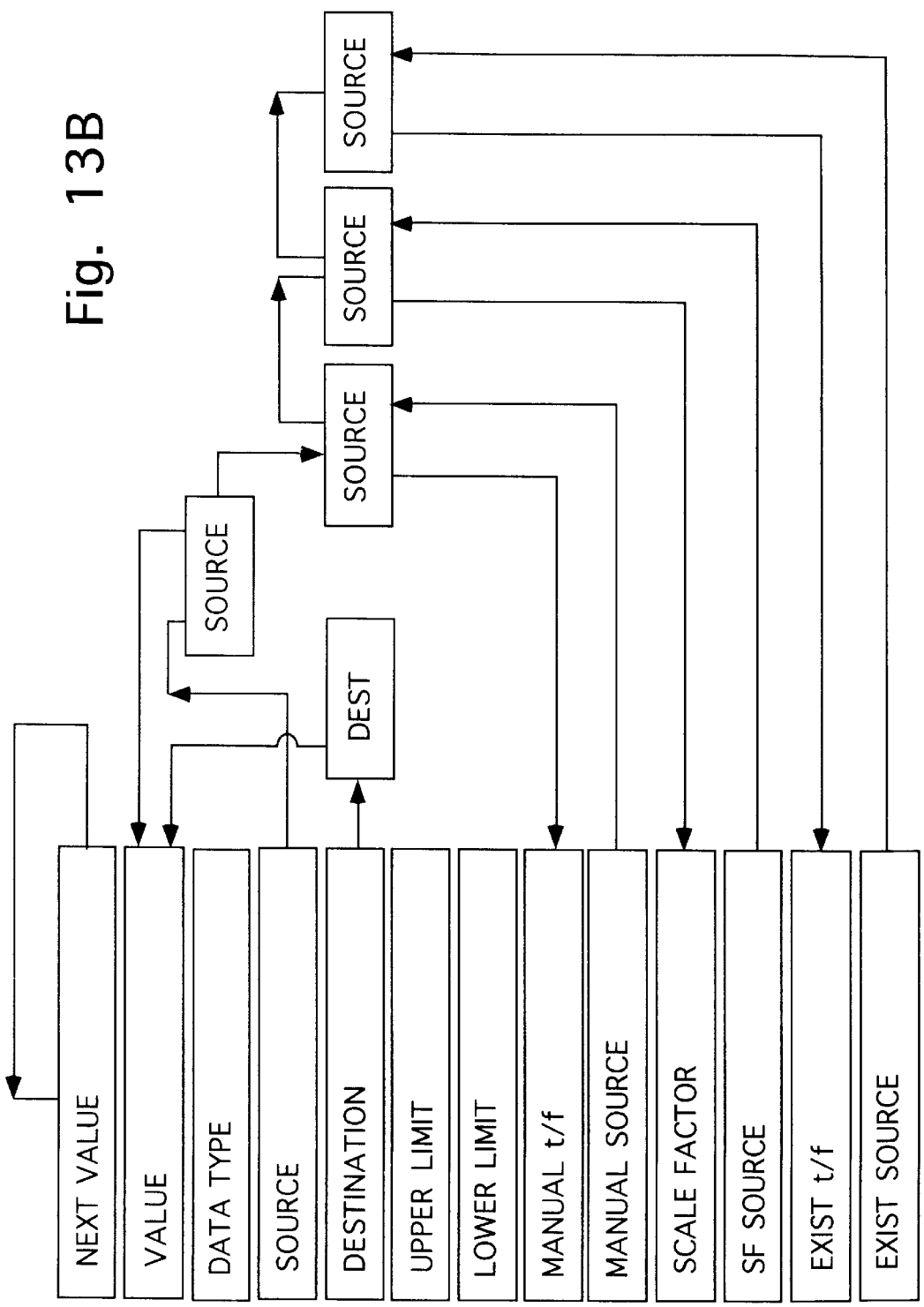

Referring to FIGS. 13A–13B, two examples of the data structures employed in the DY Dynamic Data file are shown. In this regard, the real-time physical data is stored in a number of linked lists, and FIG. 13A shows the basic connections between the data base records and the various linked lists. Each of these linked lists include other links which are used to support various real-time activities. FIG. 13B shows an example of these other links. More specifically, FIG. 13B represents the Process Value List, which contains each value stored by the executive sequencer 46. As illustrated by FIG. 13B, this data structure identifies the data type, the data value, and the maximum and minimum value limits used to test the validity of data retrieved from entities other than the executive sequencer 46. Additionally, if the value is retrieved from other entities, the Process Value List structure will also contain a pointer to the structure which provides addressing information. Similarly, if the value is to be sent to another entity, the structure will also contain a pointer to its destination addressing structure.

A-1 GET DATA

The GET DATA block retrieves current process variable values from the plant or a simulation model.

1. Print initial debug output if requested:

IF SSDBUG = .TRUE. and. SSDBOF (2) = 1 .and. SSPDSC = 3,
        Print initial GET DATA debug output 2. Set the last manipulated variable values equal to the corresponding plant tag variable values for the manipulated variable or equal to the current manipulated variable value:

SSLMV(i) =SSPTV(j), i = 1, ..., SSNMV, j = 1 + SSNMPV +i

IF plant data source = real time (SSPDSC = 2):

SSLMV(i) = MV(i), i = 1, ..., SSNMV

3. IF plant data source
    = user         (SSPDSC = 3)   GO TO STEP 4
    = real time    (SSPDSC = 2)   GO TO STEP 5
    = simulation   (SSPDSC = 1)   CONTINUE

<u>SIMULATION MODE</u>

A. Save current model state variable initial condition values:

SSMSV(i) = SVIC(i),    i = 1, ..., SSNSV where SVIC is the vector of current state variable initial conditions B. Save current model parameter values which are different from the simulator model parameter values:

SSMPV(i) = MPV(i),    i = 1, ..., SSNSPV where MPV is the vector of model parameter values C. Save current model parameters that correspond to simulator parameter values that are modified during simulation events:

SSMPVE(i) = SEMPV(i),    i = 1, ..., SSNPSE where SEMPV is the vector of simulation event model parameter values D. IF the get data start flag (SSGDSF) = .TRUE. First call to GET DATA:

- Set the initial conditions for the simulation model:

SMIC(i) = SSSICV(i)    i = 1, ..., SSNSIC where SMIC represents the simulation model initial conditions. The following initial condition values may optionally be specified (default is to use the current model values):

Independent Variable (i.e., T)
    State Variables Initial Conditions
    Manipulated Variables If SSNSIC = 0, set the model state variable values equal to the model state variable initial condition values

- Set the model state variable initial conditions equal to the current model state variable values:

- Set the model parameter values equal to the corresponding simulator parameter values:

MPV(i) = SSSPV(i)   i = 1, ..., SSNSPV where MPV is the vector of model parameter values

- Evaluate all statements in the PRE-INITIAL section of the model definition program.

- Evaluate all statements in the INITIAL section of the model definition program.

- Set the model state variable values equal to the current state variable initial condition values.

- Initialize the simulator manipulated variable dead time event values (SSSDEV) to the current values of the manipulated variables:

Do j = 1 to SSNMV
        Do i = 1 to SSNSDE(j)
            SSSDEV(i) = MV(j)
        End i
    Endj where MV is the vector of manipulated variable values

ELSE (SSGDSF = .FALSE.):

- Set the model parameter values equal to the corresponding simulator parameter values:

$$MPV(i) = SSSPV(i) \quad i = 1, \ldots, SSNSPV$$

where MPV is the vector of model parameter values

- Set the model state variable initial conditions equal to the current model state variable values.

- Set the model manipulated variable values equal to the simulator manipulated variable values.

The simulator manipulated variable values are equal to the controller set point values (SSPSTV), except for the offset caused by the simulator manipulated variable dead time (SSSMVD) values.

E. Print initial debug output if requested (SSDBUG = TRUE.).

F. Set the model parameter values equal to the corresponding simulation event parameter values (SSPVSE) which occurred at a time prior to the current independent variable initial condition.

G. Integrate the simulation model forward one sample interval (SSPDSI):

- Adjust the manipulated variable values at the appropriate times to account for the simulator manipulated variable dead time (SSSMVD) values.

40562A

• Incorporate at the appropriate times any simulation load events which occur during the sample period (T = T + SSPDSI).

H. Set the plant tag values equal to the current values of their corresponding model tag variables:

SSPTV(i) = MTV(i)    i = 1, ..., SSNDT where MTV is the vector of model tag variable values I. Add any defined response noise to the plant tag values:

RNOISE(j) = SSNVM(j) + RAN(0,1)*SSNVD(J)

where RAN(0,1) is a random number between 0 and 1.

Do i = 1 to SSNDT
    Do j = I to SSNSNV
        IF SSSVTN(i) = SSSNVN(j) .and. SSSNT(j) = 1
            THEN SSPTV(i) = SSPTV(i) + RNOISE(j)

IF SSSVTN(i) = SSSNVN(j) .and. SSSNT(j) = 0
            THEN SSPTV(i) = SSPTV(i) * RNOISE(j)
    End j
End i J.  Save the current values of the simulator state variables and restore the values of the model state variables:

```
SSSSV(i)  = SV(i)      i = 1,    SSNSV
SV(i)     = ssmsv(i)   i = 1,    SSNSV
```

K.  Restore the values of the model parameters modified by the simulator parameters and simulator event parameters.

L.  Set the SimuSolv manipulated variable values equal to the last manipulated variable values (SSLMV).

```
MV(i)     = SSLMV(i)   i = 1, ..., SSNMV
``` where MV is the vector of manipulated variable values

M.  Evaluate the DYNAMIC and DERIVATIVE sections of the model definition program once to update the values of any algebraic variables modified during the simulation.

GO TO STEP 5

4.  USER-SUPPLIED SUBROUTINE

A.  Call the user-supplied FORTRAN subroutine USPCGD to return the plant tag values (SSPTV). The elements of the vector which is to contain the plant tag values on a successful return from subroutine USPCGD are initially set to -99.0. If the element still contains this value on a successful return, the plant tag value from the previous sample is used and a warning message is posted.

B. Upon a successful return from subroutine USPCGD, set the plant tag values equal to the values returned from subroutine USPCGD.

5. A. Increment the current plant sample number by one:

SSCPSN =SSCPSN +1

IF SSGDSF = .FALSE. (Not initial call to GET DATA),
GO TO 6

B. Set the last manipulated variable values equal to the corresponding plant tag values for the manipulated variables (IF SSGDSF .TRUE. ) :

$SSLMV(i) = SSPTV(j)$  $i = 1, \ldots, SSNMV,$  $j = 1+SSNMPV+i$

C. Set the model measured disturbance variable values equal to the plant disturbance variable values (IF SSGDSF = .TRUE.):

$MDV(i) = SSPTV(j)$  $i = 1, \ldots, SSNMDV,$ $$j = 1+SSNMPV+SSNW+i$$

where MDV is the vector of model measured disturbance variable values

D.  Set the model independent variable (i.e., time) equal to the corresponding plant tag value for time (IF SSGDSF = .TRUE.):

$$T = SSPTV(1)$$

E.  Calculate the current absolute time <u>(this value is machine specific)</u> in seconds and store (IF SSGDSF = .TRUE.):

$$SSPDCT = \text{Absolute Time}$$

6.  Set the get data start flag to . FALSE. (SSGDSF)

7.  Print final debug output if requested:

IF SSDBUG = .TRUE. .and. SSDBOF(2) = 1, Print final GET DATA debug output

8.  EXIT

A-2. PROCESS CONTROL INITIALIZATION

The PROCESS CONTROL INITIALIZATION block sets the initial conditions for the process model and process control variables, and sets up the controller optimization problem based on the specifications from the process control script.

1. Print initial debug output if requested:

IF SSDBUG = .TRUE. .and. SSDBOF(1) = 1, Print initial INITIALIZATION bug output

2. Set the SimuSolv model variables equal to the corresponding current plant data values:

SMV(i) = SSPTV(i)    i = 1, ..., SSNDT where MV is the vector of SimuSolv model variable values 3. Initialize the state variables:

A.  Set the state variable initial condition values to the values specified in the process control script:

SIC(i) = SSSVIC(i)   i = 1, ..., SSNSV where SIC is the vector of model state variable initial condition values

77

40562A

B.  Evaluate all statements in the PRE-INITIAL section of the model definition program.

C.  Evaluate all statements in the INITIAL section of the SimuSolv model definition program.

D.  Set the current state variable values equal to the current state variable initial condition values.

4.  Initialize the start and finish flags:

SSRMSF   =   .TRUE.    monitor start flag
    SSTISF   =   .TRUE.    timer start flag
    SSSPSF   =   .TRUE.    set point profile start flag
    SSSDSF   =   .TRUE.    send data start flag
    SSRPSF   =   .TRUE.    results prepare start flag
    SSCSF    =   .TRUE.    controller start flag
    SSLDSF   =   .TRUE.    load disturbance start flag SSTCSF   =   .FALSE.   termination criteria status flag 5.  Initialize the history arrays for bias estimation. Set the past time values to − 1.0 to indicate that they have not been calculated:

SSPSV(i)  =  0.0      i = 1, ..., SSNSV*SSNDPV
    SSPSV(j)  =  SV(k)    j = 1 + (k-1)*SSNDPV
                          k = 1, ..., SSNSV

```
        SSPMV(i)   =    0.0         i = 1, ..., SSNMV*SSNDPV
        SSPMV(j)   =    MV(k)       j = 1 +(k-1)*SSNDPV
                                    k = 1, ..., SSNMV

SSPMPV(i)  =    0.0         i = 1, ..., SSNMPV*SSNDPV
        SSPMPV(j)  =    MPV(k)      j = 1 +(k-1)*SSNDPV
                                    k = 1, ..., SSNMPV

SSPMDV(i)  =    0.0         i = 1, ..., SSNMDV*SSNDPV
        SSPMDV(j)  =    MDV(k)      j = 1 +(k-1)*SSNDPV
                                    k = 1 ..., SSNMDV

SSPCCV(i)  =    0.0         i = 1, ..., SSNCCV*SSNDPV
        SSPCCV(j)  =    CCV(k)      j = 1 + (k-1)*SSNDPV
                                    k = 1, ..., SSNCCV

SSPDGV(i)  =    0.0         i = 1, ..., SSNCCV*SSNDPV

SSPDFV(i)  =    10000.0     i = 1, ..., SSNCCV*SSNDPV

SSPEL(i)   =    - 1.0       i = 1, ..., SSNDPV
``` where the vectors SV, MV, MPV, MDV, and CCV contain the current values of the state variables, manipulated variables, measured process variables, measured disturbance variables, and controller controlled variables, respectively.

6. Set the future manipulated variable values (SSFMV) equal to
   the current manipulated variable values:

Do j = 1 to SSNMV
       Do i = 1 to SSFELL
       SSFMV(i) = MV(j)
       End i
   Endj 7. Set up the internal specifications for the optimization on
   problem:

A. Set the adjustable parameters and their upper & lower
      bounds.
   B. Set the process constraints (equality and inequality
      constraints).
   C. Set the maximum control change rate constraints.
   D. Set up the future event lists:
         time values
         controlled variables
         manipulated variables
         controlled variable disturbances
         controlled variable objective function weights
         manipulated variable objective function weights
         load disturbance codes
         simulator codes
   E. Adjust the future event list to account for manipulated
      variable dead time values.

F. Calculate the future set point profiles for the controlled variables.
G. Add load disturbances to the event list if they will occur during the future prediction horizon.
H. Initialize the future manipulated variable values to the current values.
I. Initialize the last manipulated variable values to the current values.

8. REPEAT STEP 2
   REPEAT STEP 3

9. Print final debug output if requested:

IF SSDBUG =.TRUE. .and. SSDBOF(1) = 1
           Print final INITIALIZATION debug output

10. EXIT

A-3. STORE RESULTS

The STORE RESULTS block puts specified variable values into a binary file which can be accessed by the SimuSolv graphics and output utilities.

1. Print initial debug output if requested:

```
        IF SSDBUG = .TRUE. .and.  SSDBOF(3) = 1
5                      Print initial STORE RESULTS debug output 2.  IF SSRPSF (result prepare start flag) .TRUE. , THEN A.  IF NRWITG (no rewind integration) = . TRUE., THEN
10

•   Clear the current PREPARE list from memory.

•   Load the new list of result prepare names
15                (SSRPN) onto the PREPARE  list.

B.  Initialize the data logging operation (CALL ZZNTLG).

C.  IF SSNRON ≠ 0 .and. SSRSOF  ≠ '    ', THEN
20

•   Open the output file (SSRSOF) using unit=18.

•   Print the names of the output variables (SSRON)
25                at the beginning of the file (unit= 18).

3.  Store the current values of the results prepare variables
        (CALL ZZLOG) internally for use by the SimuSolv plotting
30      and output utilities.

4.  IF SSNRON ≠ 0 .and. SSRSOF ≠ '    ', store the values of
        result output names in file SSRSOF (unit=18).
```

5. Set the results prepare start flag (SSRPSF) = .FALSE.

6. Print final debug output if requested:

IF SSDBUG = .TRUE. .and. SSDBOF(3) = 1
            Print final STORE RESULTS debug output

7. EXIT

A- 4.    MONITOR

The MONITOR block provides, by default, a text-based output of the current values for specified variables.

1. Print initial debug output if requested.-

IF SSDBUG = .TRUE. .and. SSDBOF(4) = 1,
            Print initial MONITOR debug output 2. IF monitor type  = none    (SSRMT = 3)    GO TO STEP 4
                    = user    (SSRMT = 2)    GO TO STEP 3
                    = system  (SSRMT = 1)    CONTINUE

<u>SYSTEM MONITOR</u>

A.  IF SSRMSF (result monitor start flag) = .TRUE. , print the header line for the monitor output.

B.  IF SSNRON (number of result output names) > 0, print the result output names (SSRON) and their current values to the monitor.

C.  GO TO STEP 4

3.  USER MONITOR

Call the user-supplied FORTRAN subroutine USPCMO. Pass the result output names (SSRON) and their current values.

4.  Set the results monitor start flag (SSRMSF) = .FALSE.

5.  Print final debug output if requested:

IF SSDBUG = .TRUE. .and. SSDBOF(4) = 1
          Print final MONITOR debug output

6.  EXIT

A- 5.   TIMER

The TIMER block pauses the system so that the processing of information is performed at a user-specified rate.

84

40562A

1. Print initial debug output if requested:

IF SSDBUG = .TRUE. .and. SSBOF(5) = 1,
       Print initial TIMER debug output

2. IF timer type = user        (SSRMT = 3)    GO TO STEP 4
                 = real time   (SSRMT = 2)    GO TO STEP 3
                 = simulation  (SSRMT = 1)    CONTINUE

SIMULATION TIMER

A. Calculate how long to wait (seconds) before the next sample period (note that with the simulation timer, the wait period is only calculated, not implemented):

SSPDWT = SSPDSI*IFACT - (CTIME - SSPDCT)

where    IFACT = 1     if  SSPDTU = 1 (seconds)
            IFACT = 60    if  SSPDTU = 2 (minutes)
            IFACT = 3600  if  SSPDTU = 3 (hours)

CTIME is the current clock time (operating system dependent)

B. Set the plant data clock time equal to the current clock time (operating system dependent):

SSPDCT = CTIME

C. GO TO STEP 5

3. <u>REAL TIME TIMER</u>

A.    Calculate how long to wait (seconds) before the next sample period:

SSPDWT = SSPDSI*IFACT - (CTIME-SSPDCT)

where   IFACT = 1    if SSPDTU = 1 (seconds)
                     IFACT = 60   if SSPDTU = 2 (minutes)
                     IFACT = 3600  if SSPDTU = 3 (hours)

CTIME is the current clock time (operating system dependent)

B.    Pause the system for the calculated wait period (SSPDWT)

B.    Set the plant data clock time equal to the current time:

SSPDCT = SSPDCT + SSPDSI

C.    GO TO STEP 5

4. USER TIMER

A. Set the plant data wait time (SSPDWT) = 0.

B. Call the user-supplied FORTRAN subroutine yUSPCT1. It is the responsibility of the user to pause the system for the appropriate time period before returning control from subroutine USPCTI.

5. Set the timer start flag (SSTISF) = .FALSE.

6. Print final debug output;f requested:

IF SSDBUG = .TRUE. .and. SSDBOF(5) = 1
               Print final TIMER debug
                       output

7. EXIT

A-6. TERMINATION CRITERIA

The TERMINATION CRITERIA block determines if any of the termination criteria specified in the process control problem specifications have been satisfied.

1. Print initial debug output if requested:

```
        IF SSDBUG = .TRUE. .and.  SSDBOF(6) = 1,
                  Print initial TERMINATION CRITERIA debug output 2.  IF termination criteria = user    (SSRMT = 2)  GO TO STEP 3
                                = system  (SSRMT = 1)  CONTINUE

SYSTEM TERMINATION CRITERIA

Check all the termination conditions specified in the
        process control script. Set the termination criteria status
        tag (SSTCSF) TRUE . if any of the termination conditions is
        satisfied, .FALSE. otherwise.

GO TO STEP 4

3.  USER TERMINATION CRITERIA

Call the user-supplied subroutine USPCTC to check for
        termination conditions.    Upon return, the termination
        criteria status tag (SSTCSF) = .TRUE. If a termination
        condition has been satisfied, .FALSE. otherwise.

4.  IF SSTCSF = .TRUE., terminate data logging (CALL ZZNDLG).

5.  Print final debug output if requested:

IF SSDBUG = .TRUE. .and.  SSDBOF(6) = 1,
                  Print final TERMINATION CRITERIA debug output
```

6. EXIT

A-7. STATE ESTIMATOR

The STATE ESTIMATOR block approximates the values of the process state variables in the presence of unknown process disturbances, uncertain initial conditions, measurement error, and model error.

1. Print initial debug output if requested:

IF SSDBUG = .TRUE. .and. SSDBOF(7) = 1,
       Print initial STATE ESTIMATION debug output 2. Set the current manipulated variable values equal to the last manipulated variable values (assumed constant through the state estimation interval):

MV(i) = SSLMV(i)    i = 1, ..., SSNMV where MV is the vector of current manipulated variable values 3. Integrate the model forward one sample interval (SSPDSI). Incorporate at the appropriate times any load disturbance events which occur during the sample period (T = T + SSPDSI).

4. IF state estimator type

= none                       (SSSET = 1)    GO TO STEP 7

= fixed Kalman filter    (SSSET = 2)    GO TO STEP 6

= extended Kalman filter (SSSET = 3)    GO TO STEP 5

= user                     (SSSET = 4)    CONTINUE

USER STATE ESTIMATOR

Call the user-supplied subroutine USPCSE to update the current state variable values. Upon a successful return, the model state variable values are set equal to the user calculated state variable estimates.

GO TO STEP 7

5. EXTENDED KALMAN FILTER STATE ESTIMATOR

6. FIXED KALMAN FILTER STATE ESTIMATOR

Update the state variables using the following expression:

```
Do i = 1 to SSNSV
    SUMX = 0.0
    Do j = 1 to SSNMPV
        k = (j-1)*SSNSV + i
        SUMX = SUMX + SSGM(k) * [SSPTV(j+1) - MTV(j)]
```

```
        Endj
        SV(i) = SV(i) + SUMX
End i
``` where MTV is the vector of measured process variable values (calculated by the model) and SV is the vector of state variable values.

7. Check the state estimator lower and upper bounds. If a state variable violates a bound, set the state variable value equal to the bound value.

8. Reinitialize the state variable values and the independent variable value (i.e., set the model initial conditions for the state variables and independent variable equal to the current values of their corresponding state variable and independent variable values.

9. Set the current manipulated variable values equal to the corresponding plant tag manipulated variable values:

```
MV(i) = SSPTV(1+SSNMPV+i)      i = 1, ..., SSNMV
``` where MV is the vector of current model manipulated variable values.

10. Set the current measured disturbance variable values equal to the corresponding plant tag measured disturbance variable values:

MDV(i) = SSPTV(1+SSNMPV+SSNW+i)    i = 1, ..., SSNMDV where NDV is the vector of current model measured disturbance variable values.

11. Evaluate the INITIAL and DYNAMIC sections of the model definition program to update algebraic variables using the current values of all the model variables.

12. Print final debug output if requested:

IF SSDBUG = .TRUE. .and. SSDBOF (7) = 1,
                    Print final STATE ESTIMATOR debug output
13. EXIT

A-8. DISTURBANCE PREDICTOR

The DISTURBANCE PREDICTOR block estimates future process disturbances over the prediction horizon due primarily to plant-model mismatch.

1. Print initial debug output if requested:

IF SSDBUG = .TRUE. .and. SSDBOF(8) = 1,
           Print initial DISTURBANCE PREDICTOR debug output 2. IF SSDPT = 1            (no disturbance predictor)
       GO TO STEP 19
   IF SSDPT = 5            (user-supplied
   disturbance predictor)   GO TO STEP 18

3. Update the stacks of the past model variable values:

SSPEL(i)  =  SSPEL(i-1)   i = SSNDPV, ..., 2
   SSPEL(1)  =  ZZTICG

Do i = 1 to SSNSV
       k = (i-1)*SSNDPV
       Do j = SSNDPV to 2, Step -1
           SSPSV(k+j) = SSPSV(k+j-1)
       End j
       SSPSV(k+1) = SV(i)
   End i

40562A

```
       Do i = 1 to SSNMV
           k = (i-1)*SSNDPV
           Do j = SSNDPV to 2, Step -1
               SSPMV(k+j) = SSPMV(k+j-1)
           End j
           SSPMV(k+1) = SV(i)
       End i Do i = 1 to SSNMPV
           k = (i-1)*SSNDPV
           Do j = SSNDPV to 2, Step -1
               SSPMPV(k+j) = SSPMPV(k+j-1)
           End j
           SSPMPV(k+1) = MPV(i)
       End i Do i = 1 to SSNCCV
           k = (i-1)*SSNDPV
           Do j = SSNDPV to 2, Step -1
               SSPCCV(k+j) = SSPCCV(k+j-1)
           End j
           SSPCCV(k+1) = CCV(i)
       End i Do i = 1 to SSNMDV
           k = (i-1)*SSNDPV
           Do j = SSNDPV to 2, Step -1
               SSPMDV(k+j) = SSPMDV(k+j-1)
           End j
           SSPMDV(k+1) = MDV(i)
       End i
``` where the vectors SV, MV, UTV, NMV, and CCV contain the current values of the state variables, manipulated variables, measured process variables, measured disturbance variables, and controller controlled variables, respectively.

4. IF SSCPSN ≠ SSNSCA and SSDPT ≠ 2
   (disturbance predictor type = constant), GO TO STEP 19

IF SSCPSN = SSNSCA, Set NPDPV = SSNSCA + 1
   (calculate the initial bias in the following steps)

IF SSCPSN ≠ SSNSCA, Set NPDPV = SSNDPV
   (update the variable bias estimates in the following steps)

5. Save current values for all load disturbance event parameters:

SSLDSP(i) = LDP(i)          i = 1, ..., SSNPLD

6. Set the final time for integration equal to the current time (T). Go back in time (T) to **T - NPDPV*SSPDSI** and set the current initial conditions equal to the old variable values:

```
TFINAL = T
T      = SSPEL(NPDPV)      ZZTICG SSPEL(NPDPV)

Do i = 1, ..., SSNSV
    k = (i-1)*SSNDPV + NPDPV
    SVIC(i) = SSPSV(K)
End i

Do i = 1, ..., NNSMV
    k = (i-1)*SSNDpv + NPDPV
    MV(i) = SSPMV(k)
End i

Do i = 1, ..., SSNMDV
    k = (i-1)*SSNDPV + INPDPV
    MDV(i) = SSPMDV(k)
End i
``` where the vectors SV, MV, and MDV contain the current values of the state variables, manipulated variables, and measured disturbance variables,, respectively.

7. Set the parameter values for any load disturbance events which occurred at a time ≤ the current time.

8. Initialize the variable disturbance estimator counter, J = 0.

9. Integrate the model forward in time one sample interval (SSPDSI)
   A. Adjust the manipulated and measured disturbance variable values at the start of each integration step using the saved values (SSPMV and SSPMDV, respectively).

B. Incorporate at the appropriate times any load disturbance events which occur during the sample period (T = T + SSPDSI).

10. IF SSNCSA ≠ SSCPSN, THEN (update variable disturbance predictor values):

A. IF T = SSPEL(NPDPV) + SSNCSA * SSPDSI, THEN (calculate the initial SLW input):

```
Do i = 1 to SSNCCV
    k = (i-1)*SSNDPV + 1
    BOLD(i) = {[SSPCCV(k) - CCV(I)] + 50.0}/50.0
End i
```

```
                    (set the second disturbance value equal to the initial
 5                  bias):

Do i = 1, SSNCCV
                        k = (i-1)*SSFELL  +  2
                        SSFDPE(k) = SSFDPE(k-1)
                    End i (update counter):

10                  J = J + 1

GO TO STEP 11

B.    IF T = SSPEL(NPDPV) + J * SSNCSA * SSPDSI,   THEN:

(update variable disturbance predictions):

Do i 1, SSNCCV
15                      j = (i-1)*SSNDPV + J * SSNCSA
                        k = (i-1)*SSFELL  +  J

B = { [ SSPCCV(i) - CCV(i)] + 50.0} / 50.0
                        P = SSPDFV(j)
                        L = SSDPLV(i)
                        G = SSPDGV(j)
20                      B1 = BOLD(i)

P= (P/L) * {1 - [ P * B1 * B1 /(L - P * B1 * B1)]}

K = P * B1 / (L + P * B1 * B1)

G = G + K*(B-G*B1)

SSPDGV(j)   =    G
25
                        SSPDFV(j)   =    P

SSFDPE(k)   =    G * (SSFDPE(k) + 50.0) - 50.0

End i (update counter):

30                  J = J + 1

11.   IF T < TFINAL, GO TO STEP 9

12.   IF SSNCSA = SSCPSN, THEN:

(calculate and store the current disturbance predictor
            estimates):
```

95

40562A

- If the controlled variable is not measured, set the current disturbance estimates equal to zero.

- For all the controlled variables that are measured, calculate the current disturbance es@s as follows:

```
    Do i = 1 to SSNCCV
        k = (i-1)*SSFELL + 1
        SSFDPE(k) = SSPTV(j) -  CCV(i)
    End i
    ``` where j is the element of the plant tag values vector (SSPTV) that corresponds to the controller controlled variable, CCV(i).

13. Restore model parameter values in load disturbance events:

LDP(i) = SSLDSP(i)   i = 1, ...,   SSNPLD where LDP is the vector of model parameter values in the load disturbance events.

14. Reset the initial conditions:

ZZTICG = SSPEL(1)

SV(i) = SSPSV(j)     i = 1, ..., SSNSV    j = (i-1)*SSNDPV+1

MV(i) = SSPMV(j)     i = 1, ..., SSNMV    j = (i-1)*SSNDPV+1

MDV(i) = SSPMDV(j)   i = 1, ..., SSNMDV   j = (i-1)*SSNDPV+1 where the vectors SV, MV, and MDV contain the values of the state variables, manipulated variables, and measured disturbance variables, respectively.

15. Evaluate the INITIAL and DYNAMIC sections of the model definition program to update algebraic variables using the current values of all model variables.

16. IF SSDPT ≠≠ 2, GO TO STEP 18

17. Update constant future disturbance estimates:

```
    Do i = 1, ..., SSNCCV
        k = (i-1)*SSFELL
        Do j = 2, ..., SSFELL
            SSFDPE(k+j) = SSFDPE(k+1)
        End j
    End i
    ```

GO TO STEP 19

18. USER STATE ESTIMATOR

Call the user-supplied subroutine USPCDP to update the current and future disturbance prediction estimates.

19. Print final debug output if requested:

IF SSDBUG = .TRUE. .and. SSDBOF(8) = 1,
           Print final DISTURBANCE PREDICTOR debug output

20. EXIT

A-9. LOAD DISTURBANCE

The LOAD DISTURBANCE block updates future known process disturbances. A general interface allows the user to customize the load disturbance specifications.

1. Print initial debug output if requested:

IF SSDBUG = .TRUE. .and. SSDBOF(9) = 1,
         Print initial LOAD DISTURBANCE debug output 2. IF load disturbance type
       = system    (SSLDT = 1)   GO TO STEP 3
       = real time (SSLDT = 3)   GO TO STEP 3
       = user      (SSLDT = 2)   CONTINUE

. USER LOAD DISTURBANCE

Call the user-supplied subroutine USPCLD to update the load disturbance parameter values and event time values.

3. Set the load disturbance start flag (SSLDSF) = .FALSE.

4. Print final debug output if requested:

IF SSDBUG = .TRUE. .and. SSDBOF(9) = 1,
         Print final LOAD DISTURBANCE debug output

5. EXIT

A-10. SET POINT PROFILE

The SET POINT PROFILE block specifies the values of selected variables over future prediction horizons.

1. Print initial debug output if requested:

IF SSDBUG = .TRUE. .and. SSDBOF(10) = 1,
         Print initial SET POINT PROFILES debug output 2. IF set point type = system    (SSSPT = 1)   GO TO STEP 3
                   = real time (SSSPT = 3)   GO TO STEP 3
                   = user      (SSSPT = 2)   CONTINUE

USER SET POINT PROFILES

Call the user-supplied subroutine USPCSP to update the set
   point profiles for the controller controlled variables.

3. Set the set point profile start flag (SSSPSF) = .FALSE.

4. Print final debug output if requested:

IF SSDBUG = .TRUE. .and. SSDBOF(10) = 1,
              Print final SET POINT PROFILES debug output

5. EXIT

A-11. CONTROLLER

The CONTROLLER block determines the optimal values of current, and
sometimes future, manipulated variable values.

1. IF controller type = nmpc (SSCT = 1)   GO TO STEP 2
                      = user (SSCT = 2)   CONTINUE

USER CONTROLLER

A . IF SSDBUG = .TRUE. .and. SSDBOF(11) = 1,
       Print initial CONTROLLER debug output B . Call the user-supplied subroutine USPCCT to calculate
       the plant set point tag values (manipulated variable
       set point values).

GO TO STEP 3

2. NMPC CONTROLLER

A.  Set up the internal specifications for the optimization
       problem:

• Set the adjustable parameters and their upper &
         lower bounds.

• Set the process constraints (equality and
         inequality constraints).
       • Set the maximum control change rate constraints.
       • Set up the future event lists:
         time values
         controlled variables
         manipulated variables
         controlled variable disturbances
         controlled variable objective function weights

98

40562A manipulated variable objective function weights
            load disturbance codes
            simulator codes
        •   Adjust the future event list to account for
            manipulated variable dead time values.
        •   Calculate the future set point profiles for the
            controlled variables.

•   Add load disturbances to the event list if they
            will occur during the future prediction horizon.
        •   Initialize the future manipulated variable values
            to the current values.
        •   Initialize the last manipulated variable values to
            the current values.

B . IF SSDBUG = .TRUE. .and. SSDBOF(11) = 1,
        Print initial CONTROLLER debug output D . Call the optimization routine to determine the optimal
        current and future manipulated variable values:

a.  Integrate the model forward in time to the end of
            the prediction horizon using the current estimates
            of the manipulated variable values throughout the
            prediction horizon:

•   Adjust the manipulated variable values at the
                appropriate times to account for future
                controller movements.

•   Incorporate at the appropriate times any load
                disturbance events which occur during the
                prediction horizon.

b.  Calculate the objective function value using
            either the NMPC formulation (SSOFM=I) or a user
            defined objective function (SSOFM=2).

c.  Determine improved estimates of the current and
            future manipulated variable values.  If
            termination criteria satisfied, CONTINUE
            otherwise, GO TO STEP 2.D.a.

E.  Print a final optimization report summary if requested
        (SSCOFI(3) > 1).

3.  Set the current plant sample counter equal to zero (SSCPSN)

4 . Update the set point tag variables to the optimal current
    manipulated variable values:

SSPSTV(i) = SSFMV(j)      i = 1, ..., SSNMV
                              j = (i-1)*SSFELL + 1

5. Set the manipulated variable values equal to the plant tag manipulated variable values:

MV(i) = SSPTV(i+SSNMPV+1)    i = 1, ..., SSNMV

6. Evaluate the INITIAL and DYNAMIC sections of the model definition program to update any algebraic variables using the current values of all the model variables.

7. Set the controller start flag (SSCSF) = .FALSE.

8. Print final debug output if requested:

IF SSDBUG = .TRUE. .and. SSDBOF(11) = 1,
           Print final CONTROLLER debug output

9. EXIT

A- 12.    SEND DATA

The SEND DATA block transfers current control variables values to the plant or to a simulation model.

1. Print initial debug output if requested:

IF SSDBUG = .TRUE. .and. SSPDSC = 3 SSDBOF(12) = 1,
           Print initial SEND DATA debug output 2. IF plant data source
   = simulation   (SSPDSC = 1)   GO TO STEP 3
   = real time    (SSPDSC = 2)   GO TO STEP 3
   = user         (SSPDSC = 3)   CONTINUE

USER SEND DATA

Call the user-supplied subroutine USPCSD to send the current plant set point tag values to the plant.

3. Set the send data start flag (SSSDSF) = .FALSE.

4. Print final debug output if requested:

IF SSDBUG = .TRUE. .and. SSPDSC = 3 SSDBOF(12) = 1,
           Print final SEND DATA debug output The present invention has been described in an illustrative manner. In this regard, it is evident that those skilled in the art once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. A method of executing real-time control of an apparatus, comprising the steps of:
    receiving input signals which represent measured parameter values from a plurality of sensors in said apparatus;
    periodically transmitting a time-recorded set of said measured parameter values to an interactive modeler which includes
    a nonlinear process model having an on-line version for use in said real-time execution of control wherein said on-line version is derived from dynamic behavior in said process,
    an independent disturbance model having an on-line version for use in said real-time execution of control wherein said on-line version provides an error model for predicting future model error,
    an integrated model building function for use in building a future version of said process model and a future version of said disturbance model, and
    an integrated adaptive function for selectively enabling change of the process model on-line version and, alternatively, the disturbance model on-line version into a respective future version and for enabling said respective future version to replace the respective on-line version at a user-specified moment and thereby effect a new respective said on-line version wherein said change is enabled while said interactive modeler is in on-line use in said real-time execution of control;
    estimating the current state of at least one unmeasured process parameter in said interactive modeler from said process model;
    projecting a desired set of desired directly controlled parameter values and at least one desired indirectly controlled parameter value over a predetermined control horizon;
    periodically estimating how said apparatus will react to proposed changes to the value of at least one manipulated parameter over said control horizon, and determining a set of current and future manipulated parameter values which will minimize deviations from said desired set; and
    causing a process control device in said apparatus to implement said manipulated parameter values.

2. The method according to claim 1, further comprising the steps of
    testing the validity of said input signals, said current state of each estimated unmeasured process parameter, and each current manipulated parameter value; and
    causing said process control device to implement only manipulated parameter values which are determined to be valid.

3. The method according to claim 1, wherein said step of periodically estimating and determining determines an optimized set of current and future manipulated parameter values.

4. The method according to claim 1, wherein said disturbance model is a step response variable disturbance model for predicting future disturbances and wherein said disturbance model is independent of said process model.

5. The method according to claim 2, wherein said step of periodically estimating and determining determines an optimized set of current and future manipulated parameter values.

6. The method according to claim 2, wherein said disturbance model is a step response variable disturbance model for predicting future disturbances and wherein said disturbance model is independent of said process model.

7. The method according to any of claims 1, 2, 3, 4, 5 or 6 wherein said step of periodically estimating and determining solves a set of first order differential equations to derive how the process will react to said proposed changes, and determines an optimized set of current and future manipulated parameter values.

8. The method according to claim 7, wherein said set of current and future manipulated parameter values includes at least one setpoint which enables tracking of a predetermined set-point profile.

9. The method according to claim 7, wherein said optimized set of current and future manipulated parameter values is determined at a first interval rate and the current state of each unmeasured process variable is estimated at a second interval rate which is greater than the first interval rate.

10. The method according to claim 7, further comprising the steps of providing a real-time database for physical data received from said input signals and storing said physical data in said database in the form of records.

11. The method according to claim 10, wherein said records are stored as a set of linked lists.

12. The method according to claim 11, wherein said real-time database includes a list of set-point corners for projecting future setpoints, with each of said set-point corners including a floating point value and a step in time where said floating point value applies.

* * * * *